US012597570B2

(12) United States Patent
Chen

(10) Patent No.: US 12,597,570 B2
(45) Date of Patent: Apr. 7, 2026

(54) LIGHT-EMITTING KEYBOARD AND BACKLIGHT MODULE

(71) Applicants:LITE-ON ELECTRONICS (GUANGZHOU) LIMITED, Guangzhou (CN); Lite-On Technology Corporation, Taipei (TW)

(72) Inventor: Yi-Wen Chen, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 19/230,071

(22) Filed: Jun. 5, 2025

(65) Prior Publication Data

US 2025/0299892 A1      Sep. 25, 2025

Related U.S. Application Data

(63) Continuation of application No. 18/898,714, filed on Sep. 27, 2024, now Pat. No. 12,347,631, which is a continuation of application No. 18/487,139, filed on Oct. 16, 2023, now Pat. No. 12,136,527, which is a continuation-in-part of application No. 17/973,448, filed on Oct. 25, 2022, now Pat. No. 11,804,343, (Continued)

(30) Foreign Application Priority Data

Jul. 11, 2019    (CN) .......................... 201910623300.8

(51) Int. Cl.
*H01H 13/02*        (2006.01)
*F21V 8/00*         (2006.01)

(52) U.S. Cl.
CPC ......... *H01H 13/023* (2013.01); *G02B 6/0068* (2013.01); *H01H 2219/06* (2013.01); *H01H 2219/062* (2013.01)

(58) Field of Classification Search
CPC ......... H01H 2219/062; H01H 2219/06; H01H 13/023; G02B 6/0068
See application file for complete search history.

(56) References Cited

U.S. PATENT DOCUMENTS

2019/0013163 A1*    1/2019   Chen .................. H01H 13/7065

OTHER PUBLICATIONS

Innovation Q_ NPL Search (Year: 2025).*

* cited by examiner

*Primary Examiner* — Anabel Ton
(74) *Attorney, Agent, or Firm* — JCIPRNET

(57) ABSTRACT

A light-emitting keyboard includes a bracket, keycaps, a circuit layer, a composite light-emitting layer, a spacing layer and an adhesive layer. The keycaps are disposed on the bracket and connected to the bracket. The circuit layer is disposed between the keycaps and the bracket. The composite light-emitting layer is disposed under the bracket, and includes a conductive layer, and light sources. The light sources are electrically connected to a portion of the conductive layer. The spacing layer is disposed between the composite light-emitting layer and the bracket, and includes holes corresponding to the light sources. One of the light sources is located in one of the holes of the spacing layer, and the light source is spaced from a wall of the corresponding hole. The adhesive layer is disposed between the composite light-emitting layer and the bracket, and the adhesive layer is spaced from one of the light sources.

12 Claims, 45 Drawing Sheets

Related U.S. Application Data which is a continuation-in-part of application No. 17/037,690, filed on Sep. 30, 2020, now Pat. No. 11,515,107, which is a continuation-in-part of application No. 16/528,592, filed on Jul. 31, 2019, now Pat. No. 10,824,009.

(60) Provisional application No. 63/455,986, filed on Mar. 31, 2023, provisional application No. 62/712,993, filed on Aug. 1, 2018.

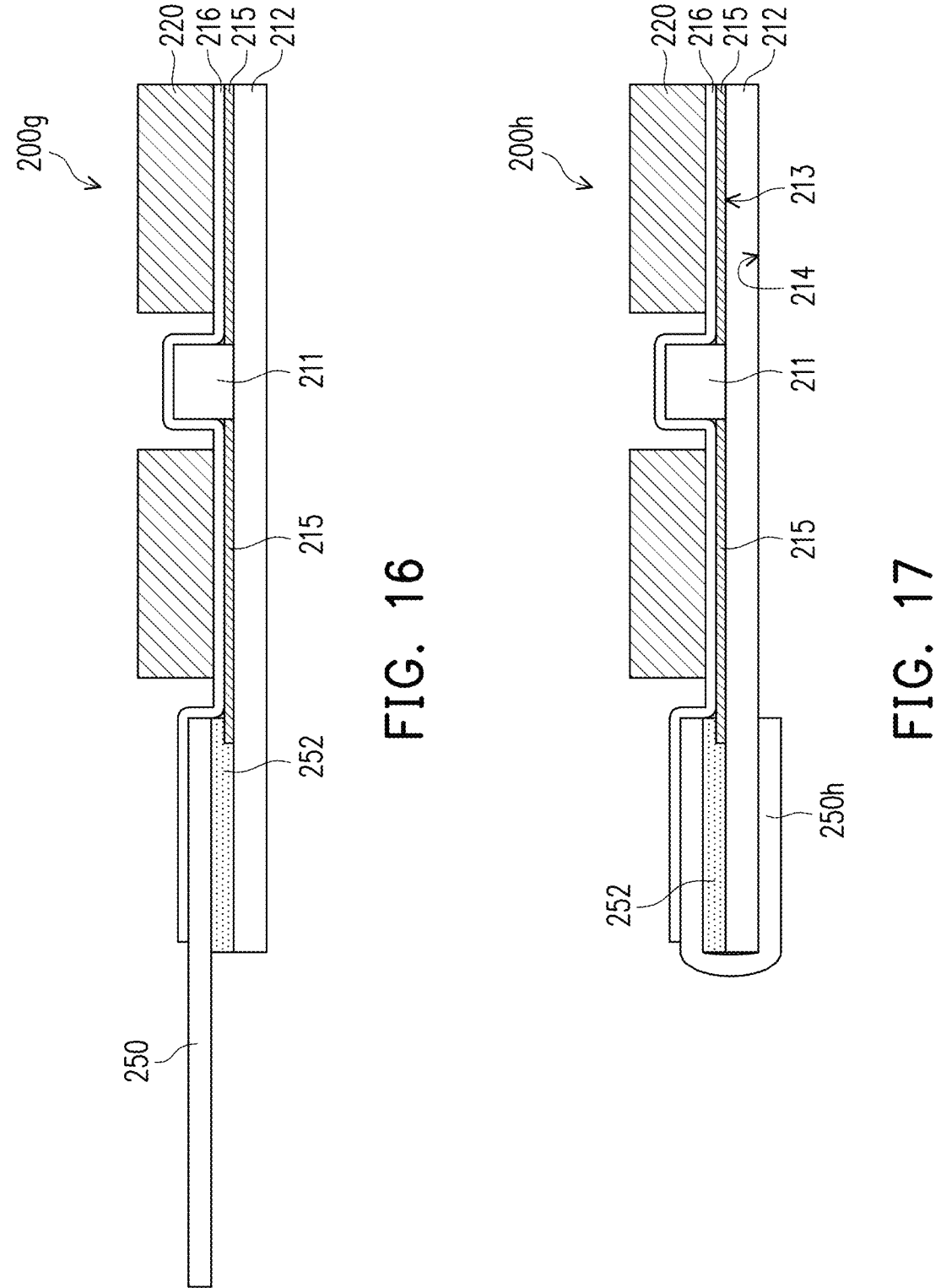

338

339(333)

353(350)

339(333)

LIGHT-EMITTING KEYBOARD AND BACKLIGHT MODULE

CROSS-REFERENCE TO RELATED APPLICATION

This application is a continuation application of and claims the priority benefit of U.S. application Ser. No. 18/898,714, filed on Sep. 27, 2024. The prior U.S. application Ser. No. 18/898,714 is a continuation application of and claims the priority benefit of U.S. application Ser. No. 18/487,139, filed on Oct. 16, 2023. The prior U.S. application Ser. No. 18/487,139 is a continuation-in-part application of and claims the priority benefit of U.S. application Ser. No. 17/973,448, filed on Oct. 25, 2022. The prior U.S. application Ser. No. 18/487,139 also claims the priority benefit of U.S. provisional application Ser. No. 63/455,986, filed on Mar. 31, 2023. The prior U.S. application Ser. No. 17/973,448 is a continuation-in-part application of and claims the priority benefit of U.S. application Ser. No. 17/037,690, filed on Sep. 30, 2020. The prior U.S. application Ser. No. 17/037,690 is a continuation-in-part application of and claims the priority benefit of U.S. application Ser. No. 16/528,592, filed on Jul. 31, 2019, which claims the priority benefit of U.S. provisional application Ser. No. 62/712,993, filed on Aug. 1, 2018, and China application serial no. 201910623300.8, filed on Jul. 11, 2019. The entirety of each of the above-mentioned patent applications is hereby incorporated by reference herein and made a part of this specification.

BACKGROUND OF THE INVENTION

Field of the Invention

The invention relates to a backlight module and a light-emitting keyboard.

Description of Related Art

With the development of technology, light-emitting buttons have been designed to increase aesthetics or recognizability. In the light-emitting button, a backlight module is mainly provided under a button structure, and how to enhance efficiency of backlighting keyboards is the latest research direction.

SUMMARY OF THE INVENTION

The invention provides a backlight module having enhanced lighting efficiency.

A light-emitting keyboard of the invention have the above-mentioned backlight module.

A light-emitting keyboard, includes a bracket, keycaps, a circuit layer, a composite light-emitting layer, a spacing layer and an adhesive layer. The keycaps are disposed on the bracket and connected to the bracket. The circuit layer is disposed between the keycaps and the bracket. The composite light-emitting layer is disposed under the bracket, and includes a conductive layer, and light sources. The light sources are electrically connected to a portion of the conductive layer. The spacing layer is disposed between the composite light-emitting layer and the bracket, and includes holes corresponding to the light sources. One of the light sources is located in one of the holes of the spacing layer, and the light source is spaced from a wall of the corresponding hole. The adhesive layer is disposed between the composite light-emitting layer and the bracket, and the adhesive layer is spaced from one of the light sources.

In an embodiment of the invention, a top surface of the spacing layer is higher than or coplanar with a top surface of one of the light sources.

In an embodiment of the invention, the one of the light sources located in the one of the holes is aligned with an opening of the bracket, and a size of the opening of the bracket is greater than a size of the corresponding hole of the spacing layer.

In an embodiment of the invention, a top surface of the spacing layer is lower than a top surface of one of the light sources, and the light source is aligned with an opening of the bracket.

In an embodiment of the invention, the spacing layer comprises a light-shielding plate or a light guide plate.

In an embodiment of the invention, the conductive layer comprises a circuit and a patterned structure, the light sources are electrically connected to the circuit, and the patterned structure is separated from the light sources.

In an embodiment of the invention, the light-emitting keyboard further includes an insulating layer conformally covering the patterned structure, and a portion of the insulating layer is exposed by one of the holes of the spacing layer.

In an embodiment of the invention, the patterned structure is conductive to the bracket.

In an embodiment of the invention, one of the light sources comprises a plurality of light-emitting diodes corresponding to an opening of the bracket.

In an embodiment of the invention, the composite light-emitting layer further comprises a first resistor and a second resistor located in a row corresponding to a long side, the first resistor is electrically connected to a first group of the light sources, and the second resistor is electrically connected to a second group of the light sources.

In an embodiment of the invention, a part of the adhesive layer is covered by one of the keycaps, and a gap is arranged between the part of the adhesive layer and one of the light sources covered by the corresponding keycap.

A backlight module adapted to be disposed under keycaps, wherein the backlight module includes a composite light-emitting layer, a spacing layer and an adhesive layer. The composite light-emitting layer includes a conductive layer; and light sources electrically connected to a portion of the conductive layer. The spacing layer is disposed between the composite light-emitting layer and the keycaps, and includes holes corresponding to the light sources, one of the light sources located in one of the holes of the spacing layer is spaced from a wall of the corresponding hole with a first distance in a direction. The adhesive layer is disposed on the spacing layer, one of the light sources is spaced from a wall of the adhesive layer with a second distance in the direction, and the second distance is greater than the first distance.

In an embodiment of the invention, the adhesive layer is provided with an opening with the wall of the adhesive layer, and a portion of the spacing layer and one of the light sources is exposed by the opening.

In an embodiment of the invention, the spacing layer includes a light-shielding plate or a light guide plate.

In an embodiment of the invention, the conductive layer comprises a circuit and a patterned structure, the light source is electrically connected to the circuit, and the patterned structure is electrically insulated from the light source.

In an embodiment of the invention, an insulating layer covering the patterned structure with a top surface thereof as a protruding micro structure, and a shape of the patterned structure comprises a grid.

In an embodiment of the invention, the composite light-emitting layer further comprises a first resistor and a second resistor located in a row corresponding to a long side, the first resistor is electrically connected to a first group of the light sources, and the second resistor is electrically connected to a second group of the light sources.

In an embodiment of the invention, the spacing layer comprises a first hole corresponding to a first light source of the light sources and a second hole corresponding to a second light source of the light sources, and a length of the first hole along a side is greater than a length of the second hole along the side.

A backlight module adapted to be disposed under keycaps, wherein the backlight module includes a composite light-emitting layer. The composite light-emitting layer includes a light source, a conductive layer and an insulating layer. The conductive layer includes a circuit and a patterned structure, the light source is electrically connected to the circuit, and the patterned structures is separated from the light source. The insulating layer covers the patterned structure and a part of the circuit, wherein the insulating layer comprising a first height and a second height different from the first height.

In an embodiment of the invention, the patterned structure is provided with a grid shape, and the insulating layer is conformally disposed on the patterned structure.

In an embodiment of the invention, a top surface of the insulating layer is formed as micro structures protruding from a flat surface.

In an embodiment of the invention, the backlight module further includes an adhesive layer disposed between the composite light-emitting layer and the keycaps, wherein the adhesive layer comprises an opening exposed a portion of the composite light-emitting layer under one of the keycaps, and a wall of the opening is spaced from the light source.

In an embodiment of the invention, the composite light-emitting layer comprising a substrate, the conductive layer is disposed on the substrate, and the first height covering a top surface of the patterned structure is greater than the second height covering a top surface of the substrate.

In an embodiment of the invention, the backlight module further includes a spacing layer disposed between the composite light-emitting layer and the keycaps, wherein the light source is disposed in a hole of the spacing layer and covered by a light-shielding layer, and a single pattern area of the light-shielding layer is larger than a single area of the hole.

Based on the above, in the backlight module and the light-emitting keyboard of the invention, one of the light sources located in one of the holes is spaced from a wall of the corresponding hole, so that the possibility of the damage of the light source caused by alignment errors during assembly can be lowered. The adhesive layer is disposed between composite light-emitting layer and the bracket, and the adhesive layer is spaced from one of the light sources, so as to prevent the adhesive layer from being too close to the light source to influence optical performance of the light source.

BRIEF DESCRIPTION OF THE DRAWINGS

The accompanying drawings are included to provide a further understanding of the invention, and the drawings are incorporated into the present specification and form a portion of the present specification. The drawings illustrate embodiments of the invention and are used to explain the principles of the invention with the descriptions.

FIG. 16 to FIG. 17 are partial cross-sectional views of various backlight modules according to other embodiments of the invention.

DESCRIPTION OF THE EMBODIMENTS

Figure 1A:
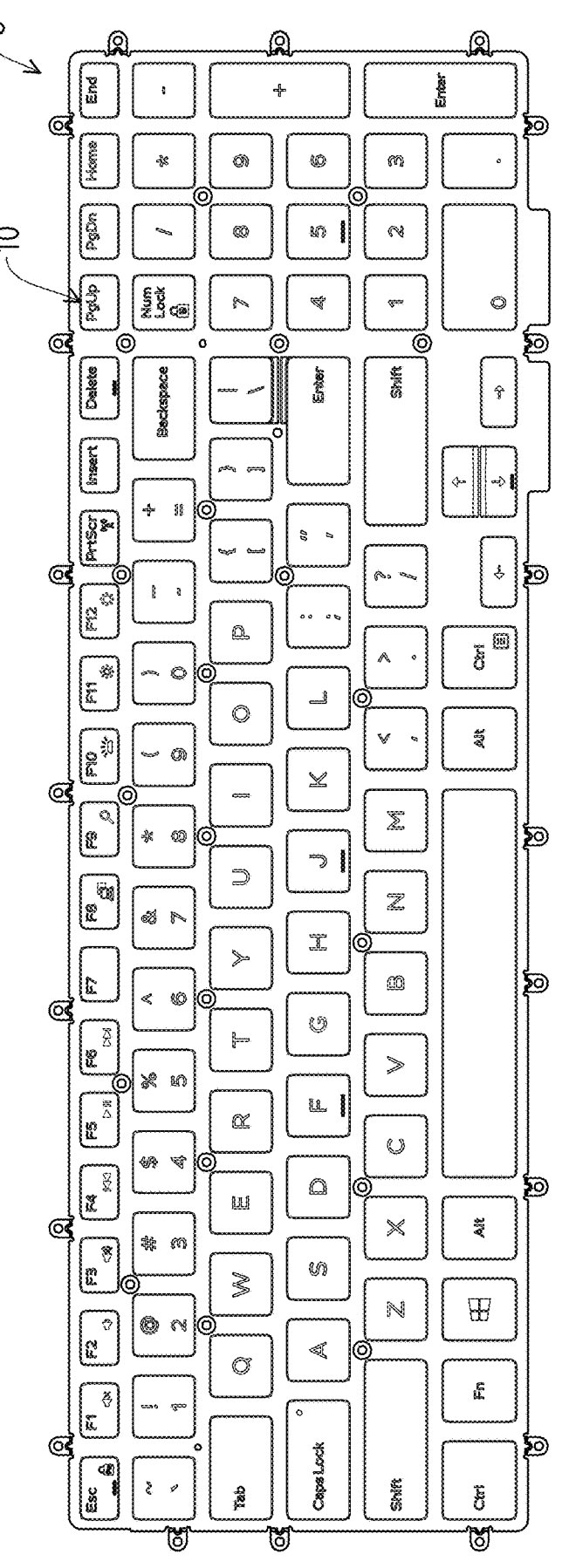
FIG. 1A is a top view of a light-emitting keyboard according to an embodiment of the invention.

Hereinafter, exemplary embodiments of the invention are described in detail, and examples of the exemplary embodiments are conveyed via the figures. Wherever possible, the same reference numerals are used in the figures and the descriptions to refer to the same or similar portions.

Figure 1B:
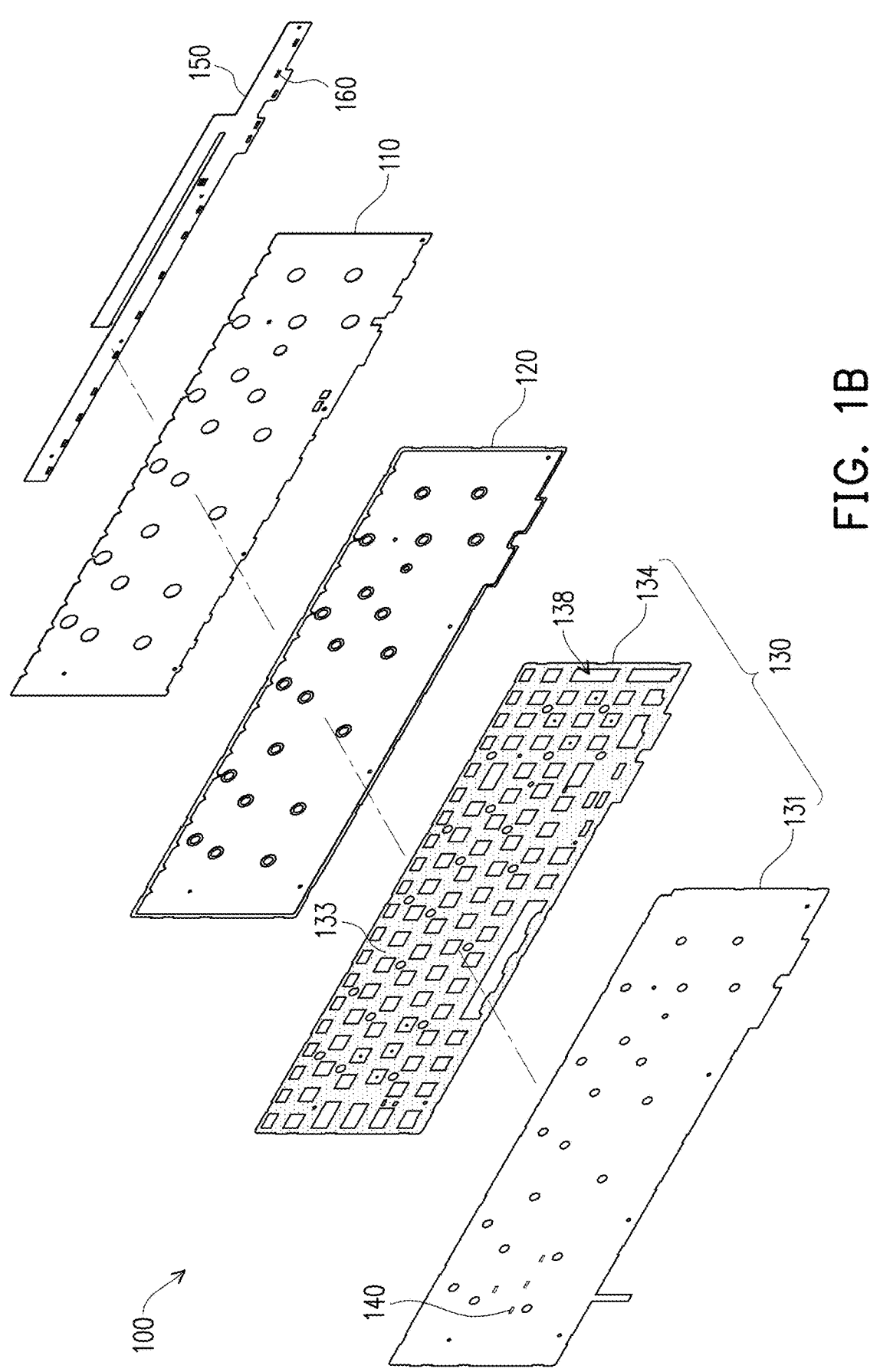
FIG. 1B is an exploded view of a backlight module of the light-emitting keyboard of FIG. 1A.

FIG. 1A is a top view of a light-emitting keyboard according to an embodiment of the invention. FIG. 1B is an exploded view of a backlight module of the light-emitting keyboard of FIG. 1A.

Referring to FIG. 1A and FIG. 1B, a light-emitting keyboard 5 of the present embodiment includes at least one button structure 10 and a backlight module 100 located under the button structure 10. Light provided by the backlight module 100 illuminates the rear side of the button structure 10 to provide the user with an identification or various visual effects. The light-emitting keyboard 5 shown in FIG. 1A is exemplified by, for example but not limited to, a keyboard of a notebook computer.

Figure 1C:
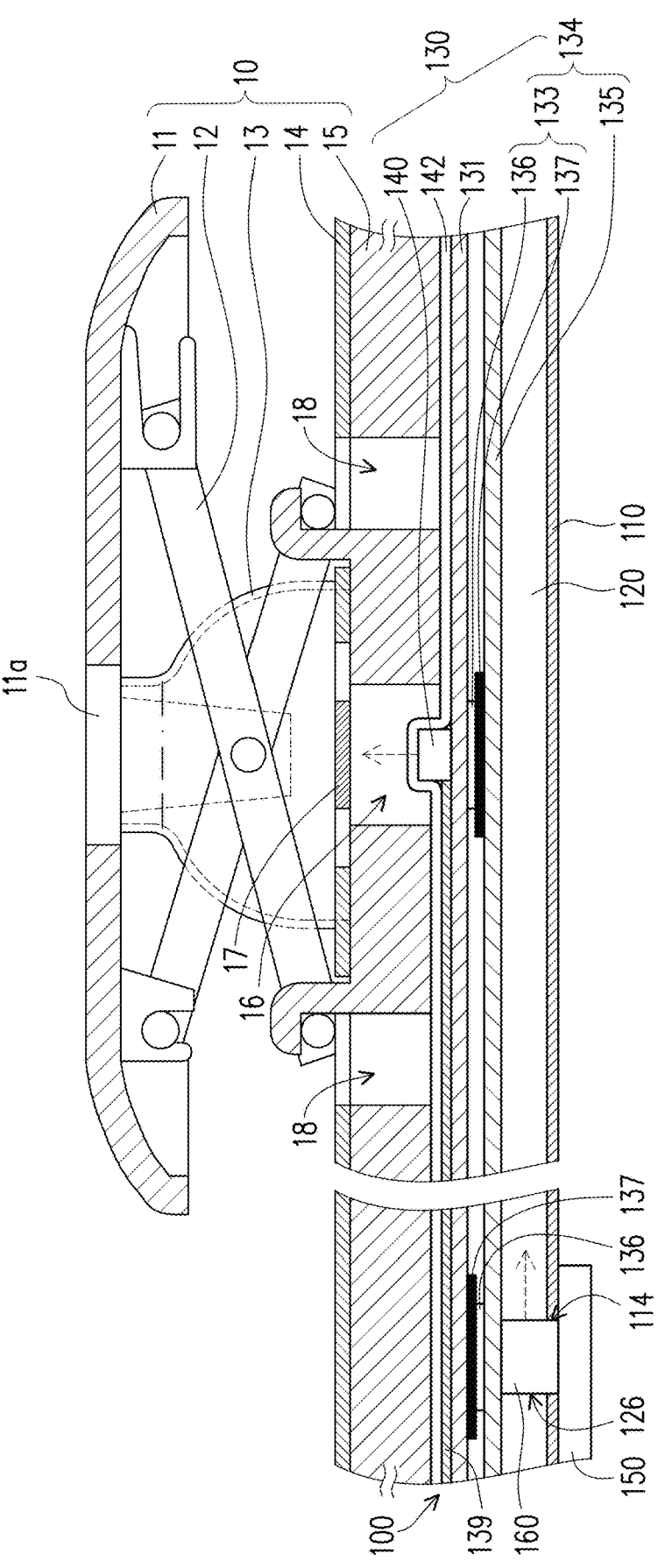
FIG. 1C is a partial cross-sectional view of the button structure with the backlight module of FIG. 1B disposed thereunder.

FIG. 1C is a partial cross-sectional view of the button structure with the backlight module of FIG. 1B disposed thereunder. It should be noted that, in order to clearly show the detailed structure of the backlight module, only a single button structure is schematically shown in FIG. 1C, and the relationship in size of elements included in the button structure 10 and the backlight module 100 is only for schematic illustration.

As shown in FIG. 1C, in the present embodiment, the button structure 10 includes a keycap 11, a support assembly 12, an elastic body 13, a circuit layer 14, and a bracket 15. The bracket 15 is disposed on the backlight module 100 for holding the keycap 11, the support assembly 12, the elastic body 13, and the circuit layer 14 in position. The bracket 15 may have a plurality of openings (such as through holes) that allow light to pass through or to accommodate a light source. For example, the rear surface of the keycap 11 may be illuminated by the light from the backlight module 100 via openings 16 and 18, and the opening 16 may accommodate a first light source 140 of the backlight module 100 as well. The number and arrangement of the openings of the bracket 15 are not limited to the disclosure.

The circuit layer 14 is disposed between the keycap 11 and the bracket 15. The circuit layer 14 is, for example, a flexible membrane circuit in a multi-layered structure having a conductive portion 17 as a switching region to trigger signals. The elastic body 13 is disposed between the keycap 11 and the circuit layer 14, and provides a restoring force to drive the keycap 11 move up and return to its released state. The support assembly 12 is disposed between the keycap 11 and the bracket 15. The respective ends of the support assembly 12 are pivotably and movably connected to the keycap 11 and the bracket 15, such that the keycap 11 is stably moved up and down relative to the bracket 15 via the connection of the support assembly 12. The support assembly 12 is, for example but not limited to, a scissor-like mechanism that includes two supporting pieces pivotally assembled together.

The elastic body 13 is located on the circuit layer 14 corresponding to the conductive portion 17, wherein the elastic body 13 has a protrusion aligned with and disposed above the conductive portion 17. When the keycap 11 is pressed to temporarily squeeze and deform the elastic body 13, the protrusion of the elastic body 13 moves downward to press the conductive portion 17 of the circuit layer 14, such that the switch is turned on to generate an input signal. Once the applied force is removed from the keycap 11, the restoring force of the elastic body 13 drives the keycap 11 to move upward and return to the inactive (unpressed) position. In the present embodiment, the keycap 11 may have a light-transmitting portion 11a defined by, for example, at least one character represented by each button structure 10 to allow the light emitted by the backlight module 100 to pass through, and thus a light-emitting button is obtained for user identification.

The backlight module 100 under the button structure 10 includes a light-reflecting plate 110, a light guide plate 120, and a composite light-emitting layer 130 stacked from the bottom upwards to the top. The composite light-emitting layer 130 is disposed between the bracket 15 and the light guide plate 120, and the light guide plate 120 is disposed between the composite light-emitting layer 130 and the light-reflecting plate 110. As shown in FIG. 1B, the composite light-emitting layer 130 located on the light guide plate 120 has a light-shielding pattern 133 which may shade the regions that do not need to be illuminated by light, thereby avoiding light leakage. The composite light-emitting layer 130 is provided with a light-transmitting region 138 where the light-shielding pattern 133 does not cover, and the light can pass through the light-transmitting region 138 to backlight the button. In an embodiment, in order to avoid light leakage between the button structures 10, the light-shielding pattern 133 may be disposed under the gap between two adjacent keycaps 11, and the light-transmitting region 138 could be surrounded by the light-shielding patterns 133. The light-transmitting region 138 is positioned corresponding to the keycap 11, so that the light could be delivered to the button structure 10 of the light-emitting keyboard 5 (FIG. 1A).

In the present embodiment, the composite light-emitting layer 130 includes a light-transmitting substrate 131, and a light-shielding plate 134 located under the light-transmitting substrate 131. A first circuit 139, the first light source 140, and a first passivation layer 142 are arranged on the light-transmitting substrate 131. The first circuit 139 and the first light source 140 are disposed on one side of the light-transmitting substrate 131, and the first light source 140 is electrically connected to the first circuit 139. The first circuit 139 includes a printed conductive paste or a patterned metal layer, such as printed silver wiring or a patterned copper foil, but the type of the first circuit 139 is not limited thereto.

After the first circuit 139 is formed on the upper surface of the light-transmitting substrate 131, the first light source 140 is disposed on the upper surface of the light-transmitting substrate 131, such that electrodes of the first light source 140 are electrically connected to the first circuit 139. The light-transmitting substrate 131 and the first circuit 139 thereon are collectively used as a circuit board that supplies power to the first light source 140. The first passivation layer 142 covers the first circuit 139, such that at least a portion of the first circuit 139 is located between the first passivation layer 142 and the light-transmitting substrate 131, thereby preventing an open circuit or a short circuit caused by the damaged circuit pattern on the light-transmitting substrate 131. In an embodiment, the first passivation layer 142 may further cover the first light source 140 to protect both of the first circuit 139 and the first light source 140. The first passivation layer 142 is, for example, a flexible polymer film having a thickness less than the thickness of the light-transmitting substrate 131.

As shown in FIG. 1B and FIG. 1C, the light-shielding plate 134 is located between the light guide plate 120 and the light-transmitting substrate 131, and the light-transmitting region 138 is defined, by the light-shielding pattern 133, on the light-shielding plate 134. The light-shielding plate 134 includes a film 135 and the light-shielding pattern 133 formed on the surface of the film 135. In the present embodiment, the film 135 is a light-transmitting substrate, and the light-shielding pattern 133 includes a light-reflecting coating 136 and a light-shielding coating 137 layered on one side of the light-transmitting substrate. If the light travelling in the light guide plate 120 is incident on the light-shielding pattern 133, the light could be reflected back into the light guide plate 120 by the light-reflecting coating 136, while the light-shielding coating 137 could prevent the light from being emitted out of the light-shielding pattern 133. In an embodiment, the light-reflecting coating 136 is a white paint, and the light-shielding coating 137 is a black paint. The structural configuration of the light-shielding pattern 133, and the colors of the light-reflecting coating 136 and the light-shielding coating 137 are not limited to the disclosure.

The first light source 140 is disposed on the surface of the light-transmitting substrate 131 distal to the light-shielding plate 134. In the present embodiment, the light-transmitting substrate 131 has its lower surface facing toward the light-shielding plate 134, and the first light source 140 is situated on the upper surface of the light-transmitting substrate 131 and functions as, for example, a top-view light source. The first light source 140 is disposed in the opening 16 of the bracket 15 corresponding to the light-transmitting portion 11a of the keycap 11, and therefore the first light source 140 does not protrude from the upper surface of the bracket 15. Thus, the light emitted by the first light source 140 under the button is adapted to upwards and directly illuminate the button structure 10 a direction away from the light-shielding plate 134 so as to provide a directionally backlighting effect, thereby achieving independent light emission for a single button. In other embodiments, the stacking positions of the light-shielding plate 134 and the light-transmitting substrate 131 could be changed, such that the light-shielding plate 134 may be located between the bracket 15 and the light-transmitting substrate 131 having the light emitted from the first light source 140 not blocked by the light-shielding plate 134.

The backlight module 100 further includes a circuit board 150 and a second light source 160. The circuit board 150 is located under the light-reflecting plate 110. A portion of the light-reflecting plate 110 is disposed between the circuit board 150 and the light guide plate 120. The circuit board 150 is, for example, a flexible circuit board coupled to a power supply providing power to the second light source 160. The second light source 160 is disposed under the composite light-emitting layer 130, and is electrically coupled to the circuit board 150 through penetrating the light guide plate 120 and the light-reflecting plate 110. For example, the light-reflecting plate 110 and the light guide plate 120 are respectively provided with openings 114 and 126 in which the second light source 160 is disposed, such that the second light source 160 positioned on the circuit board 150 could go upward and be next to one side of the light guide plate 120. The second light source 160 is, for example, a side-view light source that could emit light toward the lateral side of the light guide plate 120. The light emitted by the second light source 160 is adapted to enter the light guide plate 120 and travel over the interior thereof compliant with total reflection, such that the light could be uniformly and evenly distributed throughout the entire backlight module 100 and emitted out from the light-transmitting region 138 of the light-shielding plate 134 to provide an optical effect of enhanced uniformity.

The first light source 140 and the second light source 160 may be light-emitting diodes respectively in different types or packages. In the present embodiment, the first light source 140 could be a chip-scale packaged LED without leadframe or substrate, wherein a LED chip or die is disposed on the light-transmitting substrate 131 in a flip-chip manner, and the respective electrodes of the LED die are connected to the first circuit 139 via a soldering or surface-mounting technique. Optionally, dispensing of gel with phosphor, if phosphor conversion is required, may be performed on the LED die, such that the light-transmitting encapsulation (e.g., light-curable resin with or without phosphor) covers the die for protection and/or light conversion. Compared with the leadframe-based LED with the thickness of about 0.6 mm, the miniaturized first light source 140 of the present embodiment adopts a chip-scale package without additional substrate and wire bonding, and therefore, the thickness of the first light source 140 could be thinned to 0.08 mm or less. Moreover, the circuit for the first light source 140 is made from a printed conductive paste or a patterned metal foil, which is much thinner than an ordinary circuit board (about 0.15 mm to 0.2 mm). Therefore, the backlight module 100 could be slimmed down by integrating the first light source 140 into the composite light-emitting layer 130. It should be noted that the thicknesses of the components shown in the figures only illustrate the relationship in position and thickness, which are not limited thereto.

In the present embodiment, the second light source 160 of the backlight module 100 is, for example, a side-view light source, and the backlight module 100 could evenly and uniformly illuminate the buttons of the light-emitting keyboard 5 via the second light source 160, the light-reflecting plate 110, and the light guide plate 120. In addition, the first light source 140 of the backlight module 100 is, for example, a top-view light source. For a button having a special function (e.g., hot keys) of the light-emitting keyboard 5, the backlight module 100, via the first light source 140, may provide localized backlighting which is independently adjustable for the special hot keys, thereby allowing users to quickly identify this button in a visual manner.

The configuration of the backlight module of the invention is not limited to the backlight module 100. The following embodiments would elaborate other types of backlight modules. Except for the major difference, the same or similar components as those of the previous embodiment are represented by the same or similar reference numerals and are not repeated hereinafter. In order to clearly show the detailed structure of the backlight modules, the button structure is not shown in some figures, but it should be understood that the backlight modules of the following embodiments are adapted to be disposed under the button structure to provide a button backlit effect.

Figure 2A:
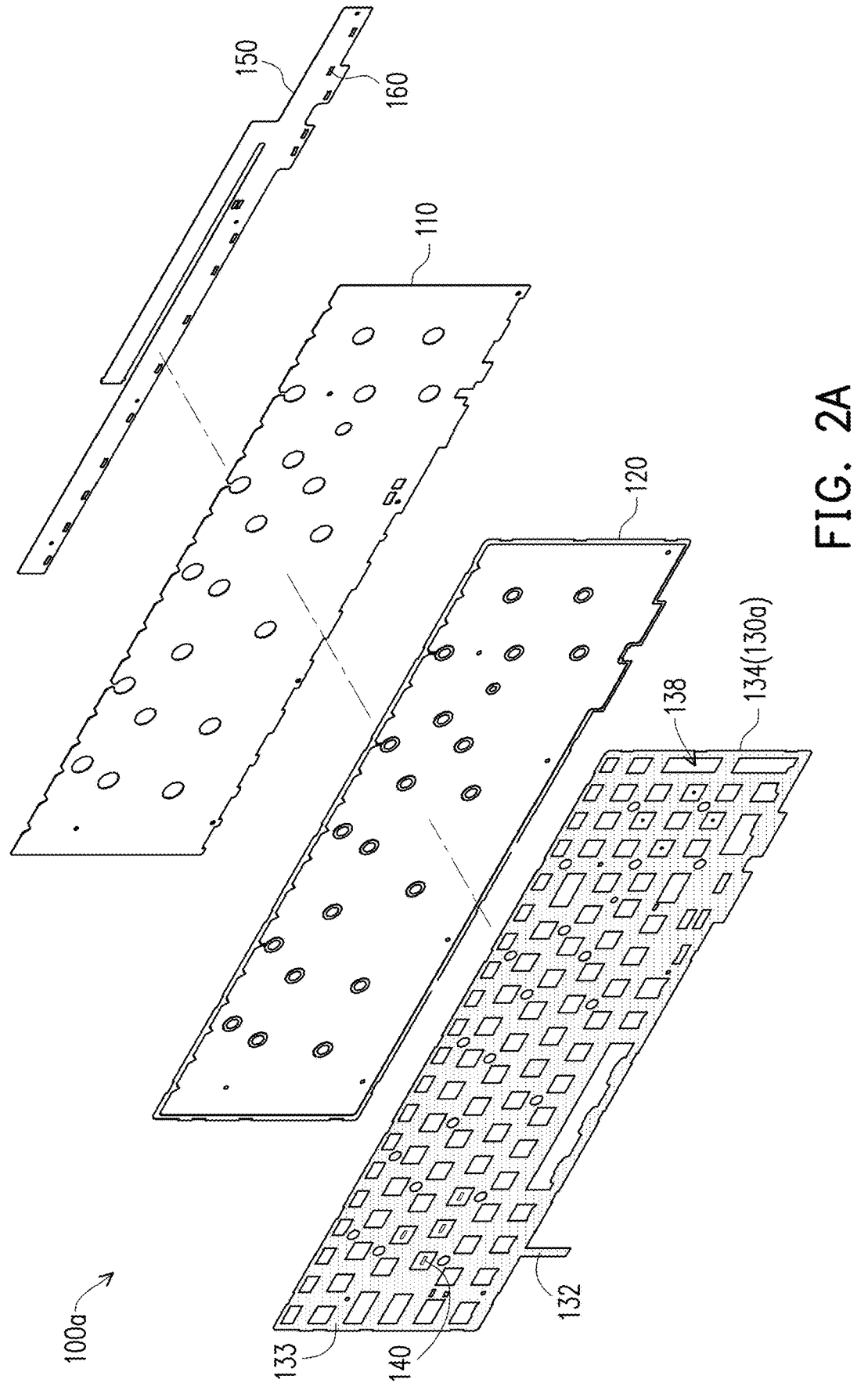
FIG. 2A is an exploded view of a backlight module according to another embodiment of the invention.
Figure 2B:
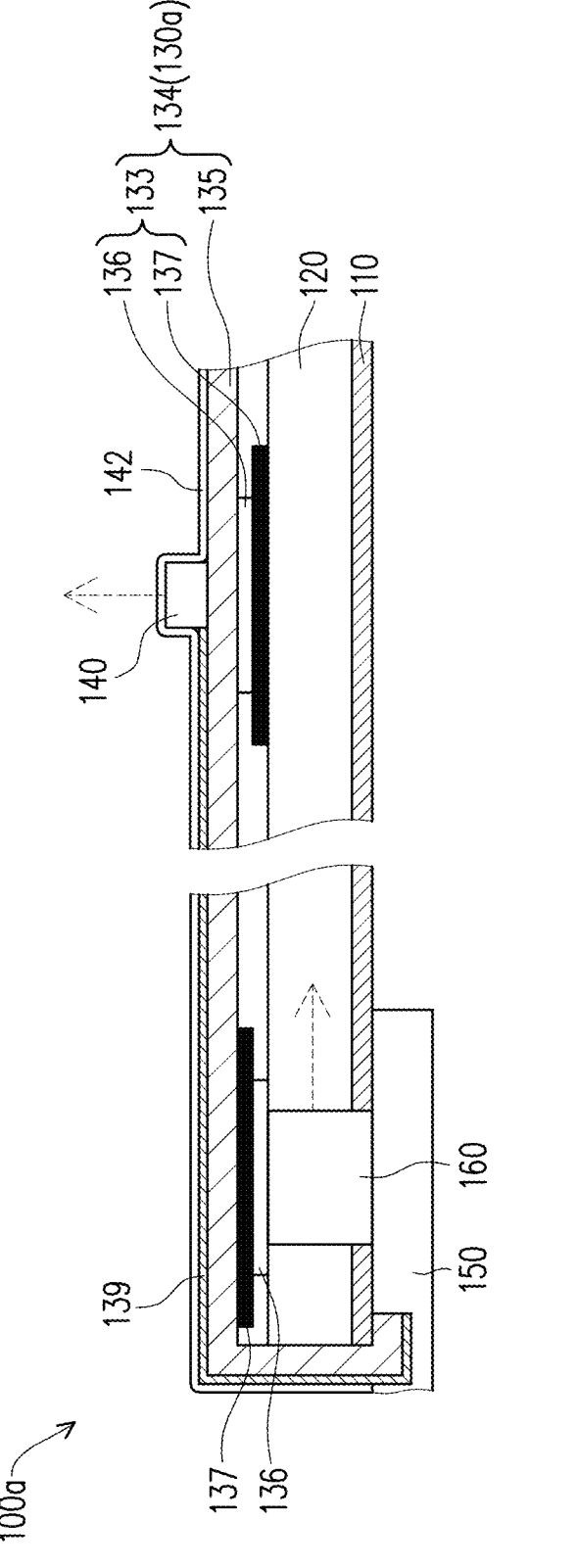
FIG. 2B is a partial cross-sectional view of the backlight module of FIG. 2A.

FIG. 2A is an exploded view of a backlight module according to another embodiment of the invention. FIG. 2B is a partial cross-sectional view of the backlight module of FIG. 2A. Referring to FIG. 2A and FIG. 2B, in the present embodiment, a composite light-emitting layer 130a of a backlight module 100a includes the light-shielding plate 134 disposed on the light guide plate 120, and the first circuit 139 disposed on the light-shielding plate 134. The first light source 140 is disposed on the light-shielding plate 134 and electrically connected to the first circuit 139. That is, the light-shielding plate 134 and the first circuit 139 thereon are collectively used as a circuit board for the first light source 140. Compared with the embodiment shown in FIG. 1B and FIG. 1C, the light-transmitting substrate 131 of the composite light-emitting layer 130 is no longer required in the composite light-emitting layer 130a of the present embodiment, such that the overall thickness of the composite light-emitting layer 130a may be reduced. The first circuit 139, the first light source 140, and the first passivation layer 142 previously on the light-transmitting substrate 131 shown in FIG. 1C are modified, in the present embodiment, to be directly disposed on the surface of the film 135 (such as the light-transmitting substrate) of the light-shielding plate 134.

In the present embodiment, the first light source 140 and the light guide plate 120 are located on two opposite sides of the light-transmitting film 135. The first light source 140 is disposed on the upper side of the light-shielding plate 134, while the light guide plate 120 is disposed on the lower side of the light-shielding plate 134; that is, the first light source 140 is disposed on the surface of the light-shielding plate 134 distal to the light guide plate 120. When the button structure is combined with the backlight module 100a, the opening 16 of the bracket 15 shown in FIG. 1C may be used as the accommodating space for the first light source 140, and the light emitted by the first light source 140 illuminates toward a direction opposite to the light guide plate 120 to provide the individual button with the independent and directional backlighting. The light emitted by the second light source 160 is adapted to enter the light guide plate 120 to provide an optical effect with uniform brightness, as depicted in the above embodiment.

In addition, in the composite light-emitting layer 130a, the first circuit 139 disposed on the light-shielding plate 134 could be electrically connected to the circuit board 150. The first circuit 139 laid out at an end 132 of the composite light-emitting layer 130a is, for example, coupled to the circuit of the circuit board 150 via a soldering or hotbar bonding. That is to say, even if the first light source 140 and the second light source 160 are located on different layers, the interconnection therebetween could be conducted via the circuit board 150, such that the single supply power could provide power to the first light source 140 and the second light source 160. Accordingly, the circuit design can be simplified, and the respective light emission of the first light source 140 and the second light source 160 could be independently controlled as well. In other embodiments, the first light source 140 and the second light source 160 may be connected to different power supplies; that is, the first circuit 139 of the first light source 140 may not be connected to the circuit board 150.

Figures 2C, 2D:
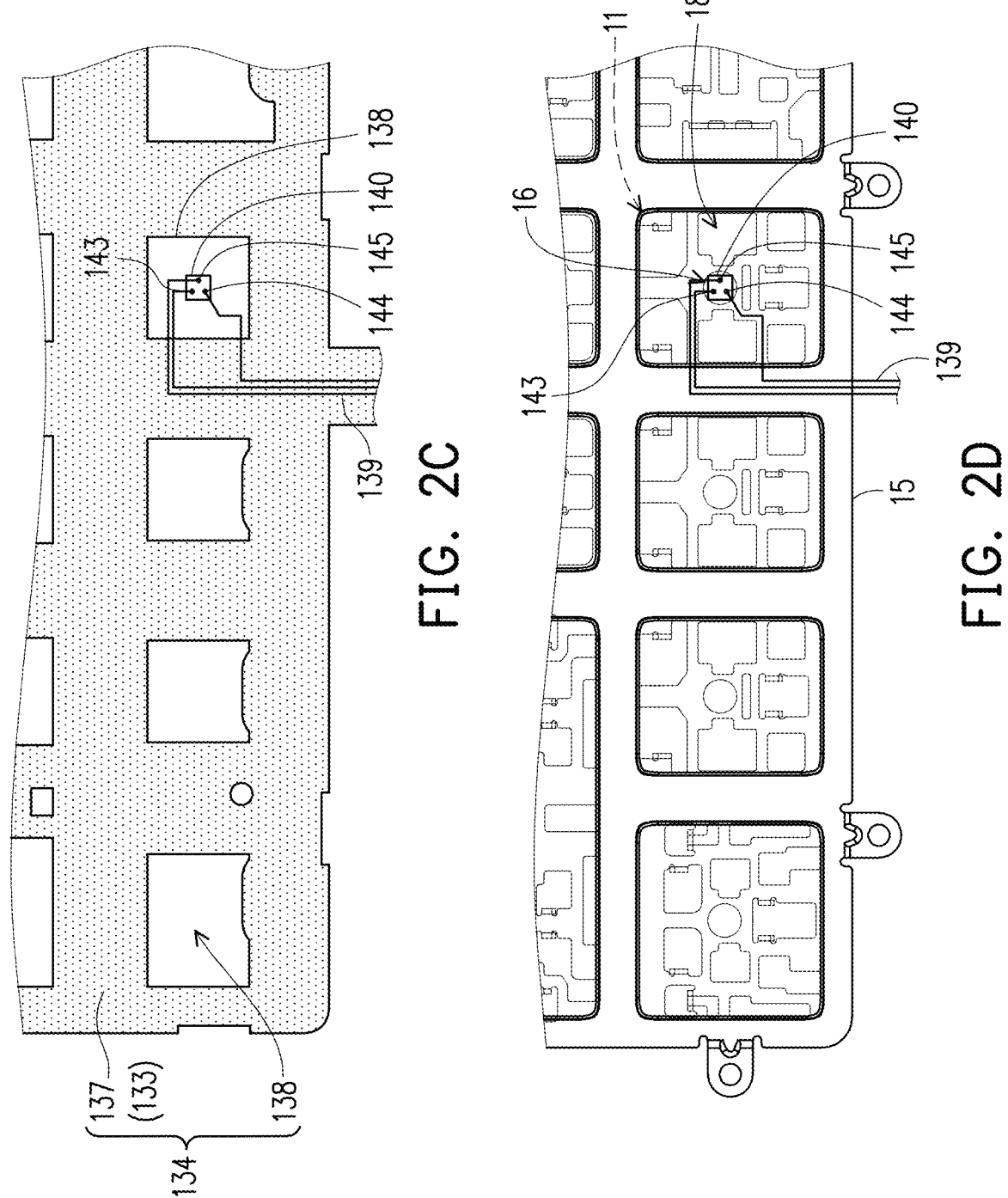
FIG. 2C is a partial view of the composite light-emitting layer of the backlight module of FIG. 2A.
FIG. 2D is a diagram showing the positional relationship between a first light source, a first circuit, and a bracket of a button structure of the backlight module of FIG. 2A.

FIG. 2C is a partial view of the composite light-emitting layer of the backlight module of FIG. 2A. FIG. 2D is a diagram showing the positional relationship between a first light source, a first circuit, and a bracket of a button structure of the backlight module of FIG. 2A. Referring to FIG. 2C, the first light source 140 corresponding to the single button structure is located at a position corresponding to the light-transmitting region 138, and the first circuit 139 coupled to the first light source 140 is distributed along the light-shielding pattern 133 on the light-shielding plate 134. Referring to FIG. 2D, in the present embodiment, the first light source 140 is located within the range corresponding to the opening 16 of the bracket 15 and corresponding to the light-transmitting portion 11a of the keycap 11. The majority of the first circuit 139 is located at a position outside the projection of the keycap 11, while a portion of the first circuit 139 under the keycap 11 is arranged at a position corresponding to the bracket 15 where the openings 16 and 18 are not formed (i.e., the non-opening region of the bracket 15). Thus, the layout of the first circuit 139 may be hidden under the bracket 15. Since the first circuit 139 of the composite light-emitting layer 130a is arranged corresponding to the main body of the bracket 15 to avoid the openings 16 and 18, the first circuit 139, for the user, could be invisible through the light-transmitting region 138 and barely impact the optical effects.

As shown in FIG. 2C and FIG. 2D, the first light source 140 may include a plurality of light-emitting diodes 143, 144, and 145. In an embodiment, the light-emitting diodes 143, 144, and 145 emit light of different wavelengths, such as red, green, and blue, but are not limited thereto. The light-emitting diodes 143, 144, and 145 are respectively connected to three separate circuit layouts (collectively referred to as the first circuit 139), such that the light-emitting states of the light-emitting diodes 143, 144, and 145 may be individually and independently controlled, thus achieving combinations of single-color light emission or mixed light emission. That is, a plurality of light-emitting diodes having different colors (collectively referred to as the first light source 140) are disposed under a single button, and the keycap 11 could exhibit various backlighting effects.

Figure 3:
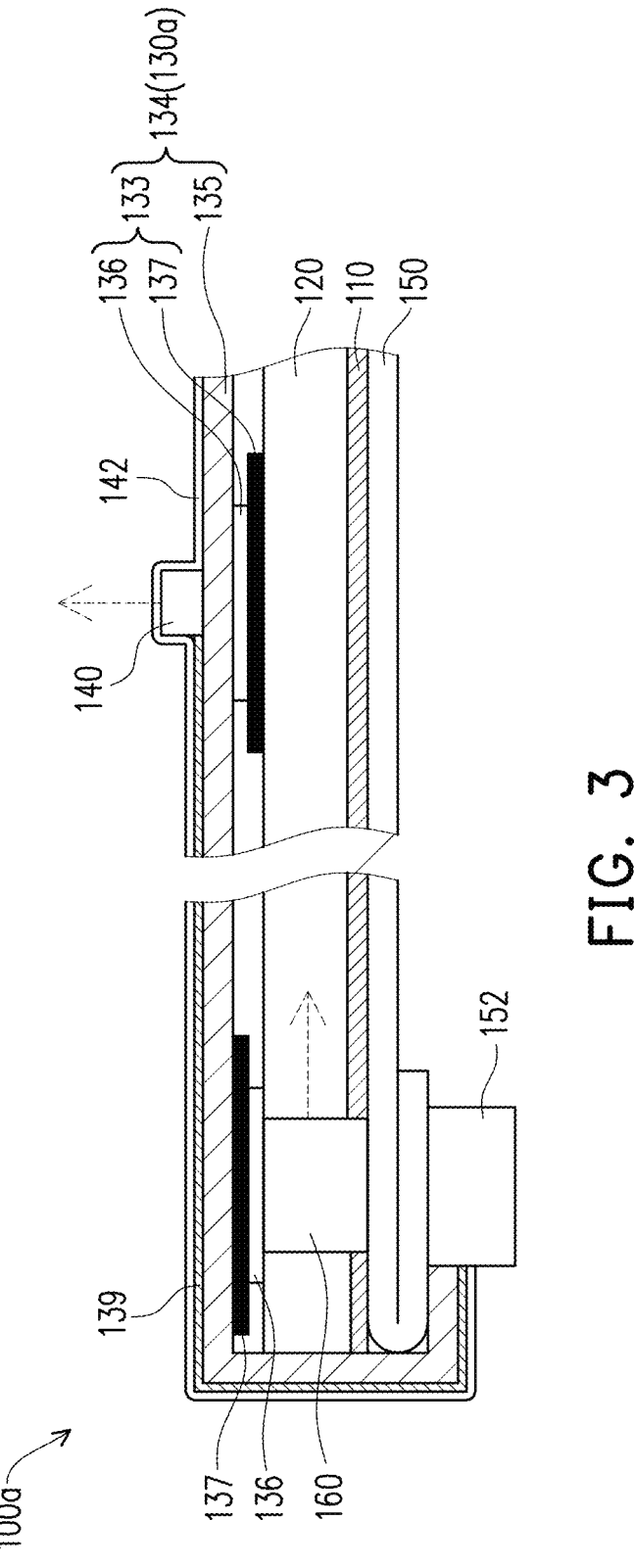
FIG. 3 is a partial cross-sectional view of a backlight module according to another embodiment of the invention.

FIG. 3 is a partial cross-sectional view of a backlight module according to another embodiment of the invention. Referring to FIG. 3, the major difference between a backlight module 100b of FIG. 3 and the backlight module 100a of FIG. 2B is that, in the present embodiment, the first circuit 139 is connected to the circuit board 150 via a connector 152. The film 135 and the first circuit 139 thereon may be easily inserted into the connector 152 coupled to the circuit layout of the circuit board 150 at the end 132 of the composite light-emitting layer 130a to be electrically connected to the circuit board 150. It should be noted that the circuit board 150, as depicted in FIG. 3, is a single-layer circuit board, and the connector 152 is disposed under the circuit board 150 in a folding manner to connect the end 132 of the first circuit 139. In other embodiments, the circuit board 150 may be a double-layer circuit board, and the connector 152 may be directly mounted on the lower surface of the circuit board 150 without folding the circuit board 150.

Figure 4A:
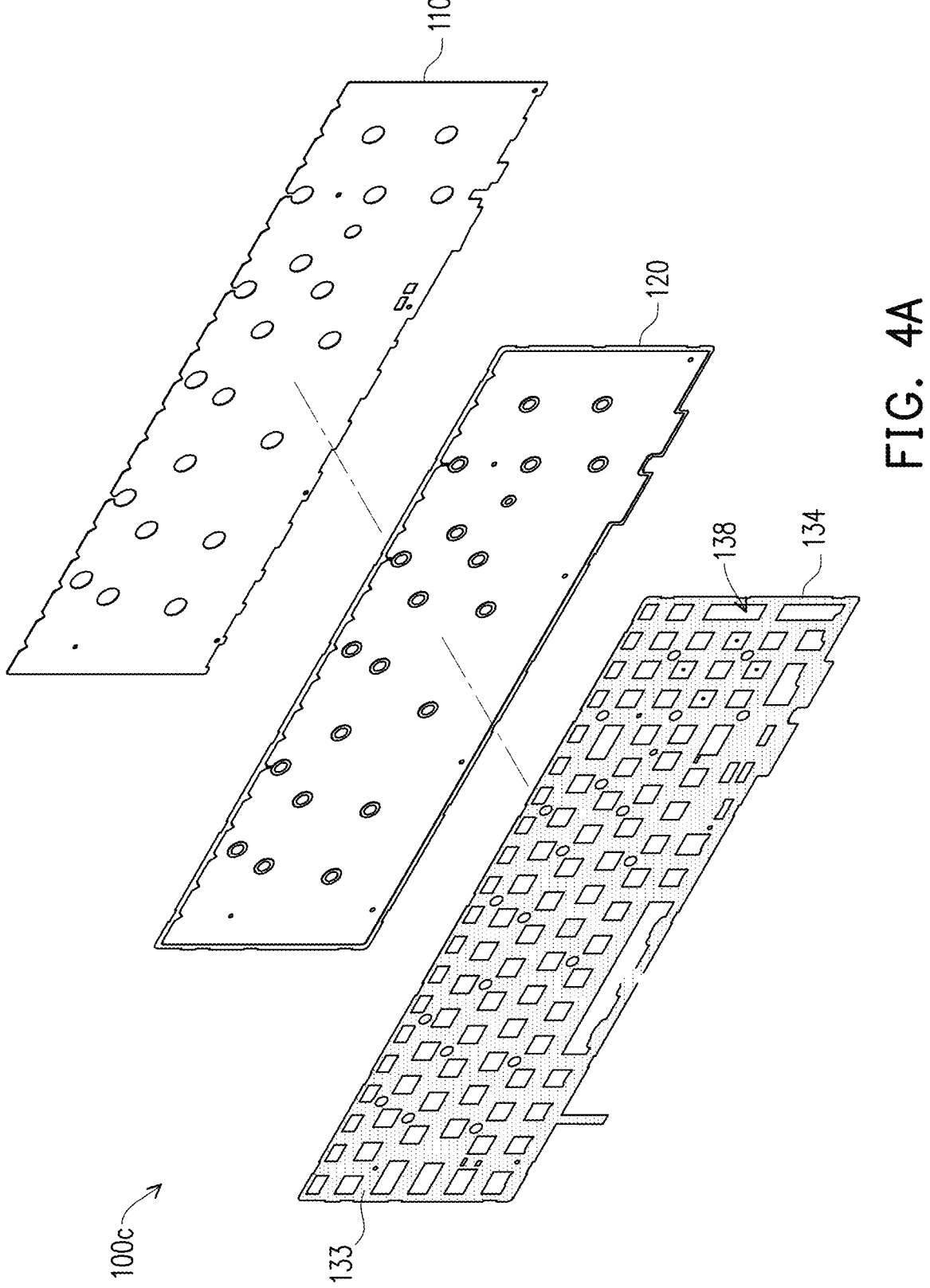
FIG. 4A is an exploded view of a backlight module according to another embodiment of the invention.
Figure 4B:
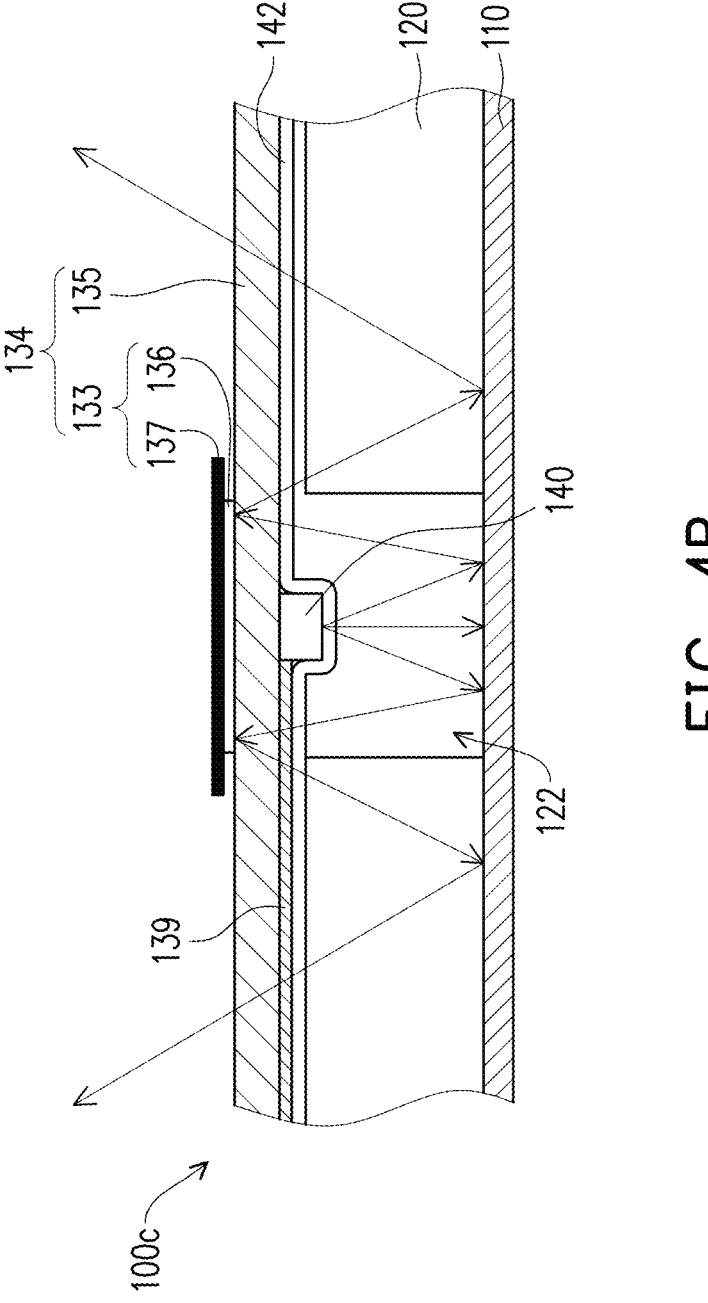
FIG. 4B is a partial cross-sectional view of the backlight module of FIG. 4A.

FIG. 4A is an exploded view of a backlight module according to another embodiment of the invention. FIG. 4B is a partial cross-sectional view of the backlight module of FIG. 4A. Referring to FIG. 4A and FIG. 4B, in the present embodiment, the first light source 140 and the light guide plate 120 of a backlight module 100*c* are located on the same side of the light-transmitting substrate (i.e., the film 135). The light guide plate 120 has a hole 122, and the first light source 140 is disposed on the surface of the light-shielding plate 134 facing the light-reflecting plate 110 and corresponding to the hole 122. The first light source 140 could be arranged in the hole 122 or disposed on the periphery of the hole 122. The light emitted by the first light source 140 is adapted to enter the light guide plate 120, be reflected by the light-reflecting plate 110, and then be emitted through the light-transmitting region 138. In addition, the first light source 140 on the light-shielding plate 134 is disposed at a position corresponding to the light-shielding pattern 133, such that the light of the first light source 140 could be reflected back into the light guide plate 120 by the light-reflecting coating 136 and be uniformly distributed over the entire light guide plate 120, and leakage from the light-shielding coating 137 may be prevented as well.

In the present embodiment, light emission toward the light guide plate 120 by the side-view light source may be achieved by the first circuit 139 and the first light source 140 disposed on the light-shielding plate 134, so as to obtain the light path similar to the second light source 160 shown in FIG. 2A and FIG. 2B. Therefore, the flexible circuit board 150 and the second light source 160 of FIG. 2A and FIG. 2B are not required for the backlight module 100*c* of the present embodiment, thereby reducing the thickness thereof. That is to say, the first light source 140 of the present embodiment does not function as independent backlighting for a single button, but replaces the side-view light source to make the light emitted by the first light source 140 enter the light guide plate 120, such that a backlighting effect with uniform and even brightness could be obtained via the first light source 140.

Figure 4C:
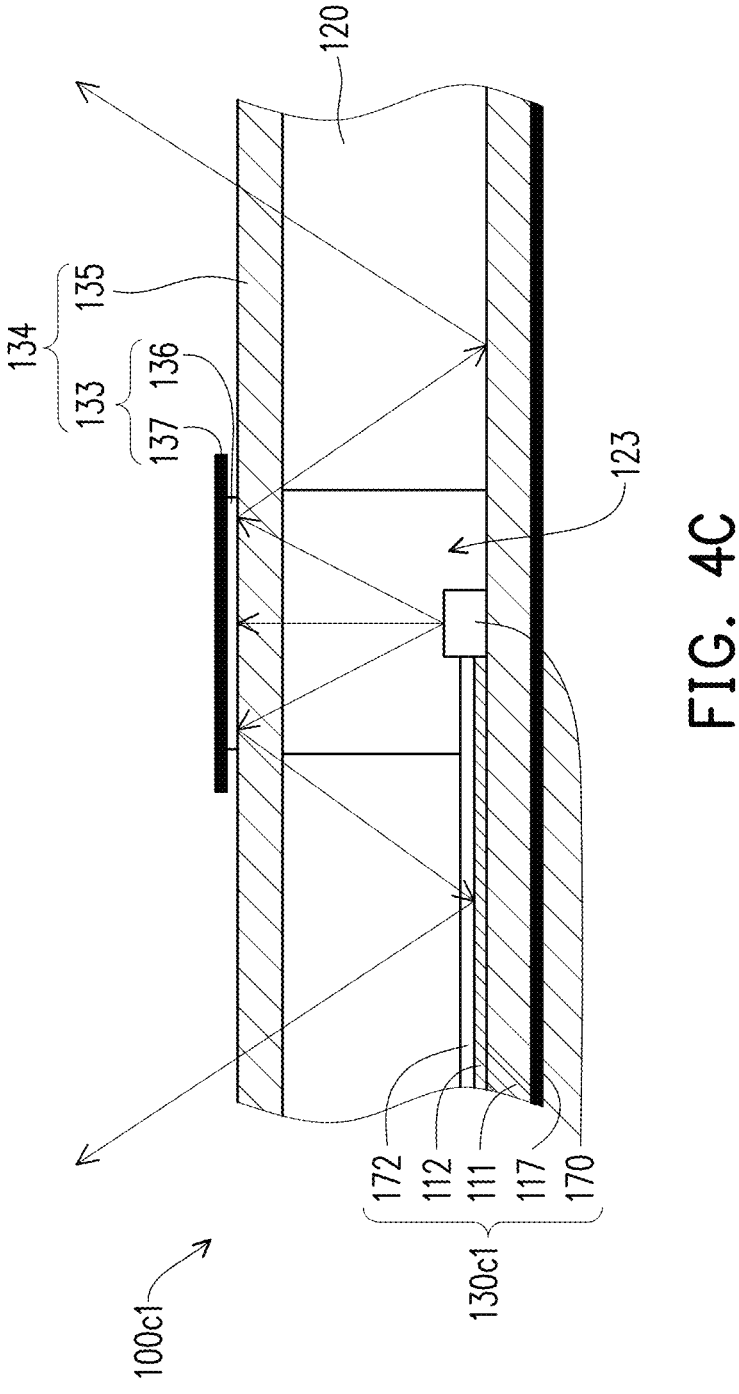
FIG. 4C is a cross-sectional view of another portion of the backlight module of FIG. 4A.

FIG. 4C is a partial cross-sectional view of a backlight module according to another embodiment of the invention. Referring to FIG. 4C, in the present embodiment, a composite light-emitting layer 130*c*1 of a backlight module 100*c*1 is disposed under the light guide plate 120 and may be used as a light-reflecting plate of the backlight module 100*c*1. Since the bracket of the button structure is disposed above the backlight module 100*c*1, the light guide plate 120 is disposed between the bracket and the composite light-emitting layer 130*c*1. The light-shielding plate 134 may be further disposed above the light guide plate 120. The light emitted by the composite light-emitting layer 130*c*1 under the light guide plate 120 is adapted to enter the interior of the light guide plate 120 and to be distributed over the light guide plate 120, until the light is emitted out from the top surface of the light guide plate 120 not covered by the light-shielding coating 137 and emitted toward the button structure.

The composite light-emitting layer 130*c*1 includes a light-transmitting substrate 111, and a first circuit 112, a first light source 170, and a first passivation layer 172 disposed on the light-transmitting substrate 111. The first light source 170 is electrically connected to the first circuit 112. The first circuit 112, the first light source 170, and the light guide plate 120 are located on the same side (such as the upper surface) of the light-transmitting substrate 111. The light guide plate 120 has a hole 123, and the first light source 170 on the light-transmitting substrate 111 is disposed at a position corresponding to the hole 123. In an embodiment, the first light source 170 is arranged in the hole 123 or is located on the periphery of the hole 123. The first passivation layer 172 covers the first circuit 112 to prevent the damaged circuit pattern for the first light source 170. The first passivation layer 172 may be a light-reflecting coating (such as white paint) or a light-reflecting polymer film, which could reflect light back into the light guide plate 120 and prevent the first circuit 112 layout from affecting the optical effects of the backlight module 100*c*1.

The first light source 170 is, for example, exposed outside the first passivation layer 172 to prevent the first passivation layer 172 from shading the light emitted from the first light source 170 and interfering the light coupling of the light guide plate 120. In addition, the lower surface of the light-transmitting substrate 111 is provided with a light-shielding coating 117 as a light-shielding pattern of the composite light-emitting layer 130*c*1. The light-shielding coating 117 and the first light source 170 are located on opposite sides of the light-transmitting substrate 111. The light-shielding coating 117 is, for example, fully coated on the lower surface of the light-transmitting substrate 111 to prevent the light leakage from the bottom of the composite light-emitting layer 130*c*1. That is, the reflective first passivation layer 172 is arranged at the top of the composite light-emitting layer 130*c*1, and the light-shielding coating 117 (i.e., a light-shielding pattern) is arranged at the bottom thereof. Thus, the composite light-emitting layer 130*c*1 may be used as a light-reflecting plate of the backlight module 100*c*1 while providing a light-emitting function.

Figure 5:
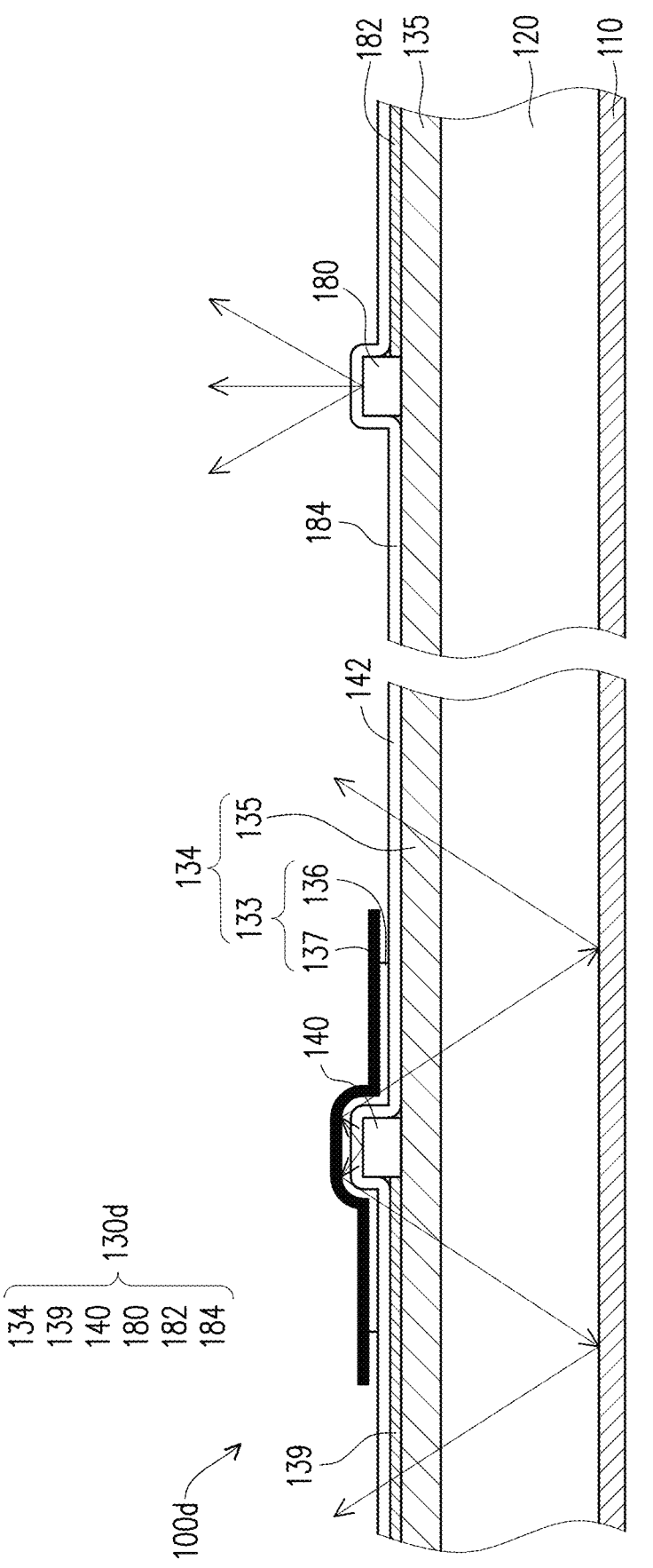
FIG. 5 to FIG. 7 are partial cross-sectional views of various backlight modules according to other embodiments of the invention.
Figure 6:
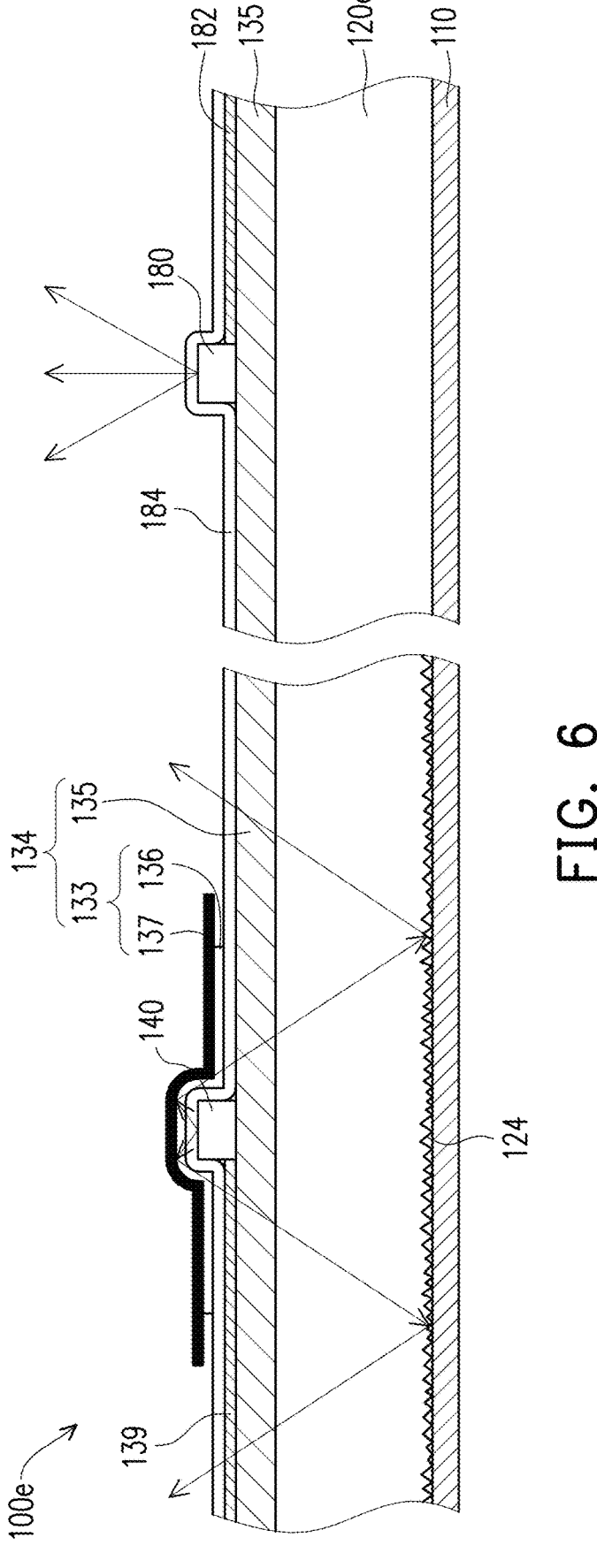
Figure 7:
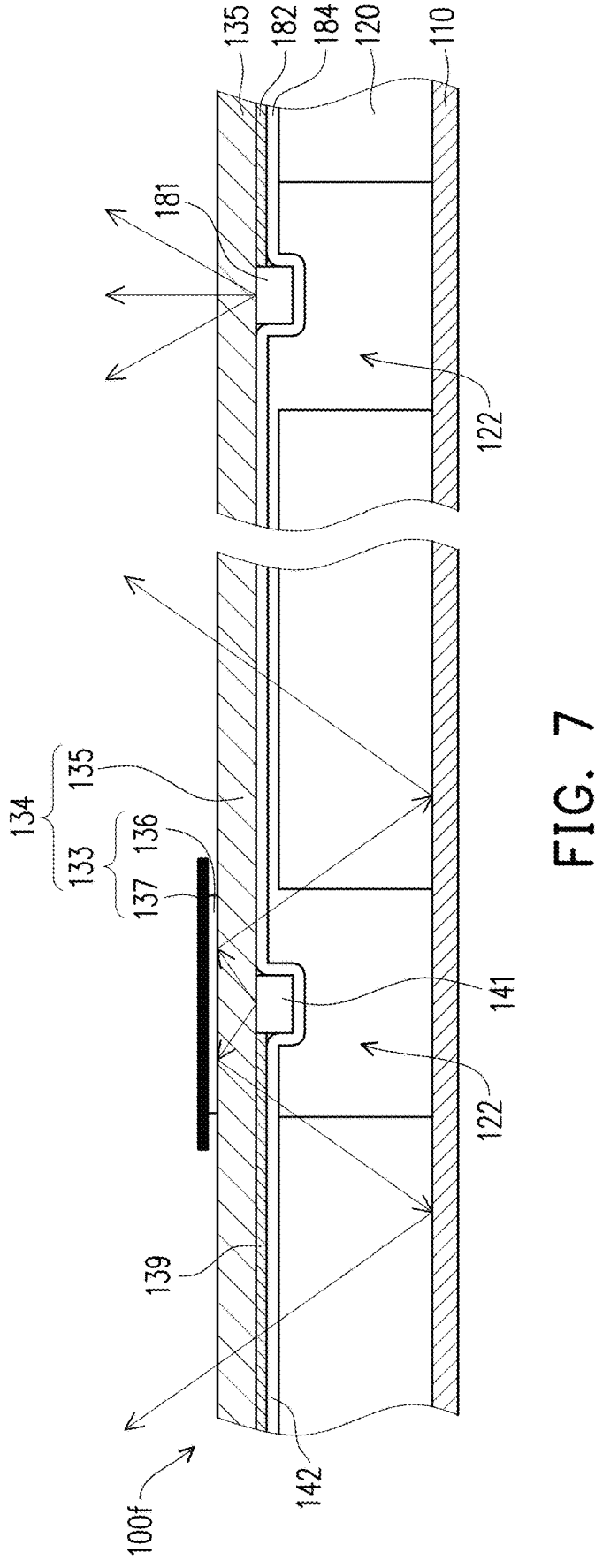

The above embodiments are described with the composite light-emitting layer separately providing the function of top-view light source or side-view light source; however, in other embodiments of the invention, both kinds of the light sources may be integrated into a single composite light-emitting layer. FIG. 5 to FIG. 7 are partial cross-sectional views of various backlight modules according to other embodiments of the invention. Similarly, the button structure is not shown in the following drawings, but it should be understood that the backlight modules below are disposed under the button structure to provide a backlit button. The same or similar components as the previous embodiments are represented by the same reference numerals in the following embodiments.

Referring first to FIG. 5, in a backlight module 100*d* of the present embodiment, a composite light-emitting layer 130*d* includes the film 135, and the first circuit 139, the first light source 140, and the first passivation layer 142 disposed on the film 135. The composite light-emitting layer 130*d* further includes a second light source 180, a second circuit 182, and a second passivation layer 184. In the present embodiment, the film 135 is a light-transmitting substrate, and the first circuit 139, the first light source 140, the second circuit 182, and the second light source 180 are disposed on the same side surface of the light-transmitting substrate (the film 135), and the light source 140 and the second light source 180 are electrically connected to the first circuit 139 and the second circuit 182, respectively. Similar to the first passivation layer 142 covering the first circuit 139, the second passivation layer 184 covers the second circuit 182, such that at least a portion of the second circuit 185 is located between the second passivation layer 184 and the light-transmitting substrate (the film 135) to avoid damage to the circuit layout. The first light source 140 and the second light source 180 are located on the same side of the light-transmitting substrate (the film 135). The first circuit 139 and the second circuit 182 may be formed simultaneously on the film 135, and the first passivation layer 142 and the second passivation layer 184 could be disposed on the first circuit 139 and the second circuit 182 in a single step. Therefore, the first circuit 139 and the second circuit 182 may be made of the same material, and the first passivation layer 142 and the second passivation layer 184 may be the same film covering the different regions.

The first light source 140 and the second light source 180 are disposed on the surface of the film 135 that is distal to the light guide plate 120 (i.e., the upper surface of the film 135). The light-reflecting coating 136 and the light-shielding coating 137 that are collectively used as the light-shielding pattern are disposed above the first light source 140, for example. The light emitted by the first light source 140 is emitted upward and then reflected by the light-reflecting coating 136 so as to enter the light guide plate 120 and be reflected again by the reflective plate 110, until the light is emitted out from a portion of the light guide plate 120 not shaded by the light-shielding coating 137, thereby obtaining the uniform light emission over the backlight module 100*d*. Since the upper portion of the second light source 180 is not shaded, the emitted light could directly travel toward a direction opposite to the light guide plate 120, thereby upward illuminating a single button. The first light source 140 is adapted to emit light toward the light guide plate 120 to provide an overall backlighting with uniformity for replacing the side-view light source; the second light source 180 is used as a top-view light source for providing independent and localized backlighting for special buttons (e.g., hot keys). The second light source 180 may include a plurality of light-emitting diodes (not shown) that emit light having different wavelengths to achieve a combination of light emission with various colors. In addition, the film 135 may further have a light-shielding pattern under the second light source 180 to further prevent the light of the second light source 180 from entering the light guide plate 120 and affecting the colored light mixing. In this way, the backlight module 100*d* disposed under the button structure could deliver the even and uniform backlighting to the entire keyboard and provide a specific button with the directional backlighting via the composite light-emitting layer 130*d*, thereby exhibiting various backlighting effects.

Referring to FIG. 6, the major difference between a backlight module 100*e* of FIG. 6 and the backlight module 100*d* of FIG. 5 is that, in the present embodiment, a light guide plate 120*e* further has a plurality of microstructures 124. In detail, the microstructures 124 are separated from each other, and could be arranged on the surface of the light guide plate 120*e* away from the first light source 140 and corresponding to the first light source 140, such that the optical path could be for changed to uniformly distribute the light and to directionally correct the optical effect. In an embodiment, the microstructures 124 of the light guide plate 120*e* are concave-convex microstructures having a contour, for example, of a concave prism, an annular V groove, a dot, a column, a cone, a pyramid, or a combination of the above, thereby enabling the increased light refraction or scattering to take place on the lower surface of the light guide plate 120*e* to change the transmission direction of the light and distribute the light uniformly. The microstructures 124 could be disposed on the lower surface of the light guide plate 120*e* only at a position corresponding to the first light source 140, or could be disposed on the entire lower surface of the light guide plate 120*e*. In addition, the microstructures 124 of the light guide plate 120*e* may be disposed at a position corresponding to the light-transmitting character portion of the keycap, such the microstructures 124 are, for example, distributed under the opening of the bracket of the button structure to adjust the exit angle of the light, thereby illuminating the rear side of the keycap through the opening of the bracket.

Referring to FIG. 7, the major difference between a backlight module 100*f* of FIG. 7 and the backlight module 100*d* of FIG. 5 is that, in the present embodiment, the first light source 141 and the second light source 181 of the backlight module 100*f* are disposed on the surface of the light-shielding plate 134 facing toward the light-reflecting plate 110. That is, the first light source 141, the second light source 181, and the light guide plate 120 are located on the same side of the light-shielding plate 134. The first light source 141 and the second light source 181 are disposed on the lower surface of the film 135. The light guide plate 120 has the holes 122, and the first light source 141 and the second light source 181 are disposed at the positions corresponding to the holes 122. For example, the first light source 141 and the second light source 181 are configured into the holes 122, or located on the periphery of the holes 122, so that the upper surface of the film 135 of the light-shielding plate 134 could be flat without protrusions caused by the light sources. The light-reflecting coating 136 and the light-shielding coating 137 are disposed above the first light source 141. Similarly, the light emitted by the first light source 141 is emitted upward and then reflected by the light-reflecting coating 136 to enter the light guide plate 120, and then is reflected by the reflective plate 110 again, until the light is extracted out of the light guide plate 120, thereby providing the uniform illumination. The second light source 181 that is not shaded emits the light directly and toward a direction opposite to the light-reflecting plate 110, so as to achieve the directional and independent backlighting effect for a specific button.

Figure 8:
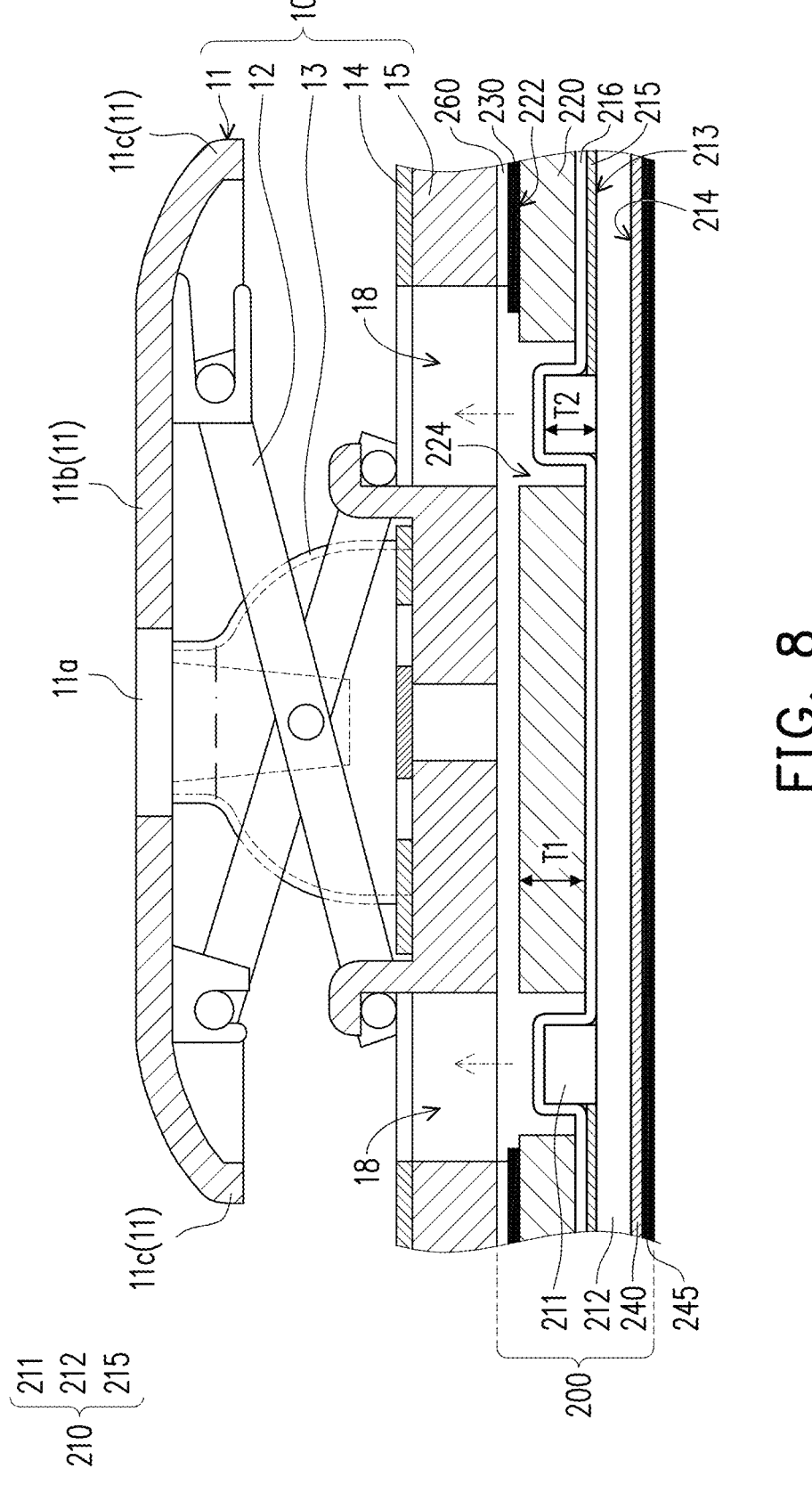
FIG. 8 is a partial cross-sectional view of the button structure with a backlight module according to another embodiment of the invention.

FIG. 8 is a partial cross-sectional view of the button structure with a backlight module according to another embodiment of the invention. Referring to FIG. 8, in the embodiment, the button structure 10 of the light-emitting keyboard 5 (marked in FIG. 1A) includes a bracket 15 with at least one opening 18, a keycap 11, a support assembly 12 and a circuit layer 14. The keycap 11 is connected to the bracket 15 via the support assembly 12. The circuit layer 14 is disposed between the keycap 11 and the bracket 15. A backlight module 200 is disposed under the bracket 15.

In the embodiment, the backlight module 200 includes a composite light-emitting layer 210 and a spacing layer 220. The composite light-emitting layer 210 includes a substrate 212, at least one light source 211 and at least one circuit 215. The substrate 212 may be a light-transmitting substrate, which is, for example, a PET substrate, but material of the substrate 212 is not limited thereto. However, in other embodiments, the substrate 212 can be a light-shielding substrate, it is not limited thereto.

The at least one light source 211 is disposed on an upper surface 213 of the substrate 212 and located under the keycap 11. In addition, the light source 211 functions as, for example, a top-view light source 211 such that light emitted from the light source 211 is transmitted upwardly to the light-transmitting portion 11*a* of the keycap 11. In some embodiment, the light source 211 may be a chip-scale packaged LED or mini LED or micro LED.

Moreover, the at least one circuit 215 is disposed on the upper surface 213 of the substrate 212 and electrically connected to the at least one light source 211. In some embodiments, two light sources 211 which are respectively coupled to the circuits 215 are arranged on the substrate 212. Certainly, in other embodiments, the number of the light source 211 can be one or more than two, which is not limited thereto.

As shown in FIG. 8, in the embodiment, the backlight module 200 further includes a passivation layer 216. The passivation layer 216 is disposed on the upper surface 213 of the substrate 212 and covers the circuit 215 and the light source 211, such that at least a portion of the light source 211 and the circuit 215 are located between the passivation layer 216 and the substrate 212 so as to protect both of the circuit 215 and the light source 211, thereby preventing an open circuit or a short circuit caused by the damaged circuit on the substrate 212. The passivation layer 216 is, for example, a flexible polymer film having a thickness less than the thickness of the substrate 212.

The spacing layer 220 is disposed between the composite light-emitting layer 210 and the bracket 15, wherein the spacing layer 220 includes at least one hole 224 corresponding to the at least one light source 211 and the at least one opening 18 of the bracket 15. The number of the hole 224 is, for example but not limited thereto, equal to that of the light source 211; that is, the spacing layer 220 may have two holes 224. The light sources 211 are located in the holes 224 of the spacing layer 220.

As compared with the conventional backlight module which has the side-view light source coupled to the FPC and retained in the connecting hole of the stacked light guide plate and the reflective plate from the rear side thereof, the light source 211 of the backlight module 200 is the top-view light source such that the conventional light guide plate and the through hole of the reflective plate are not required, and the thickness of the backlight module 200 can be reduced and the optical effect can be enhanced as well.

In the embodiment, an orthographic projection of the elastic body 13 projected onto the substrate 212 is not overlapped with an orthographic projection of the light source 211 projected onto the substrate 212. In other words, the light source 211 is not located directly under the elastic body 13, but could be arranged beneath the support assembly 12. In order to prevent the light source 211 being hit by the support assembly 12 (scissor-like mechanism) when the keycap 11 is pressed downwardly, the spacing layer 220 is disposed between the substrate 212 and the bracket 15. Due to the spacing layer 220, a distance between the substrate 212 and the bracket 15 becomes greater, such that the light source 211 does not protrude from a top surface of the bracket 15. Therefore, the possibility that the light source 211 is hit by the support assembly 12 when the keycap 11 is pressed downwardly can be reduced.

Specifically, the top surface of the spacing layer 220 is higher than the top surface of the light source 211. In an embodiment, a thickness T1 of the spacing layer 220 is greater than or equal to a thickness T2 of the light source 211, such that the light source 211 does not protrude from a top surface 222 of the spacing layer 220 and does not extend into the opening 18 of the bracket 15. However, the thicknesses T1 and T2 of the spacing layer 220 and the light source 211 are not limited thereto.

Moreover, in the embodiment, the backlight module 200 further includes a first light-reflecting coating 240 and a first light-shielding coating 245. The first light-reflecting coating 240 is disposed on the entire lower surface 214 of the substrate 212, and the first light-shielding coating 245 is disposed under the first light-reflecting coating 240, so that the first light-reflecting coating 240 is sandwiched between the substrate 212 and the first light-shielding coating 245. A part of light emitted from the light sources 211 and passing through the substrate 212 could be reflected upwardly by the first light-reflecting coating 240, while the first light-shielding coating 245 could prevent the light from leaking from the rear side of the backlight module 200. In an embodiment, the first light-reflecting coating 240 is a white paint, and the first light-shielding coating 245 is a black paint. The colors of the first light-reflecting coating 240 and the first light-shielding coating 245 are not limited to the disclosure.

The backlight module 200 further includes a second light-shielding coating 230 disposed on the top surface 222 of the spacing layer 220 facing to the bracket 15. The second light-shielding coating 230 is a black paint, for example. The backlight module 200 further includes an adhesive layer 260, disposed between the second light-shielding coating 230 and the bracket 15 such that the backlight module 200 can be fixed to the button structure by the adhesive layer 260.

Figure 9:
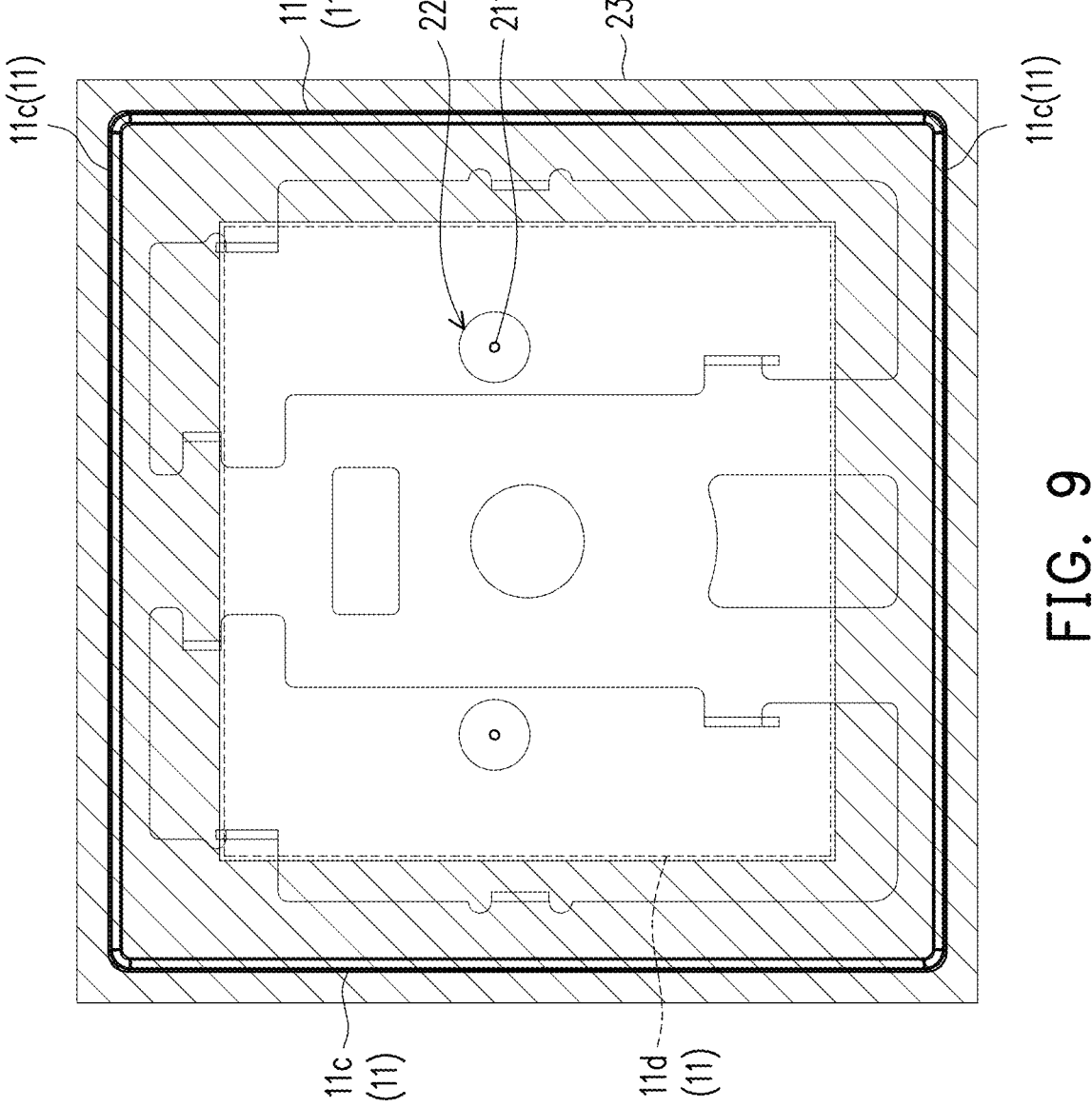
FIG. 9 is a projecting view of the light source, the bracket and the first light-shielding coating projected onto the keycap of FIG. 8.

In addition, as shown in FIG. 8, the keycap 11 includes a bottom plate 11b and a plurality of side plates 11c protruding from the bottom plate 11b. FIG. 9 is a projecting view of the light source, the bracket and the first light-shielding coating projected onto the keycap of FIG. 8. It is noted that a central part 11d (FIG. 9) of the keycap 11 is marked by a dotted line. Referring to FIG. 9, in an embodiment, a shape of the second light-shielding coating 230 is a frame shape, a projection of the light source 211 projected onto the keycap 11 is located within the central part 11d (dotted line zone) of the keycap 11, and a projection of the second light-shielding coating 230 projected onto the keycap 11 is located out of the central part 11d of the keycap 11 and overlaps with the side plates 11c of the keycap 11. Because the second light-shielding coating 230 is located corresponding to a position of edges of the keycap 11, the light emitted from the light source 211 can be shielded by the second light-shielding coating 230 so as to prevent the light leakage from the edge of the keycap 11.

FIG. 10 to FIG. 15 are respectively partial cross-sectional views of the button structure with various backlight modules according to other embodiments of the invention.

Figure 10:
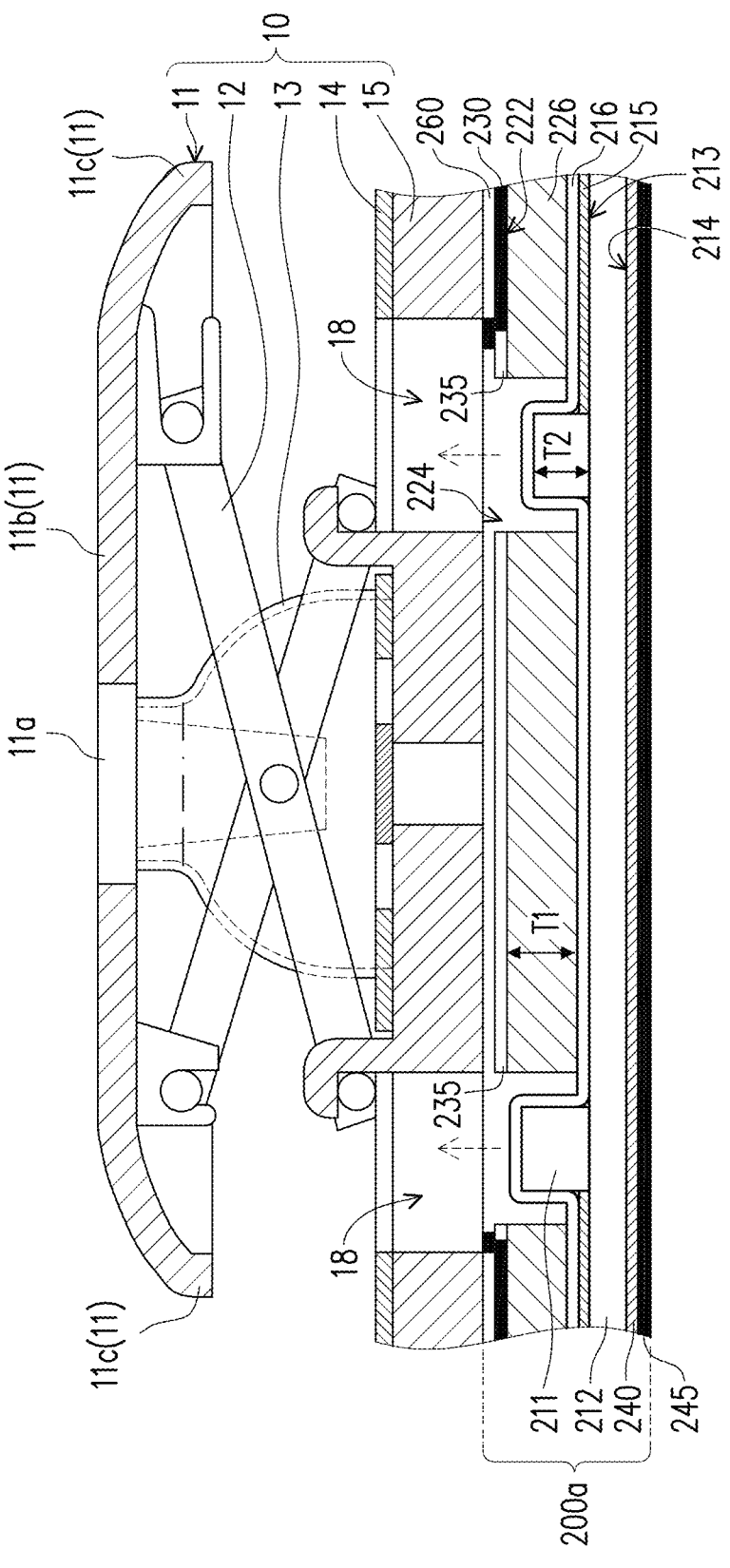
FIG. 10 to FIG. 15 are partial cross-sectional views of the button structure with various backlight modules according to another embodiment of the invention.

Referring FIG. 10, the main difference between the backlight module 200 of FIG. 8 and the backlight module 200a of FIG. 10 is that, in the embodiment, the backlight module 200a further includes a second light-reflecting coating 235. The second light-reflecting coating 235 is disposed on the top surface 222 of the spacing layer 220, a projection of the second light-reflecting coating 235 projected onto the keycap 11 is located within a central part 11d (the dotted line zone shown in FIG. 9) of the keycap 11, so that the second light-reflecting coating 235 could overlap with the bottom plate 11b of the keycap 11 but not overlap with the side plates 11c of the keycap 11 in a direction along the keycap 11 being pressed. The second light-reflecting coating 235 can help for reflecting light emitted from the light source 211 so as to enhance the light emitting efficiency. In addition, the second light-shielding coating 230 is stacked on a portion of the second light-reflecting coating 235 which is close to a position corresponding to the side plates 11c of the keycap 11 so as to prevent the light leakage from the edge of the keycap 11.

Figure 11:
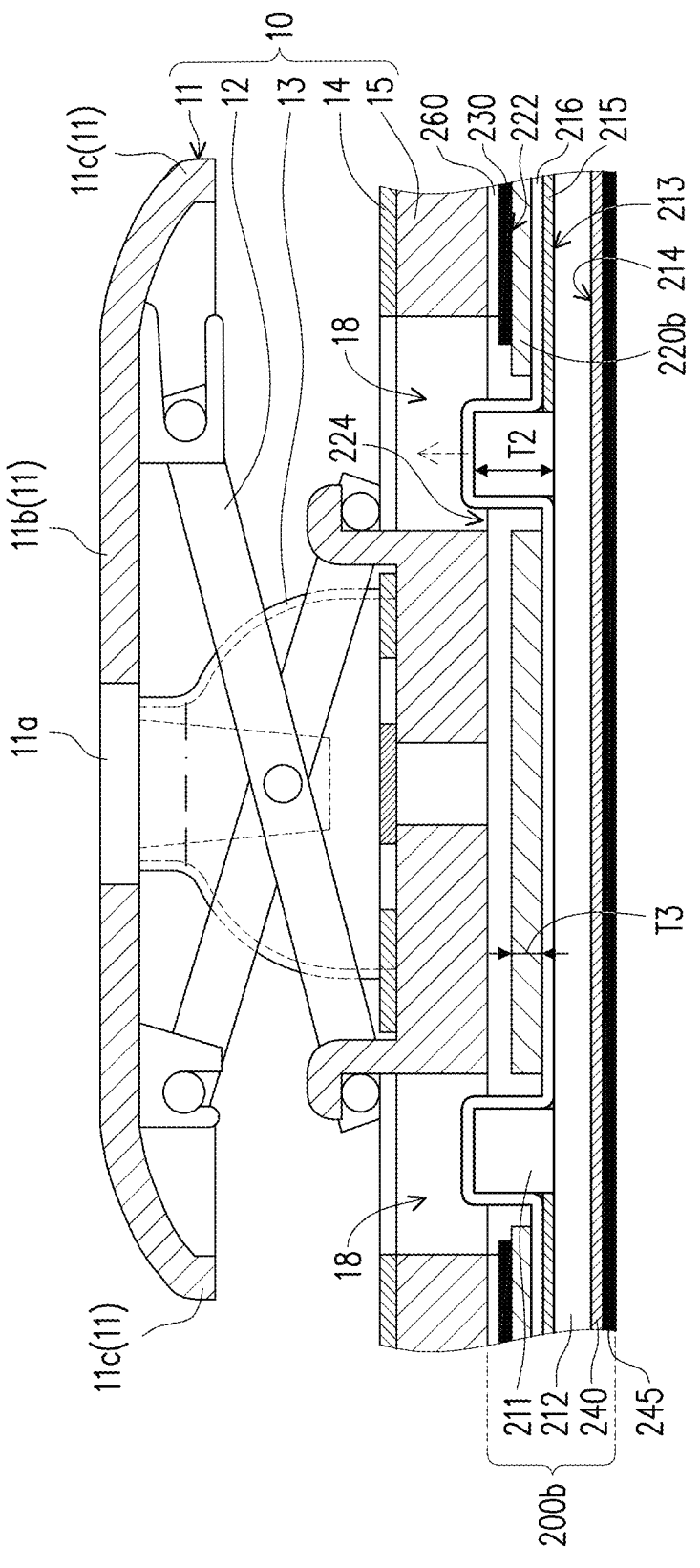

Referring to FIG. 11, the main difference between the backlight module 200 of FIG. 8 and the backlight module 200b of FIG. 11 is that, in the embodiment, a portion of the light source 211 is located within the opening 18 of the bracket 15. A thickness T3 of the spacing layer 220b of the backlight module 200b is, for example, less than the thickness T1 of the light source 211, such that the light source 211 protrudes out of the top surface 222 of the spacing layer 220b and extends into the opening 18 of the bracket 15, while the top surface of the light source 211 is still lower than the top surface of the bracket 15. Accordingly, a portion of the light source 211 is accommodated in the opening 18, and the thickness of the backlight module 200b can be further reduced. In an embodiment, the light source 211 arranged within the opening 18 may not protrude over a half of the thickness of the bracket 15.

Figure 12:
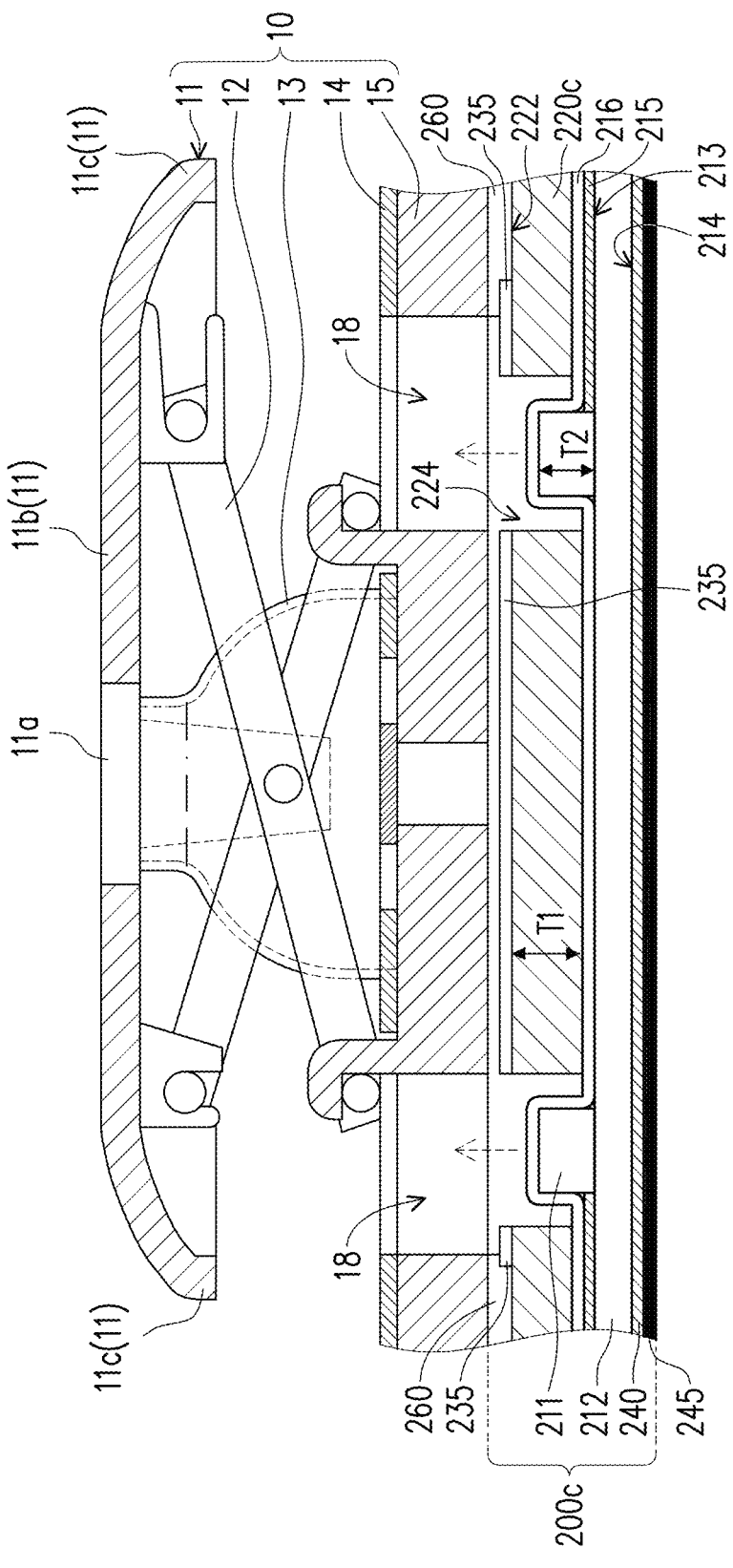

Referring to FIG. 12, the main difference between the backlight module 200 of FIG. 8 and the backlight module 200c of FIG. 12 is that, in the embodiment, the spacing layer 220c of the backlight module 200c is a light-shielding plate, for example, an Mylar plate. The color of the spacing layer 220c is black or dark-colored such that the second light-shielding coating 230 of the backlight module 200 (as elaborated in FIG. 8) is no longer required, such that the overall thickness of the backlight module 200c can be reduced. The second light-reflecting coating 235 is disposed on the top surface 222 of the opaque spacing layer 220c so as to reflect light upwardly. A projection of the second light-reflecting coating 235 projected onto the keycap 11 is located in a central part 11d of the keycap 11. That is, at least a portion of the spacing layer 220c is not covered by the second light-reflecting coating 235.

Figure 13:
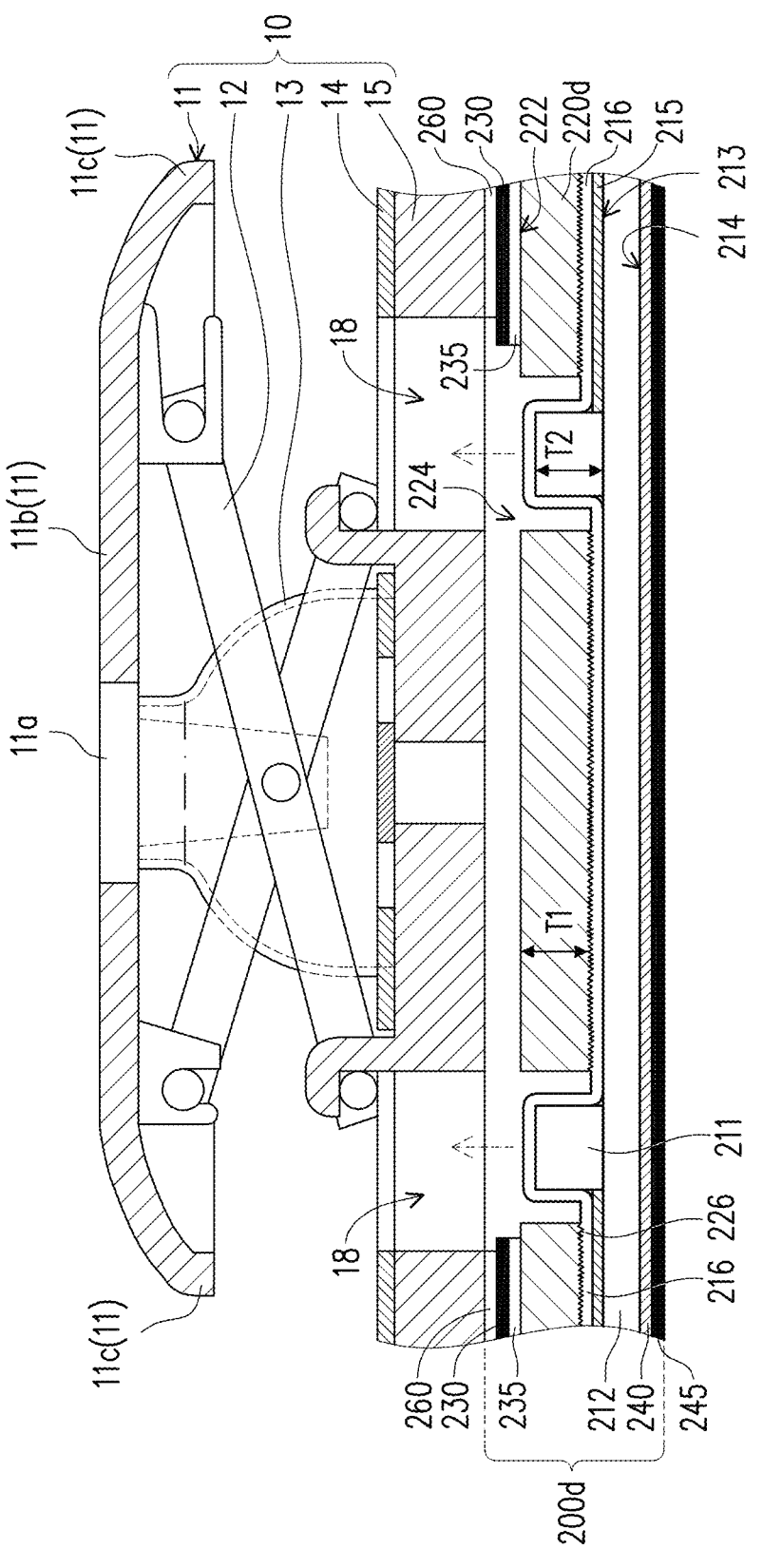

Referring to FIG. 13, the main difference between the backlight module 200 of FIG. 8 and the backlight module 200d of FIG. 13 is that, in the embodiment, the spacing layer 220d of the backlight module 200d is a light guide plate. The second light-reflecting coating 235 is disposed on a portion of the top surface 222 of the spacing layer 220d at positions corresponding to the edges of the keycap 11 (for example, the side plates 11c of the keycap 11), and the second light-shielding coating 230 is stacked on the second light-reflecting coating 235. The other portion (a central portion) of the top surface 222 of the spacing layer 220d corresponding to a position of the central part 11d (i.e., the dotted line zone shown in FIG. 9) of the keycap 11 is exposed without being shielded by the second light-reflecting coating 235 or the second light-shielding coating 230, such that light emitted from the light source 211 is capable of passing through the other portion (the central portion) of the top surface 222 of the spacing layer 220d and emitted upwardly to the keycap 11. In some embodiments, a portion of the second light-reflecting coating 235 close to the light source 211 is not covered by the second light-shielding coating 230; that is, the second light-reflecting coating 235 could partially protrude from an edge of the frame-shaped light-shielding coating 230, thereby enhancing the luminance corresponding to a specified spot.

It is noted that the backlight module 200d further includes a plurality of microstructures 226 arranged on the bottom surface of the spacing layer 220d, such that the optical path of the light emitted from the light source 211 could be modified so as to uniformly distribute the light and to directionally correct the optical effect. In an embodiment, the microstructures 226 are concave or convex microstructures having a contour, for example, of a concave prism, an annular V groove, a dot, a column, a cone, a pyramid, or a combination of the above, thereby enabling the increased light refraction or scattering to take place on the bottom surface of the light guide plate to change the transmission direction of the light and distribute the light uniformly.

Figure 14:
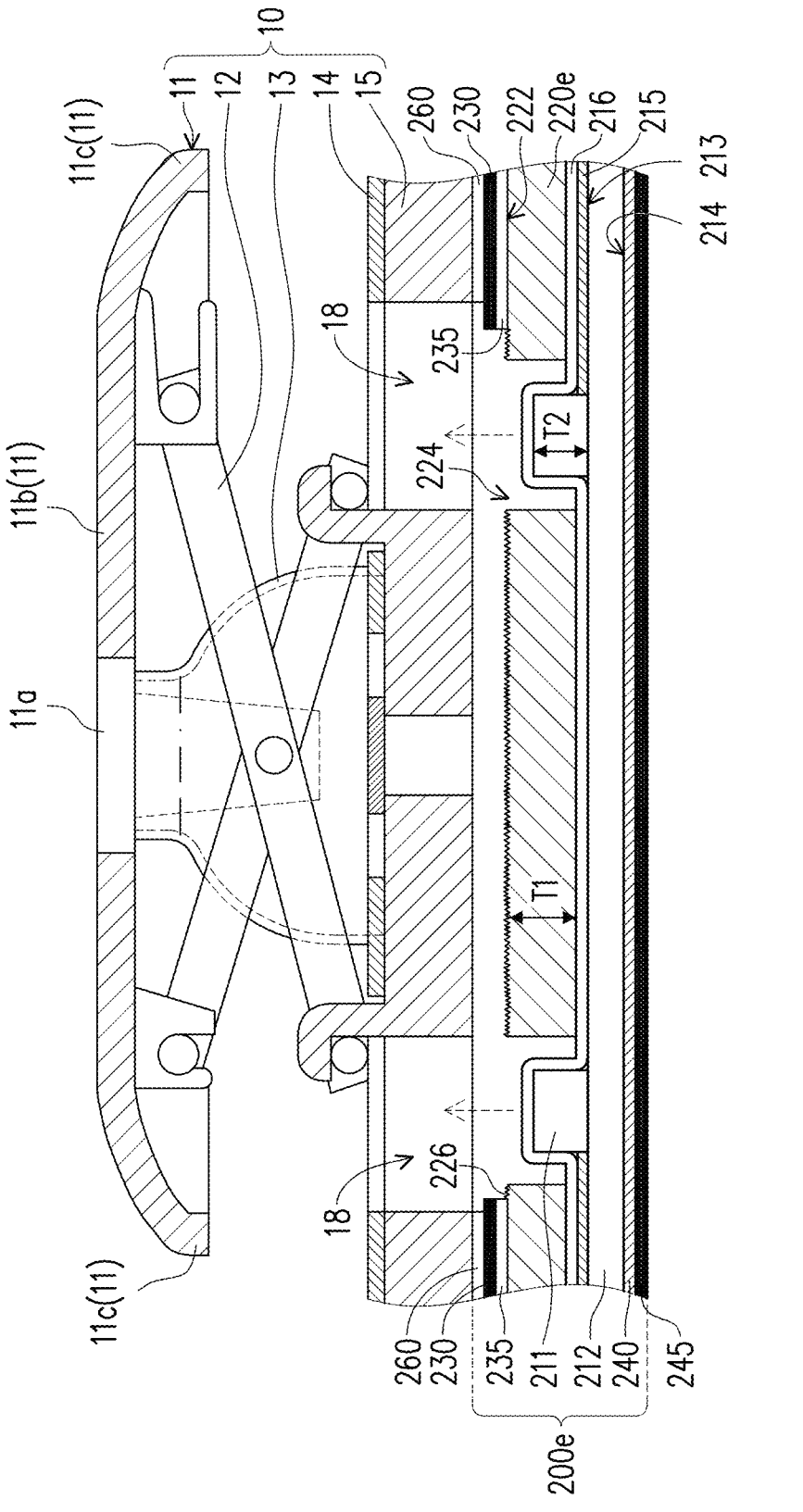

Referring to FIG. 14, the main difference between the backlight module 200d of FIG. 13 and the backlight module 200e of FIG. 14 is that, in the embodiment, the microstructures 226 of the backlight module 200e are arranged on the top surface 222 of the spacing layer 220e. The microstructures 226 are, for example, arranged at the position corresponding to the central part 11d of the keycap 11. Similarly, the optical path of the light emitted from the light source 211 could be modified, so as to uniformly distribute the light and to directionally correct the optical effect.

Figure 15:
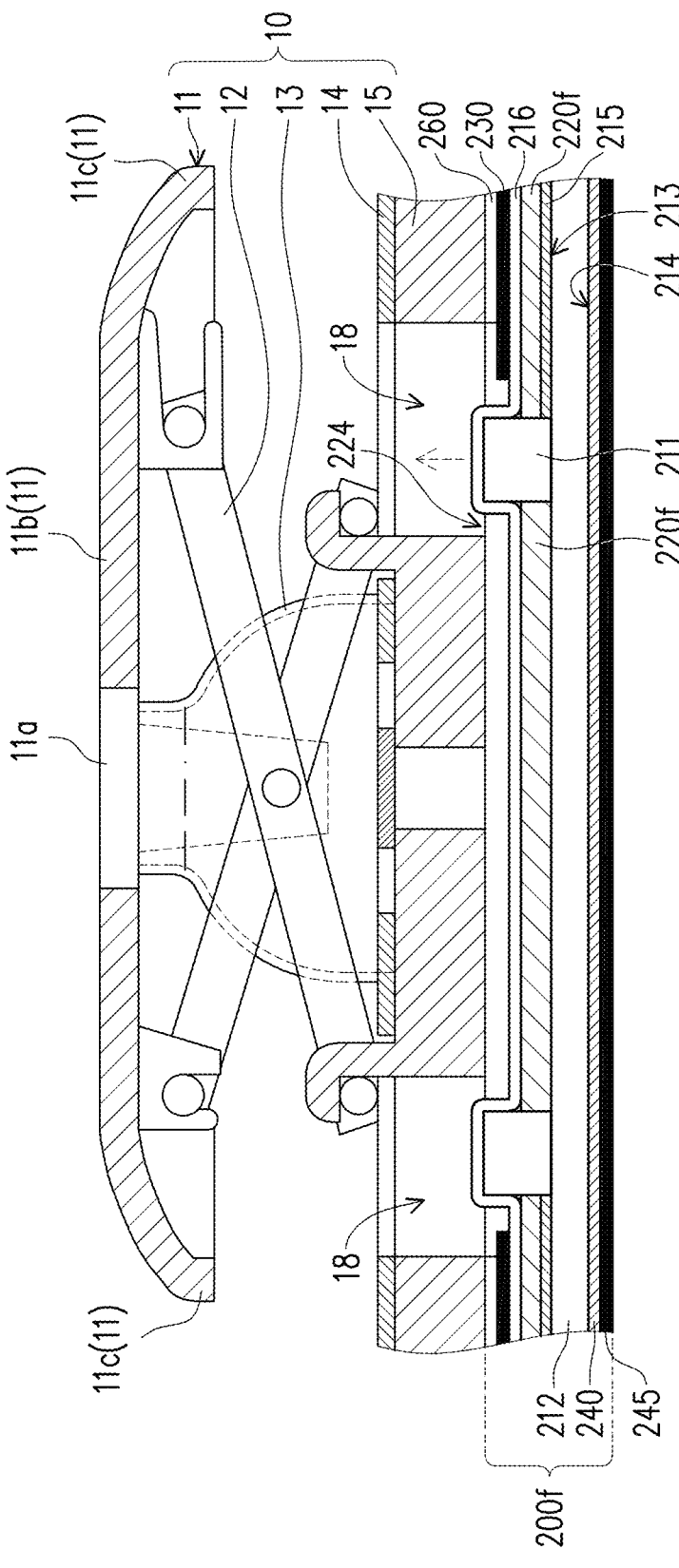

Referring to FIG. 15, the main difference between the backlight module 200b of FIG. 11 and the backlight module 200f of FIG. 15 is that, in the embodiment, the spacing layer 220f is an encapsulation layer made of a transparent or translucent resin, such as epoxy resins or UV inks. The spacing layer 220f could be fabricated by printing or pouring a liquid polymeric material and then curing the material into a solid encapsulation. As shown in FIG. 15, the spacing layer 220f is disposed on the upper surface 213 of the substrate 212 and covers the circuit 215 on the upper surface 213 of the substrate 212 and a lower part of lateral sides of the light source 211, such that the light source 211 can be fixed to the substrate 212 firmly by the spacing layer 220f. In the embodiment, the passivation layer 216 is disposed on the spacing layer 220f and the light source 211, and the light source 211 extends into the opening 18 of the bracket 15. In other embodiments, as the spacing layer 220f further covers the entire light source 211 as well as the circuit 215 for protection, the spacing layer 220f could function as both of the encapsulation layer and the passivation layer, and therefore, the additional passivation layer 216 is not required anymore.

FIG. 16 to FIG. 17 are partial cross-sectional views of various backlight modules according to other embodiments of the invention. Referring to FIG. 16 first, in the embodiment, the backlight module 200g further includes a connection tail 250 that might be coupled to an edge of the composite light-emitting layer 210. The connection tail 250 is partially disposed on the substrate 212 and electrically connected to the circuit 215. The connection tail 250 may include a polymer film with a circuit layer thereon, wherein the circuit layer could be a printed conductive paste or a patterned metal layer, such as printed silver wiring or a patterned copper foil, but it is not limited thereto. In an embodiment, the circuit 215 of the composite light-emitting layer 210 and the circuit layer of the connection tail 250 are made of materials with different conductivities or of different conductors. The circuit layer of the connection tail 250 may face the circuit 215 on the substrate 212, so that the connection tail 250 could be electrically coupled to the circuit 215 through a conductive adhesive 252 (for example, ACF or hotbar soldering) therebetween. The connection tail 250 can extend outwardly to an outer system (not shown) or the power supply (not shown), such that the light source 211 can be electrically connected to the outer system or the power supply through the connection tail 250. In an embodiment, the connection tail 250 can then be inserted into a connector or connected to an external circuit board of another device.

Referring to FIG. 17, in the embodiment, the connection tail 250h of the backlight module 200h is a flexible or foldable connection tail, which could be folded from the upper surface 213 of the substrate 212 to the lower surface 214 of the substrate 212 so as to reduce the dimension of width or length of the backlight module 200h. In that case, the folded connection tail 250h may allow for more flexibility in the design of the backlight module 200h.

Figure 18:
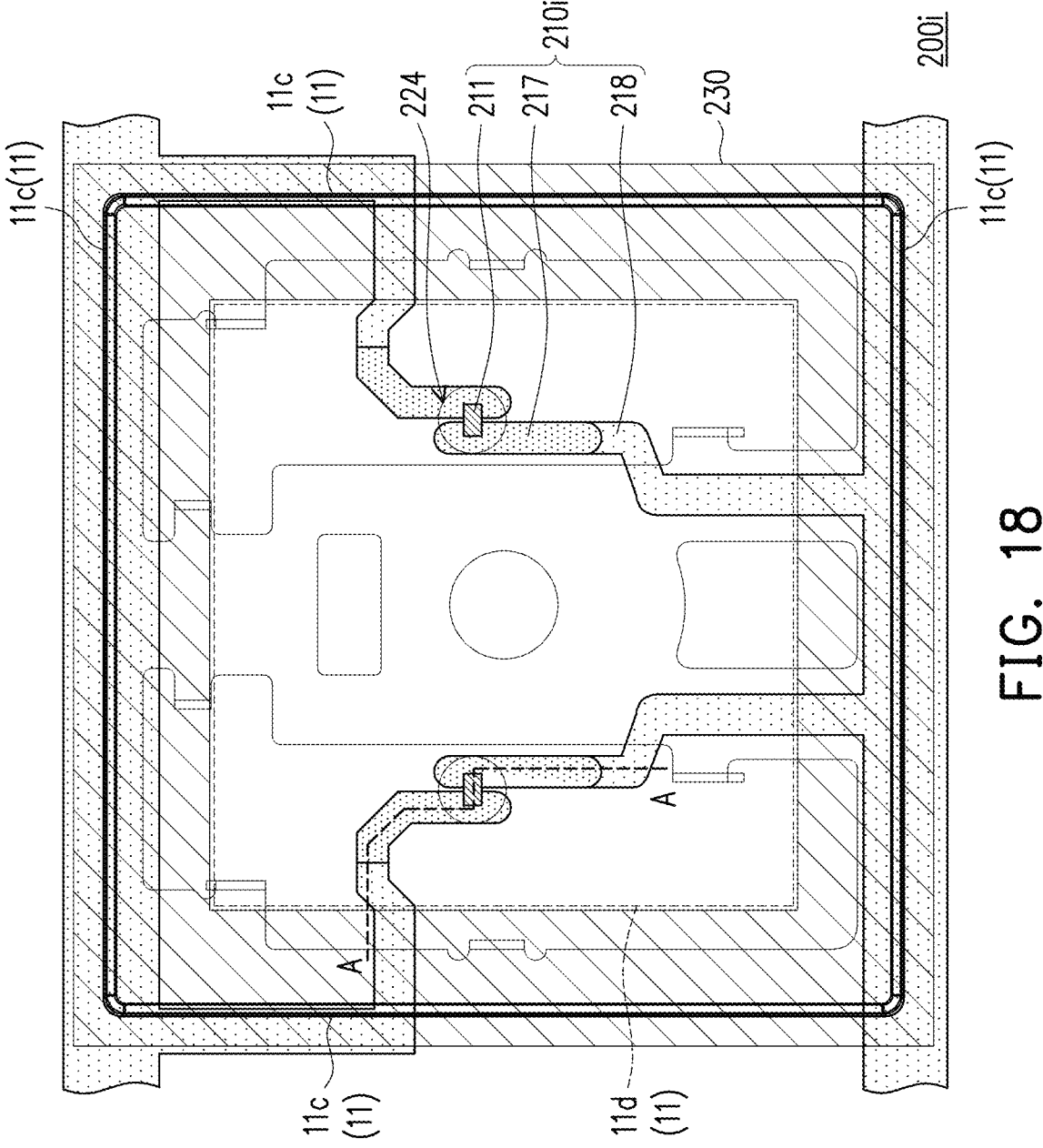
FIG. 18 is a projecting view of the light source, the first circuit, the second circuit and the first light-shielding coating projected onto the keycap of the button structure with a backlight module according to another embodiment of the invention.
Figure 19:
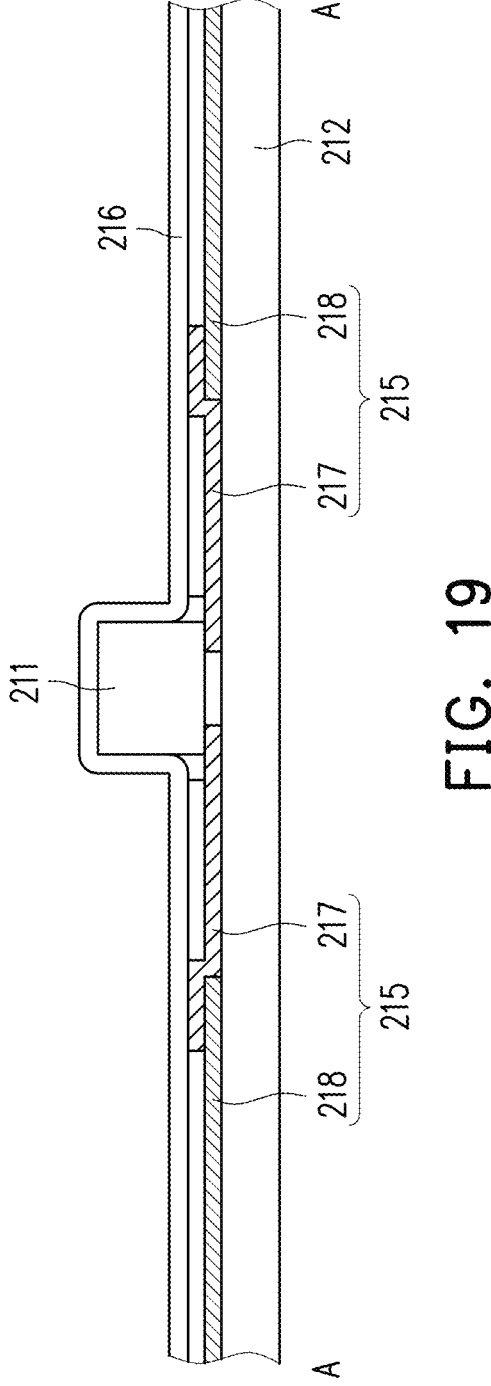
FIG. 19 is a partial cross-sectional view along A-A section of the light source, the first circuit, the second circuit of FIG. 18.

FIG. 18 is a projecting view of the light source, the first circuit, the second circuit and the first light-shielding coating projected onto the keycap of the button structure with a backlight module according to another embodiment of the invention. FIG. 19 is a partial cross-sectional view along A-A section of the light source, the first circuit, the second circuit of FIG. 18. It is noted that a central part 11d of the keycap 11 in FIG. 18 is marked by a dotted line.

Referring to FIGS. 18 and 19, in the embodiment, the composite light-emitting layer 210i of the backlight module 200*i* includes the light source 211, a first circuit 217 and a second circuit 218. As shown in FIG. 19, the circuit 215 electrically connected to the light source 211 includes the first circuit 217 and the second circuit 218. The light source 211, the first circuit 217 and the second circuit 218 are covered and protected by the passivation layer 216. With reference to FIGS. 18 and 19, the first circuit 217 is electrically connected to the light source 211 and corresponds to the position of the central part 11*d* of the keycap 11. The second circuit 218 is electrically connected to the first circuit 217 and extended outwardly and along the orthographic projection of the two opposite side plates 11*c* of the keycap 11. The extended second circuit 218 may be further coupled to another light source and the corresponding circuit that are arranged under another keycap adjacent to the keycap 11. In some embodiments, a material of the first circuit 217 is different from a material of the second circuit 218, and a width of the first circuit 217 is less than a width of the second circuit 218. The first circuit 217 and the second circuit 218 may be made of materials with different conductivities. The first circuit 217 is, for example, made of a conductive component that could provide the improved adhesion to the light source 211, as compared with the second circuit 218.

Figure 20:
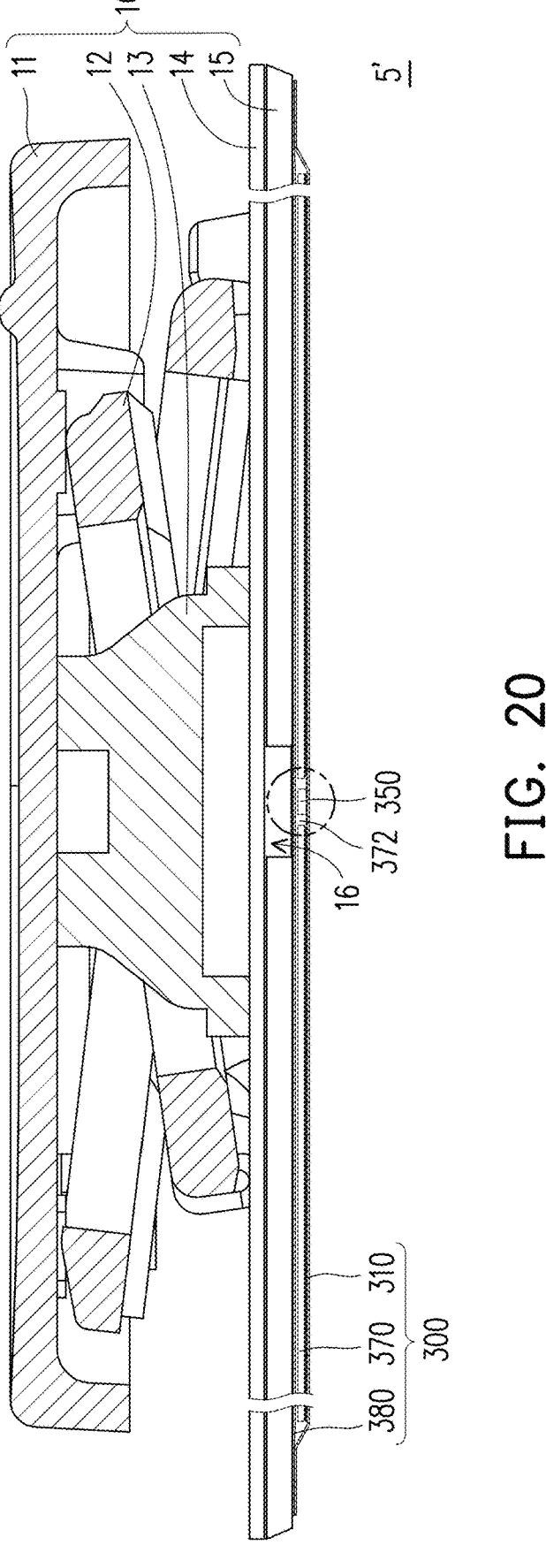
FIG. 20 is a partial cross-sectional view of a light-emitting keyboard according to an embodiment of the invention.

FIG. 20 is a partial cross-sectional view of a light-emitting keyboard according to an embodiment of the invention. Referring to FIG. 20, a light-emitting keyboard 5' includes at least one button structure 10 and a backlight module 300 located under the button structure 10. Light provided by the backlight module 300 illuminates the rear side of the button structure 10 to provide the user with an identification or various visual effects. It is noted that FIG. 20 only shows a part of the light-emitting keyboard 5' (one button structure 10 and a corresponding part of the backlight module 300). However, the light-emitting keyboard 5' is exemplified by, for example but not limited to, a keyboard of a notebook computer.

The button structure 10 includes a keycap 11, a support assembly 12, an elastic body 13, a circuit layer 14, and a bracket 15. The keycap 11 is disposed on the bracket 15 and connected to the bracket 15 via the support assembly 12. The support assembly 12 is disposed between the keycap 11 and the bracket 15. The respective ends of the support assembly 12 are connected to the keycap 11 and the bracket 15, such that the keycap 11 is stably moved up and down relative to the bracket 15 via the connection of the support assembly 12. The support assembly 12 is, for example but not limited to, a scissor-like mechanism that includes two supporting pieces pivotally assembled together.

The circuit layer 14 is disposed between the at least one keycap 11 and the bracket 15. The circuit layer 14 is, for example, a flexible membrane circuit in a multi-layered structure having a conductive portion as a switching region to be triggered by the elastic body 13. The elastic body 13 is disposed between the keycap 11 and the circuit layer 14, and provides a restoring force to drive the keycap 11 move up and return to its released state.

The backlight module 300 is disposed under the button structure 10, and includes a composite light-emitting layer 310, a light guide plate 370 and a light-shielding layer 380.

Figure 21:
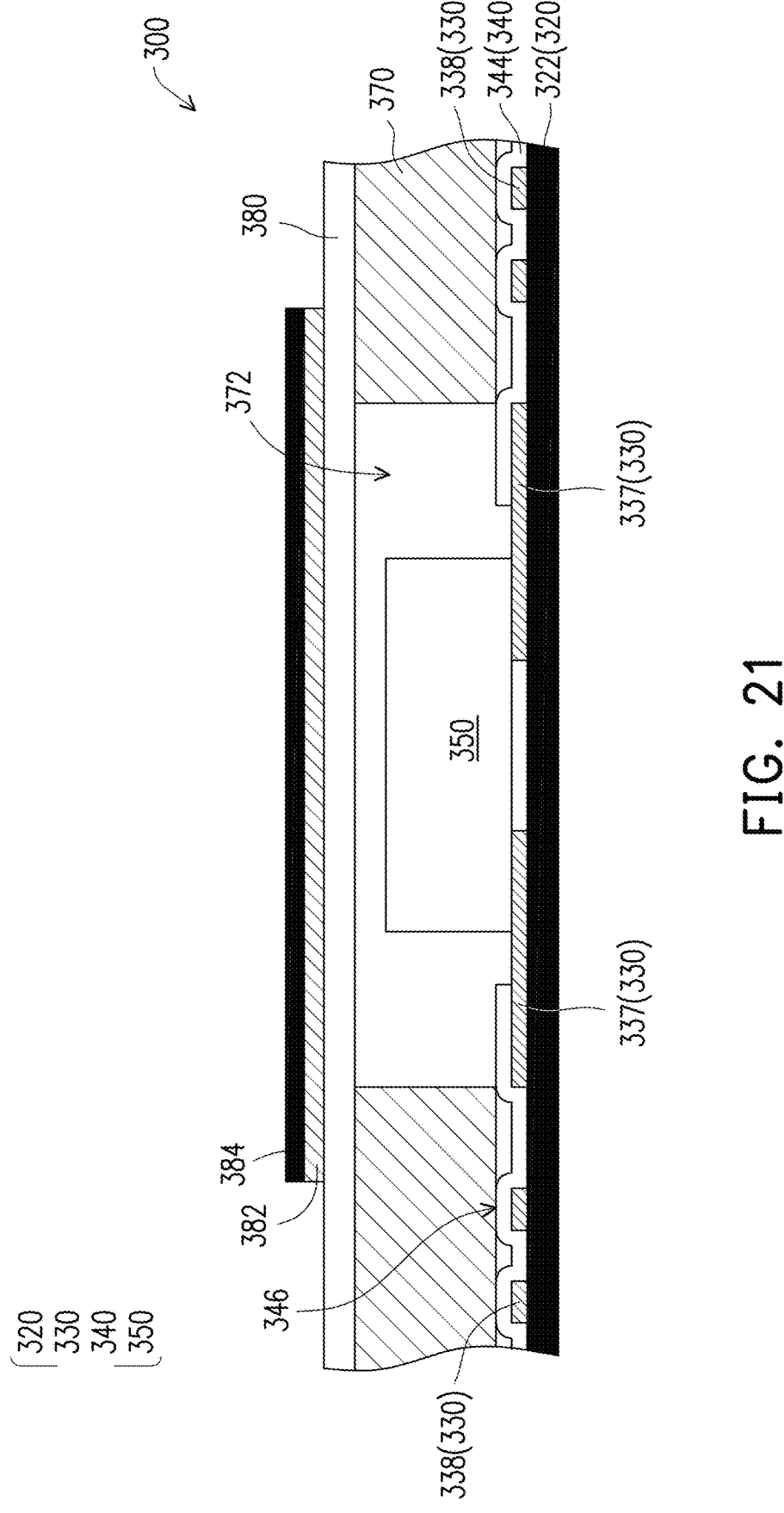
FIG. 21 is a partial cross-sectional view of a backlight module of FIG. 20.

FIG. 21 is a partial cross-sectional view of a backlight module of FIG. 20. Referring to FIG. 21, in the embodiment, the composite light-emitting layer 310 includes a substrate 320, a conductive layer 330, a reflective layer 340 and at least one light source 350. In the embodiment, the substrate

320 is a light-shielding substrate 322, for example, a black Mylar film, but the type of the substrate 320 is not limited thereto.

The conductive layer 330 is disposed on the substrate 320, and the conductive layer 330 includes circuits 337 and patterned structures 338. The light source 350 is electrically connected to the circuits 337, and the patterned structures 338 are electrically insulated from the light source 350.

Figure 22:
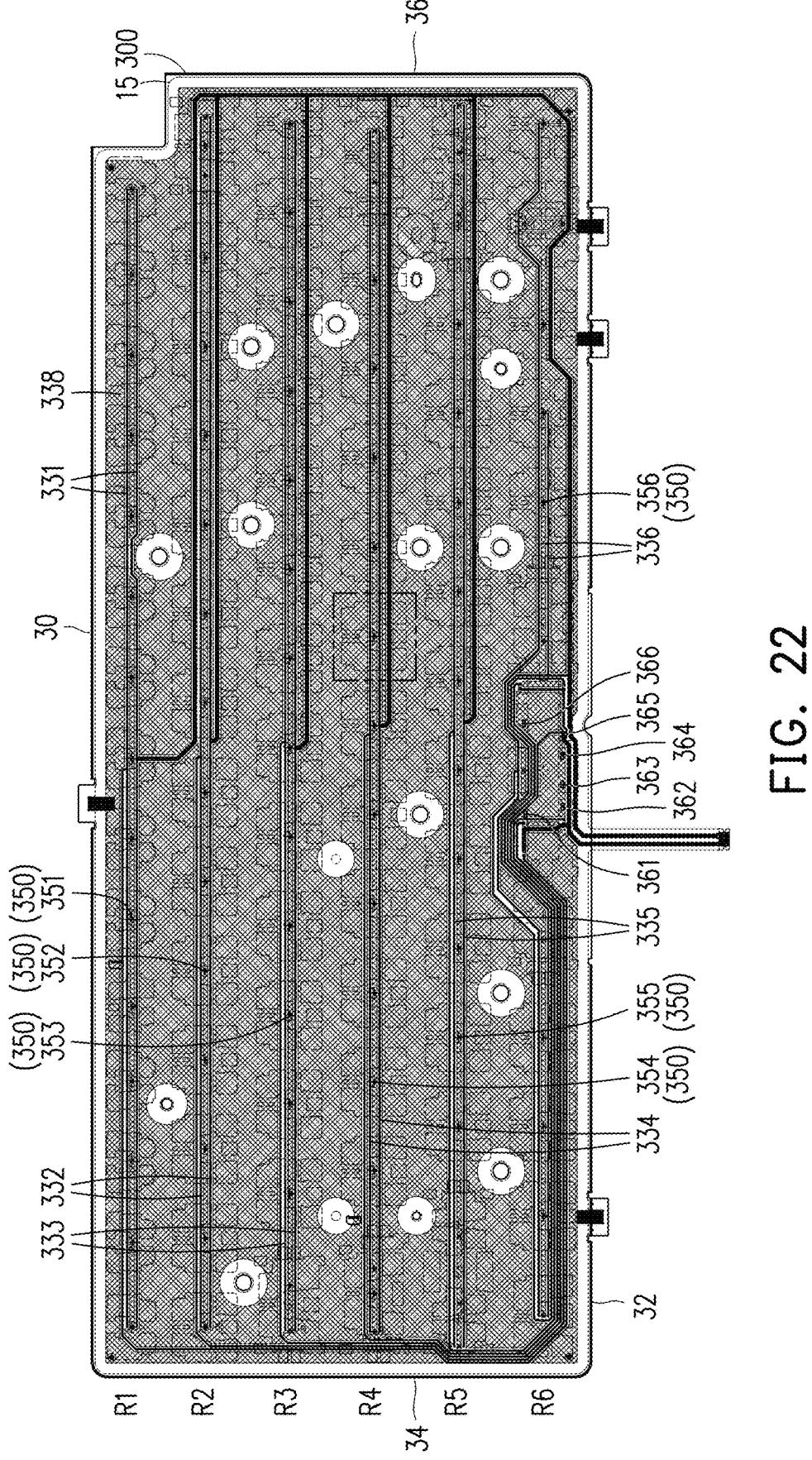
FIG. 22 is a top view of the conductive layer and the bracket of the light-emitting keyboard of FIG. 20.

FIG. 22 is a top view of the conductive layer and the bracket of the light-emitting keyboard of FIG. 20. Referring to FIG. 22, in the embodiment, shapes of the patterned structures 338 are grid shapes, but the shapes of the patterned structures 338 are not limited thereto. In the embodiment, the patterned structures 338 are distributed throughout the substrate 320 so as to improve structural strength of the backlight module 300 (FIG. 21). Hence, the backlight module 300 is not easy to be bent or physically deformed. In addition, in an embodiment, the patterned structures 338 could be connected to the bracket 15 through conductive members (not shown) so that the patterned structures 338 are grounded.

As shown in FIG. 22, the substrate 320 has a first long side 30 (for example, an upper long side), a second long side 32 (for example, a lower long side), a first short side 34 (for example, a left short side), and a second short side 36 (for example, a right short side). The first long side 30 and the second long side 32 are opposite to each other, and the first short side 34 and the second short side 36 are opposite to each other.

In the embodiment, the composite light-emitting layer 310 could partitioned into several rows with respective lighting circuitry, such as rows R1-R6. The at least one light source 350 includes first light sources 351, second light sources 352, third light sources 353, fourth light sources 354, fifth light sources 355 and sixth light sources 356 arranged in rows R1-R6, respectively. The first light sources 351 are close to the first long side 30, and the sixth light sources 356 are close to the second long side 32.

The circuits 337 includes circuitry 331 corresponding to the row R1 connecting the first light sources 351 in parallel, circuitry 332 corresponding to the row R2 connecting the second light sources 352 in parallel, circuitry 333 corresponding to the row R3 connecting the third light sources 353 in parallel, circuitry 334 corresponding to the row R4 connecting the fourth light sources 354 in parallel, circuitry 335 corresponding to the row R5 connecting the fifth light sources 355 in parallel, and circuitry 336 corresponding to the row R6 connecting the sixth light sources 356 in parallel.

Figure 23:
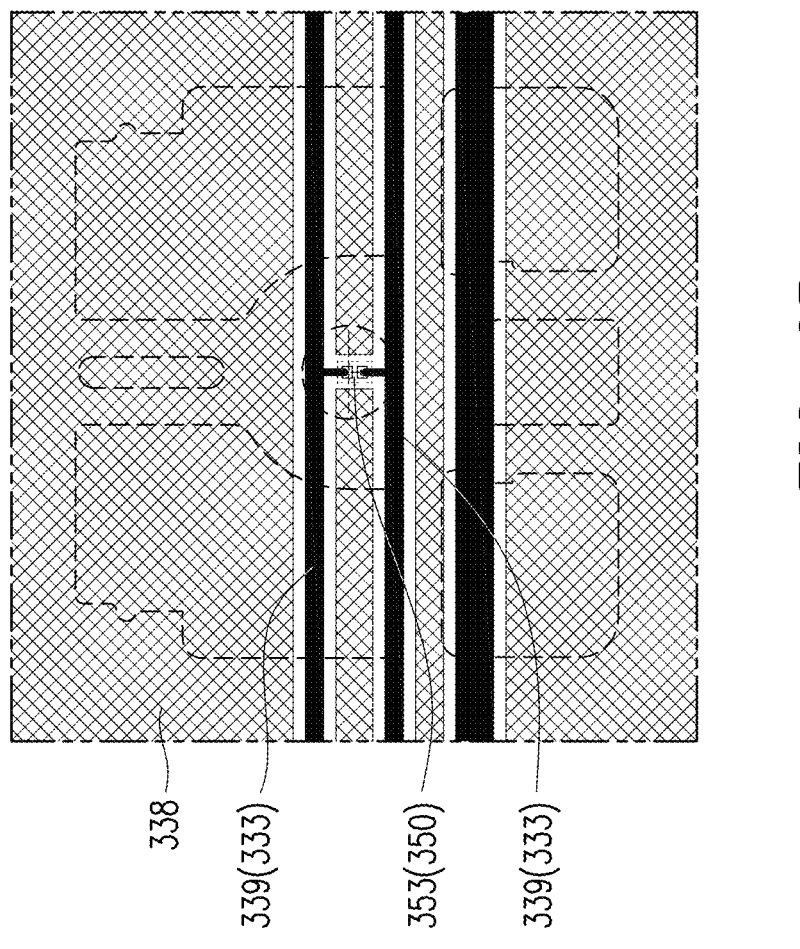
FIG. 23 is a partial enlarged view of FIG. 22.

FIG. 23 is a partial enlarged view of FIG. 22. Specifically, FIG. 23 is a partial enlarged view corresponding to one of the third light sources 353 of FIG. 22. Referring to FIG. 23, the circuitry 333 includes two wires 339, one of the two wires 339 is connected to a positive electrode of the light source 353, the other of the two wires 339 is connected to a negative electrode of the light source 353. The patterned structures 338 are electrically insulated from the circuitry 333.

Referring back to FIG. 21, in the embodiment, the reflective layer 340 is a light-reflecting film 344. In the embodiment, the light reflecting film 344 may be a light-reflecting film, for example, a film doped with light-reflecting or diffusing particles. In another embodiment, the reflective layer 340 may be a light-reflecting coating or a film with light-reflecting coating, the type of the reflective layer 340 is not limited thereto.

The reflective layer 340 is conformally disposed on the conductive layer 330, and a part of the reflective layer 340 conformally disposed on the patterned structures 338 functions as micro structures 346 protruding from the flat surface, so as to reflect light uniformly and/or provide better reflection effect. Therefore, in the embodiment, the patterned structures 338 of the conductive layer 330 not only improve the structural strength of the backlight module 300, but also facilitate the formation of micro structures 346, such that the backlight module 300 may provide uniform lighting effect.

In addition, the light guide plate 370 is disposed on the reflective layer 340, and includes at least one hole 372 where the at least one light source 350 is located in. The light-shielding layer 380 disposed on the light guide plate 370 has a surface provided with a light-reflecting layer 382 and a light-shielding layer 384, and the light-reflecting layer 382 is disposed between the light source 350 and the light-shielding layer 384. The light-reflecting layer 382 could be a white paint or white ink layer, while the light-shielding layer 384 could be a black paint or black ink layer. In another embodiment, the light-reflecting layer 382 may extends outside an edge of the light-shielding layer 384, so that the light-reflecting layer 382 could have a single pattern area larger than that of the light-shielding layer 384.

In the embodiment, light emitted from the light source 350 may be transmitted upwardly, reflected to the light guide plate 370 by the light-reflecting coating 382, transmitted in the light guide plate 370, reflected by the micro structures 346 of the reflective layer 340, and emitted to the keycap 11 (FIG. 20).

In addition, in FIG. 22, the composite light-emitting layer 310 (FIG. 20) further includes a first resistor 361, a second resistor 362, a third resistor 363, a fourth resistor 364, a fifth resistor 365 and a sixth resistor 366 located in the row R6.

Figure 24:
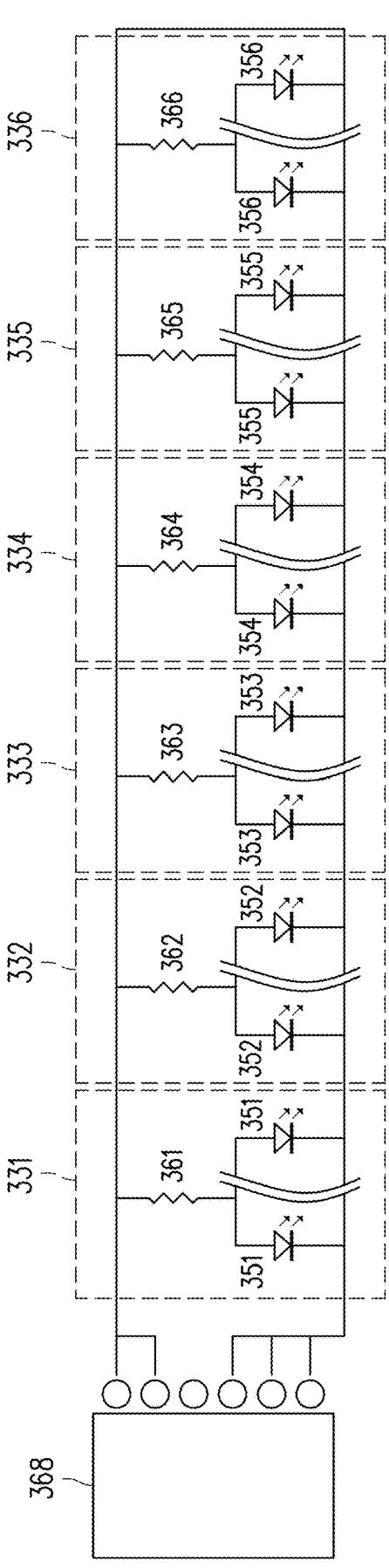
FIG. 24 is a circuitry diagram of the resistors, light sources, and circuits of FIG. 22.

FIG. 24 is a circuitry diagram of the resistors, light sources, and circuits of FIG. 22. Referring to FIGS. 22 and 24, the first resistor 361 is electrically connected to a group of the first light sources 351 in series via the circuitry 331, the second resistor 362 is electrically connected to a group of the second light sources 352 in series via the circuitry 332, the third resistor 363 is electrically connected to a group of the third light sources 353 in series via the circuitry 333, the fourth resistor 364 is electrically connected to a group of the fourth light sources 354 in series via the circuitry 334, the fifth resistor 365 is electrically connected to a group of the fifth light sources 355 in series via the circuitry 335, and the sixth resistor 366 is electrically connected to a group of the sixth light sources 356 in series via the circuitry 336.

In the embodiment, the circuitry 331, 332, 333, 334, 335 and 336 are in parallel connection, and each is electrically connected to a connector 368 which may connect to a processor (not shown) of a notebook computer (not shown).

It is noted that in the keyboard, a key (not shown) corresponding to the row R1 may be a function key (for example, one of F1-F12 keys). Because the function key has a smaller size, an area of the opening 16 of the bracket 15 (as shown in FIG. 20) below the function keycap is smaller than that of a normal key. In order to provide sufficient backlighting brightness for the function key, the current of the circuitry 331 needs to be greater. That is, a resistance of the first resistor 361 should be smaller.

In addition, a key (not shown) corresponding to the row R6 may be a space bar which has a greater size, such that an area of the opening of the bracket 15 below the space bar is greater than that of the normal key. In order to provide uniform brightness for the keys corresponding to the row R6, the current of the circuitry 336 needs to be smaller. That is, a resistance of the sixth resistor 366 should be greater.

In the embodiment, a resistance of the first resistor 361 is smaller than or equal to a resistance of the second resistor 362, the resistance of the second resistor 362 is smaller than a resistance of the third resistor 363, the resistance of the third resistor 363 is smaller than or equal to a resistance of the fourth resistor 364, the resistance of the fourth resistor 364 is smaller than a resistance of the fifth resistor 365, and the resistance of the fifth resistor 365 is smaller than or equal to a resistance of the sixth resistor 366. Therefore, the light-emitting keyboard 5' can provide uniform optical effect.

In one embodiment, each one of the resistances of the first resistor and the second resistor is 115 ohm, each one of the resistances of the third resistor and the fourth resistor is 124 ohm, and each one of the resistances of the fifth resistor and the sixth resistor is 140 ohm. Certainly, the resistances of the resistors are not limited thereto.

Figure 25:
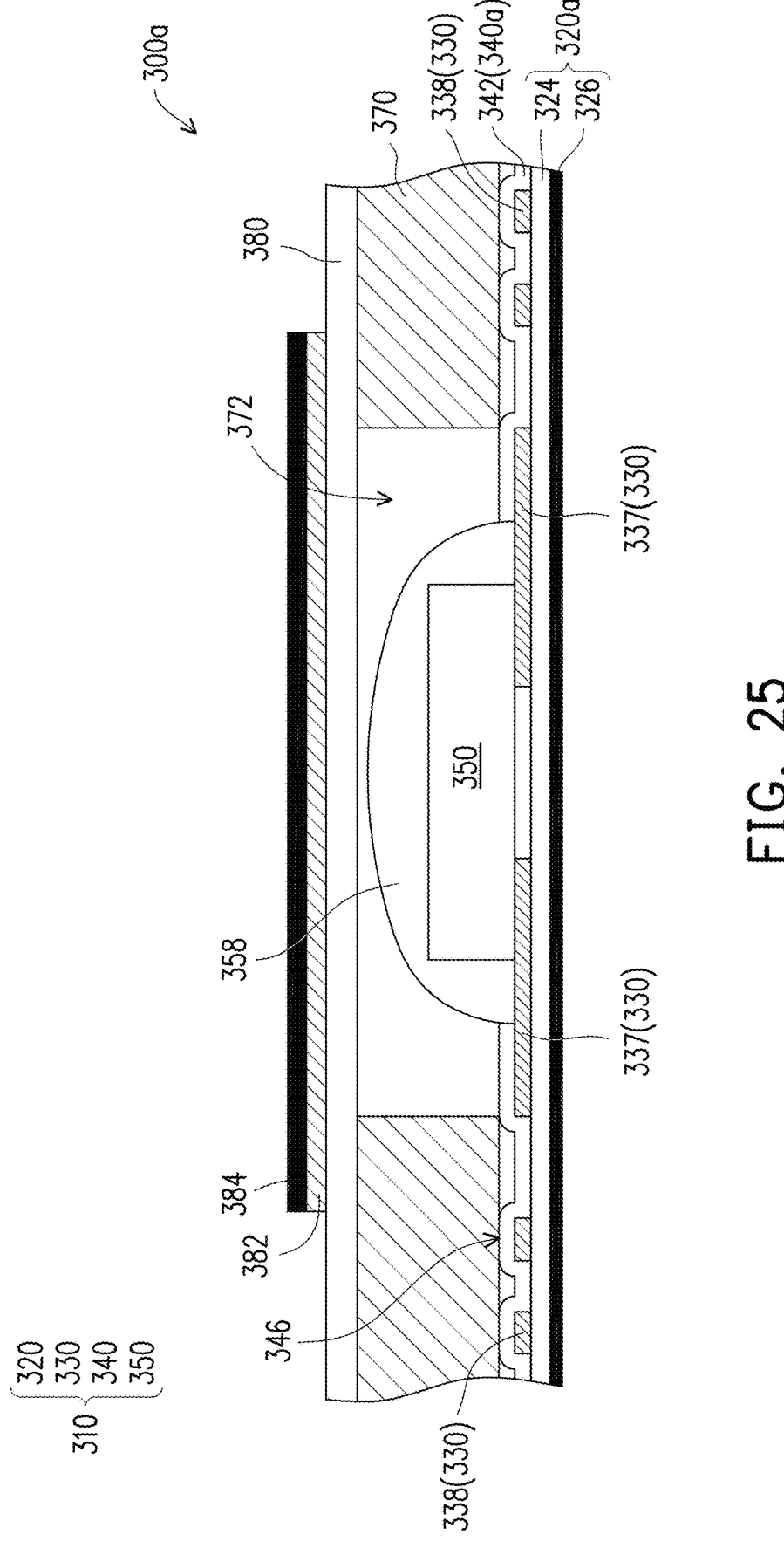
FIG. 25 is a partial cross-sectional view of a backlight module of a light-emitting keyboard according to an embodiment of the invention.

FIG. 25 is a partial cross-sectional view of a backlight module of a light-emitting keyboard according to an embodiment of the invention. Referring to FIG. 25, in the embodiment, main differences between the backlight module 300 of FIG. 21 and a backlight module 300a of FIG. 25 are that, in the embodiment, the substrate 320a includes a light-transmitting film 324 and a light-shielding coating 326 disposed below the light-transmitting film 324 to avoid light leakage. In addition, the light source 350 is covered by an encapsulation 358 that could protect the chip or function as a lens. Moreover, the reflective layer 340a is a light-reflecting coating 342, for example, a white ink or white paint layer.

Similarly, the backlight module 300a includes the patterned structures 338 of the conductive layer 330 so that the structural strength of the backlight module 300a can be improved. Moreover, the reflective layer 340a is conformally disposed on the conductive layer 330 so as to form micro structures 346, such that the backlight module 300a may provide uniform lighting effect.

Figure 26:
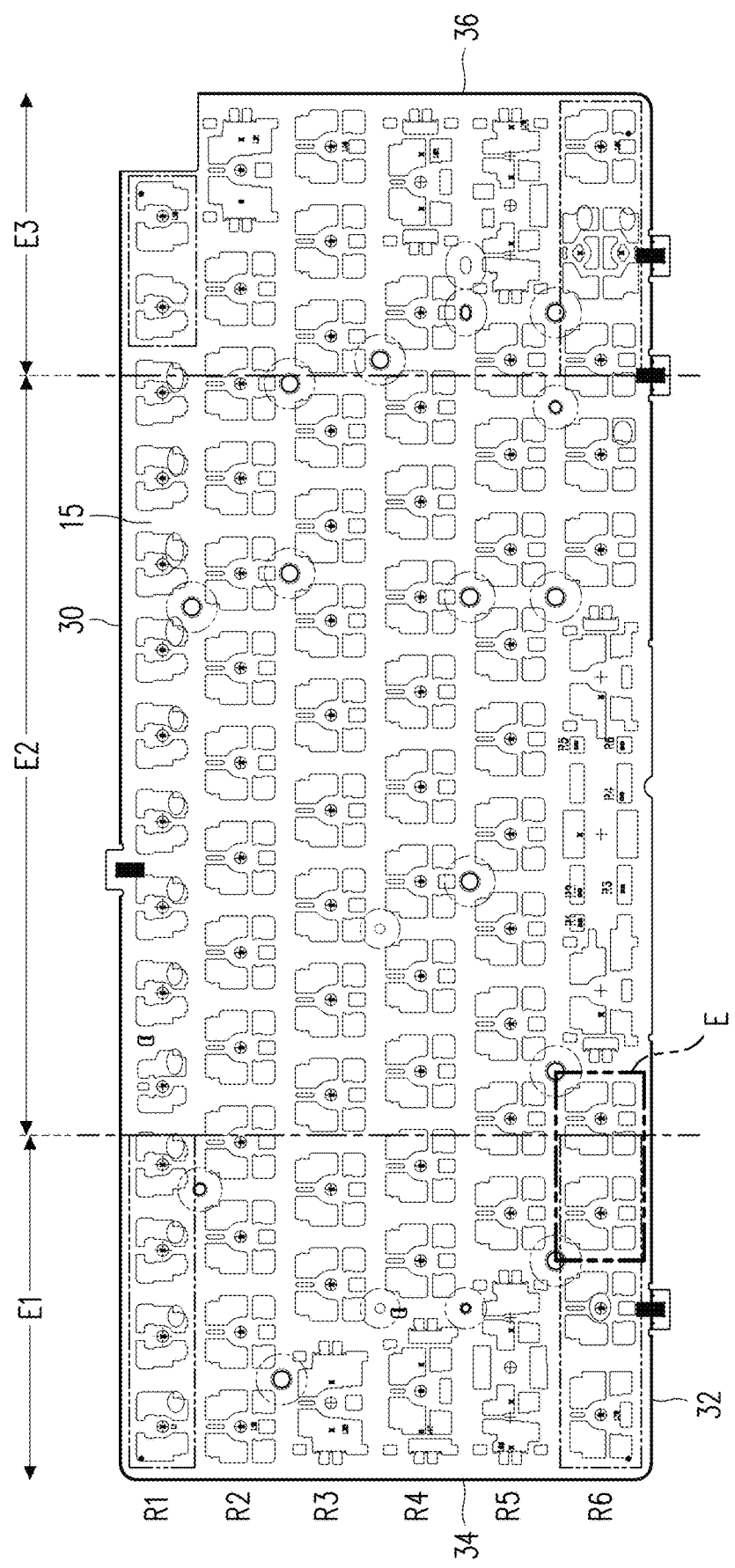
FIG. 26 is a top view of the light sources, the light guide plate and the bracket of the light-emitting keyboard of FIG. 20.
Figure 27:
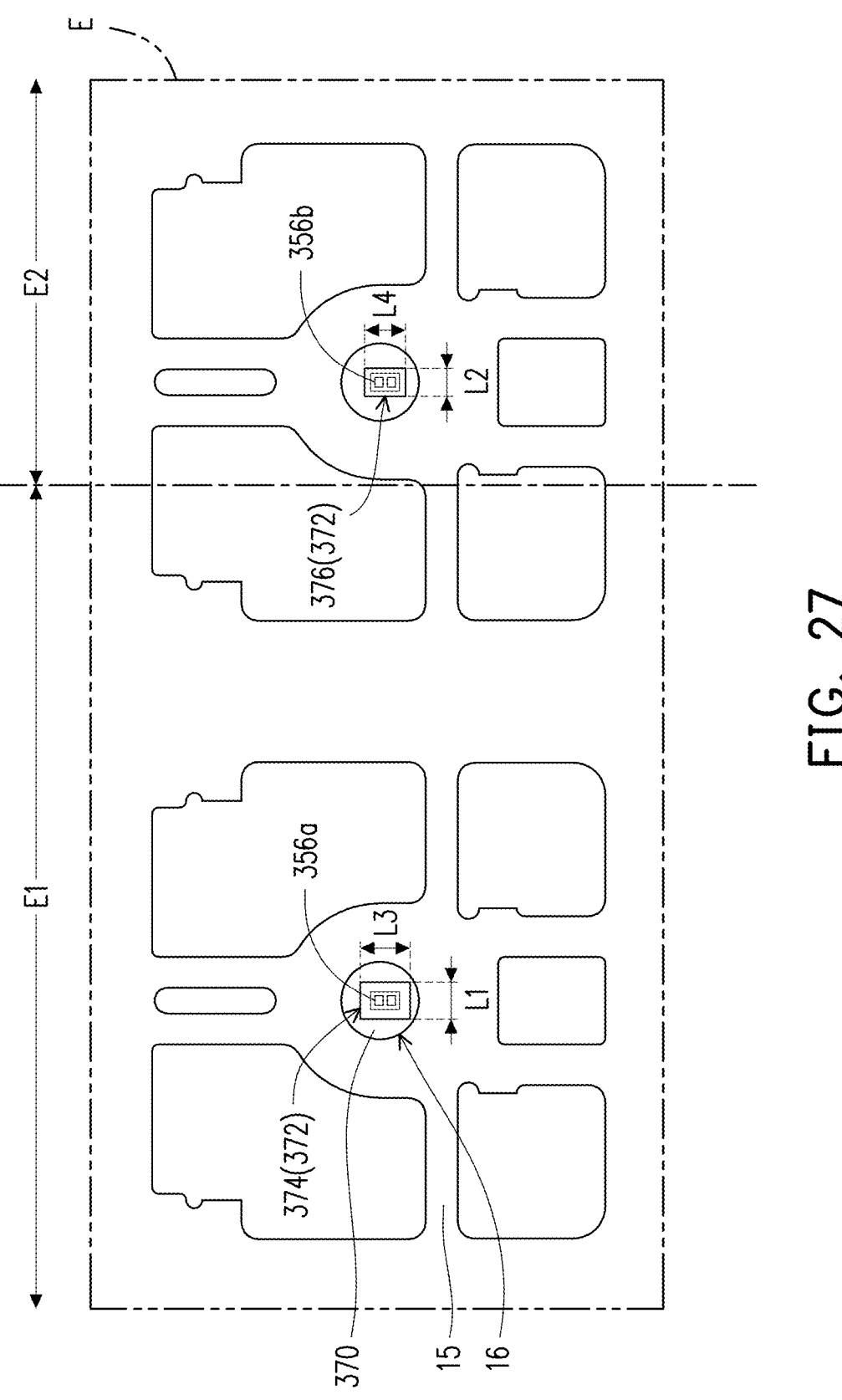
FIG. 27 is a partial enlarged view of zone E of FIG. 26.

FIG. 26 is a top view of the light sources, the light guide plate and the bracket of the light-emitting keyboard of FIG. 20. FIG. 27 is a partial enlarged view of zone E of FIG. 26.

Referring to FIG. 26 and FIG. 27, light-emitting keyboard 5' can be separated to a first zone E1, a second zone E2 and a third zone E3. As the light guide plate 370 cannot be seen in FIG. 26, the relative position of the light guide plate 370 and the composite light-emitting layer 310 is shown in FIG. 21. The first zone E1, the second zone E2 and the third zone E3 are arranged along the first long side 30, and the second zone E2 is located between the first zone E1 and the third zone E3. In the embodiment, the first zone E1 is close to the first short side 34, and the third zone E3 is close to the second short side 36. A range of the first zone E1 is smaller than a range of the second zone E2, and a range of the third zone E3 is smaller than the range of the second zone E2.

It is noted that, when the light guide plate 370 is assembled to the composite light-emitting layer 310, positioning posts (not shown) of the light guide plate 370 are located at four corners of the light guide plate 370, positions of rows R1 and R6 corresponding to the first zone E1 and the third zone E3 which are close to the four corners are particularly prone to exist assembly deviation with the composite light-emitting layer 310. In order to solve assembly deviation between the light guide plate 370 and the composite light-emitting layer 310, the light guide plate 370 is provided with holes 372 (FIG. 27) with different sizes for two adjacent light sources 356a, 356b (FIG. 27) of the composite light-emitting layer 310.

It is noted that, the zone E in FIG. 27 indicates a combination of the first zone E1 and the second zone E2 in the row R6. Specifically, as shown in FIG. 27, the light source 356a corresponding to the first zone E1 and the light source 356b corresponding to the second zone E2. The light source 356a is close to the first short side 34 (FIG. 26) and located between the light source 356b and the first short side 34. The light guide plate 370 includes a first hole 374 located in the first zone E1 and a second hole 376 located in the second zone E2. The light source 356a located in the first hole 374, and the light source 356b located in the second hole 376.

In the embodiment, a size of the first hole 374 is greater than a size of the second hole 376. For instance, a length L1 of the first hole 374 along the first long side 30 is greater than a length L2 of the second hole 376 along the first long side 30. In addition, a length L3 of the first hole 374 along the first short side 34 could be greater than a length L4 of the second hole 376 along the first short side 34.

In the embodiment, the first hole 374 has a greater size so as to provide more room for the light source 356a. Hence, the light source 356a can be successfully inserted into the first hole 374 of the light guide plate 370 without interference by assembly tolerance when the light guide plate 370 is assembled to the composite light-emitting layer 310.

It is noted that, although it only shows dimensional relation of the first hole 374 in the first zone E1 and the second hole 376 in the second zone E2, dimensional relation of the hole in the third zone E3 and the second hole 376 in the second zone E2 are the same.

Therefore, as shown in FIG. 26, in an embodiment, the holes (as the first hole 374 in FIG. 27) in the rows R1 and R6 corresponding to the first zone E1 and the third zone E3 may have greater size than the holes corresponding to the second zone E2 (as the second hole 376 in FIG. 27) and the holes in rows R2-R5 corresponding to the first zone E1 and the third zone E3. Therefore, the light guide plate 370 can successfully and effectively assembled to the composite light-emitting layer 310, such that assembly yield of the light guide plate 370 and the composite light-emitting layer 310 in mass production can be improved.

Figure 28:
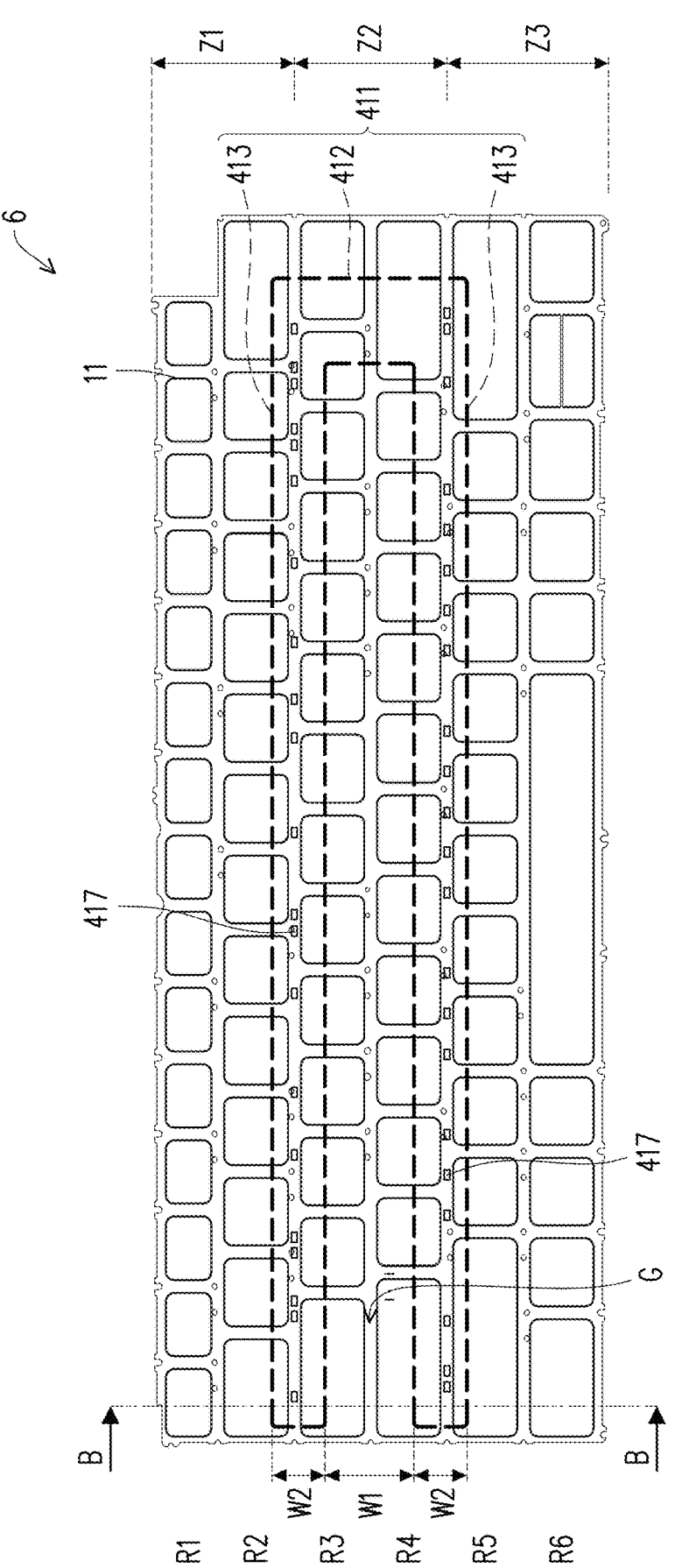
FIG. 28 is a top view of a light-emitting keyboard according to another embodiment of the invention.
Figure 29:
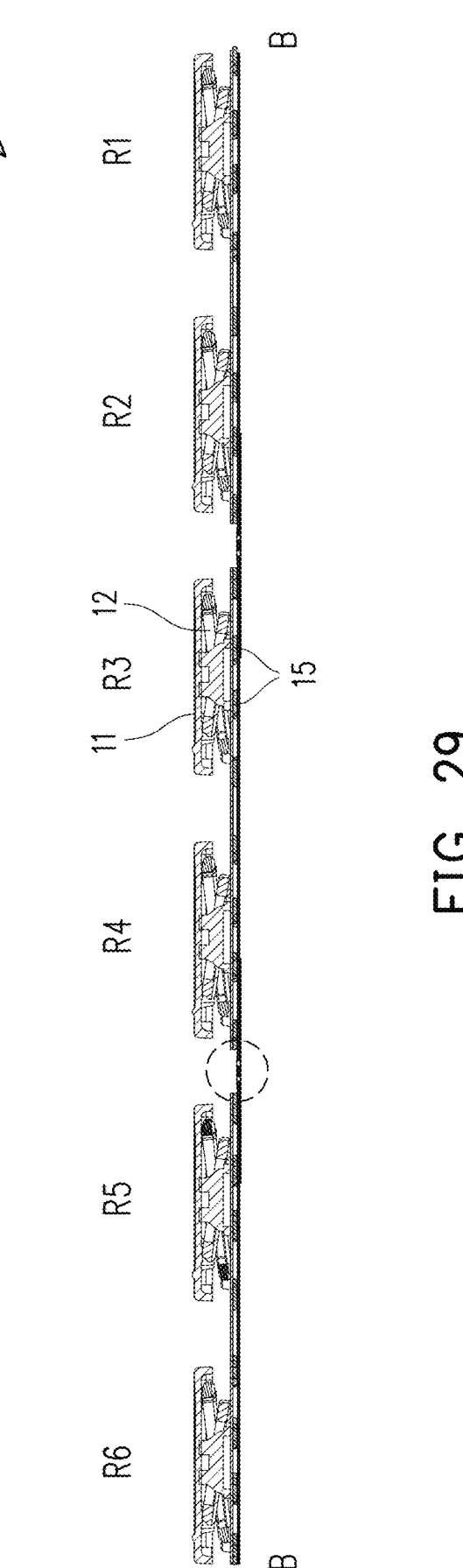
FIG. 29 is a partial cross-sectional view along B-B section of FIG. 28.
Figure 30:
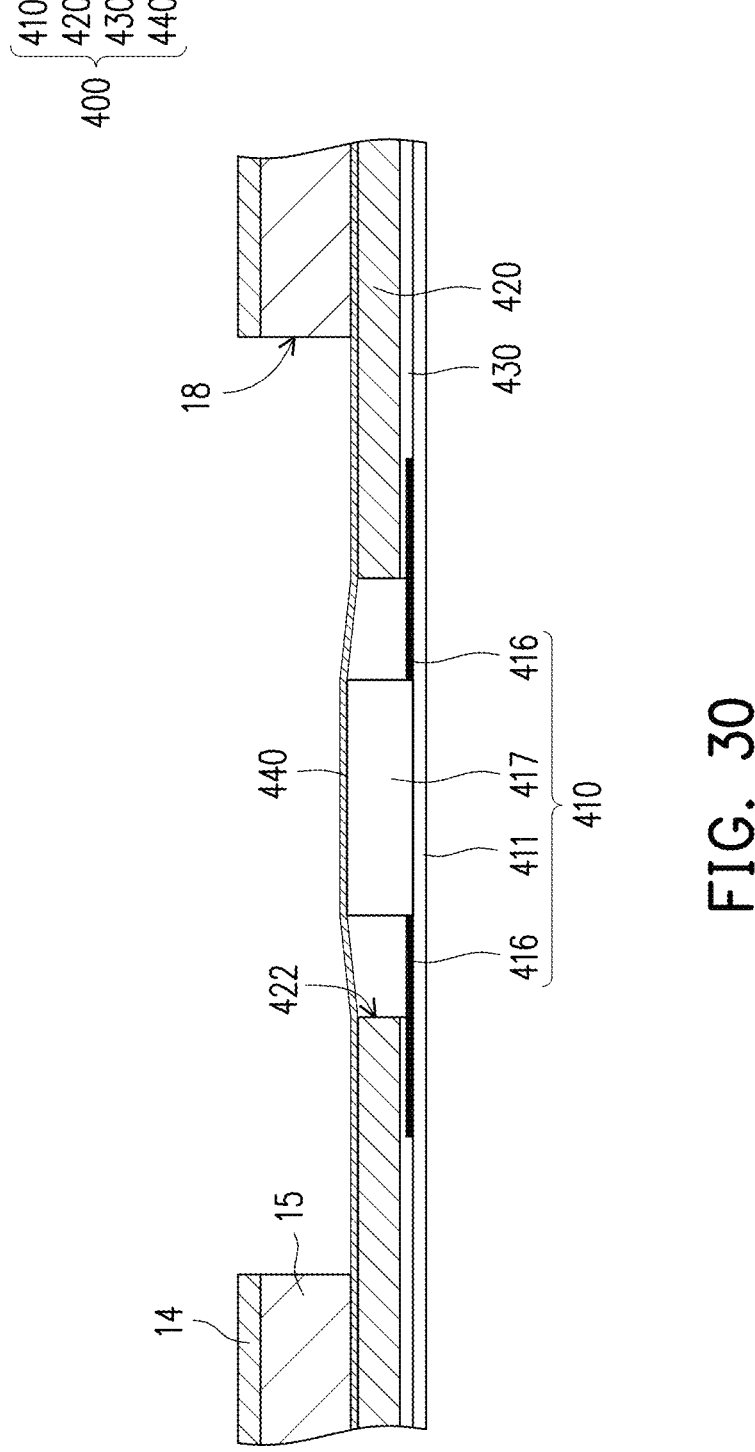
FIG. 30 is a partial enlarged view of FIG. 29.

FIG. 28 is a top view of a light-emitting keyboard according to another embodiment of the invention. FIG. 29 is a partial cross-sectional view along B-B section of FIG. 28. FIG. 30 is a partial enlarged view of FIG. 29.

Referring to FIGS. 28 to 30, in the embodiment, a light-emitting keyboard 6 is provided. The light-emitting keyboard 6 includes a bracket 15 (FIG. 29), keycaps 11 (FIG. 29), a circuit layer 14 (FIG. 30) and a backlight module 400 (FIG. 30). As shown in FIGS. 29 and 30, the keycaps 11 are disposed on the bracket 15 and connected to the bracket 15 via support assemblies 12, and the circuit layer 14 is disposed between the keycaps 11 and the bracket 15.

As shown in FIG. 30, the backlight module 400 includes a composite light-emitting layer 410, a light guide plate 420 and a pattern layer 440. The composite light-emitting layer 410 is disposed under the bracket 15, and includes a substrate 411, a conductive layer 416 and light sources 417. It is noted that only one light source 417 is shown in FIG. 30 as an exemplary embodiment. The conductive layer 416 is disposed on the substrate 411 and includes a circuit layout. The light sources 417 are located under the keycaps 11 and electrically connected to the circuit. The bracket 15 has an opening 18 corresponding to the light source 417 to provide room for the light source 417 and/or the pattern layer 440.

The light guide plate 420 is disposed under the bracket 15 and on a side of the substrate 411. The light guide plate 420 includes holes 422, one of which is shown in FIG. 30, and the light source 417 is located in the hole 422. In the embodiment, the light source 417 is, for example, a side-emitting LED, and a light emitting surface of the light source 417 may face a sidewall of the hole 422 of the light guide plate 420, such that light emitted from the light source 417 enters the light guide plate 420 through the sidewall of the hole 422.

The light sources 417 may include a chip-scale packaged LED or mini light emitting diode or micro light emitting diode. The type of the light source 417 is not limited thereto. In an embodiment, the light source 417 may be a top-emitting LED, and a reflective layer (e.g., a white coating or a metallic material) can be further disposed above the light source 417, such that light emitted from the light source 417 can be reflected back to the light guide plate 420 by the reflective layer.

In the embodiment, the pattern layer 440 is disposed between the bracket 15 and the light guide plate 420. The pattern layer 440 may include a light-shielding pattern. The pattern layer 440 could be a partial-black paint or black ink layer, but the type of the pattern layer 440 is not limited thereto.

The backlight module 400 further includes a reflective layer 430 disposed under the light guide plate 420. In the embodiment, the substrate 411 is located under the light guide plate 420 and the reflective layer 430, and the reflective layer 430 is disposed between the light guide plate 420 and the substrate 411. In one embodiment, the reflective layer 430 might be integrally disposed on the substrate 411, so that the reflective layer 430 and the substrate 411 could be formed into a single piece, e.g. a reflective substrate. In one embodiment, the reflective layer 430 might be conformally cover at least a part of the conductive layer 416. It should be noted that the arrangement of the reflective layer 430 is not limited thereto.

Referring back to FIG. 28, the substrate 411 disposed under the keycaps 11 is illustrated with a dotted line therein. The substrate 411 includes a connection portion 412 and extension portions 413 respectively connected to the connection portion 412. The extension portions 413 are separated from each other at the positions extending from the connection portion 412. The extension portions 413 are, for example, parallel to each other, with a gap G between any two adjacent extension portions 413, and a width W1 of the gap G is greater than or substantially equal to a width W2 of any one of the extension portions 413.

In the embodiment shown in FIG. 28, the two extension portions 413 and the connection portion 412 form a C-shaped configuration, and the light sources 417 are disposed on the two extension portions 413. The keycaps 11 of the light-emitting keyboard 6 are arranged corresponding to the rows R1-R6, and intervals are intervened between the rows, such that the extension portions 413 could be disposed at positions corresponding to two of the intervals. The two extension portions 413 are, for example, aligned with the interval between the rows R2 and R3 and the interval between the rows R4 and R5) respectively, such that the light-emitting keyboard 6 could be divided into three zones Z1-Z3 corresponding to backlighting provided by the backlight module 400.

The zone Z1 includes the rows R1 and R2, the zone Z2 includes the rows R3 and R4, and the zone Z3 includes the rows R5 and R6. Some of the light sources 417 on the extension portion 413 aligned with the interval between the rows R2 and R3 can emit light towards the zone Z1, and some of the light sources 417 on the extension portion 413 aligned with the interval between the rows R2 and R3 can emit light towards the zone Z2. Some of the light sources 417 on the extension portion 413 aligned with the interval between the rows R4 and R5 can emit light towards the zone Z2, and some of the light sources 417 on the extension portion 413 aligned with the interval between the rows R4 and R5 can emit light towards the zone Z3. The arrangement of the light sources 417 is not limited thereto, and could be modified based on the required illumination effect.

Figure 31:
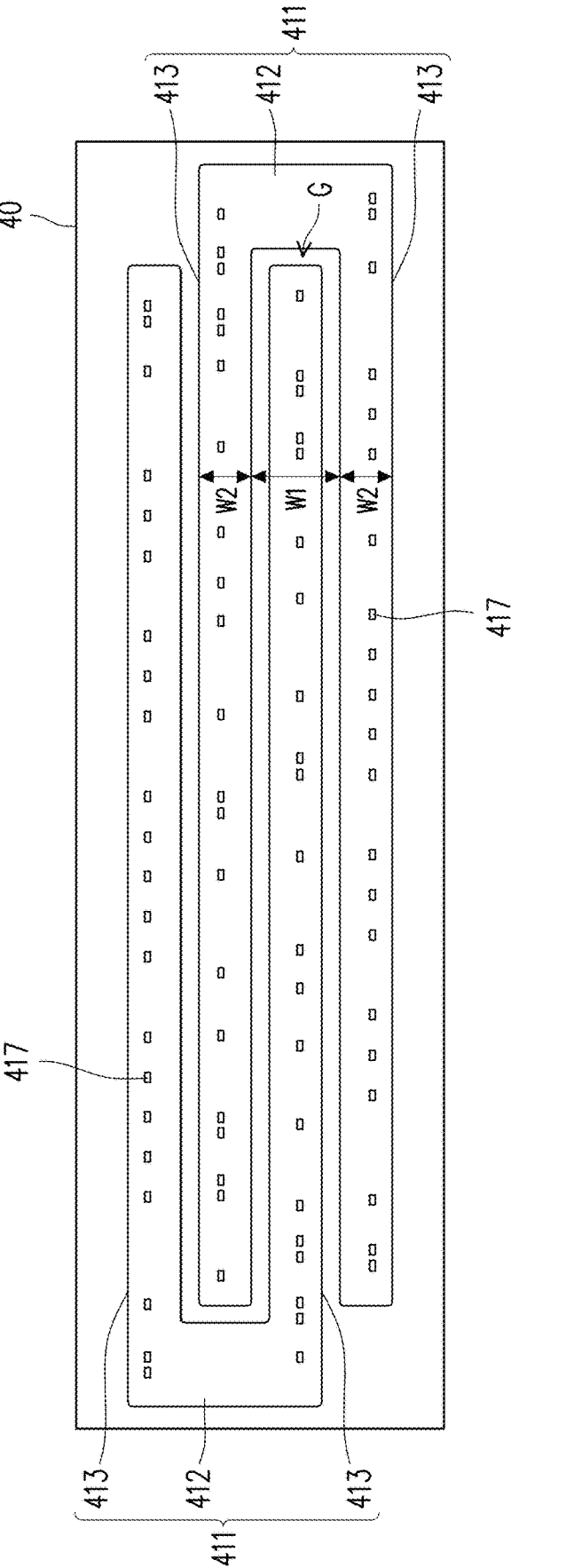
FIG. 31 is a sheet which is a raw material for manufacturing the substrates of FIGS. 28 and 30.

FIG. 31 is a sheet which is a raw material for manufacturing the substrates of FIGS. 28 and 30. Referring to FIG. 31, a sheet 40 is provided. The substrate 411 shown in FIGS. 28 and 30 is made by the sheet 40. In an embodiment, the sheet 40 is a flexible board or layer, and therefore, the substrate 411 is a flexible substrate, such as an FPC (flexible printed circuit) board, an FFC (flexible flat cable), a Mylar layer, a copper foil layer or an aluminum foil layer. In another embodiment, the sheet 40 can be a rigid board or layer, and the substrate 411 is a rigid substrate, such as a PCB board or a support plate. The types of the sheet 40 and the substrate 411 are not limited thereto.

The exemplary sheet 40 shown in FIG. 31 has a size close to that of the light-emitting keyboard 6 can manufacture at least two substrates 411 with extension portions 413 stagger with each other. In a comparison embodiment, another substrate whose size and shape are close to those of the light-emitting keyboard 6, the sheet 40 with the same size can be fabricated into only one substrate. As the size of the substrate 411 in FIG. 28 is reduced, the sheet 40 can make more substrates 411 as compared with the substrate in the comparison embodiment, such that the utilization of the sheet 40 can be enhanced and the manufacturing cost can be reduced.

In addition, as the substrate 411 is not a rectangle shape nor a profile corresponding to the entire light-emitting keyboard 6, the total thickness of the backlight module 400, numbers of the light sources 417, and current consumption can be reduced. The backlight module 400 with significant energy saving still can provide good lighting performance (about 15 nits).

Figure 32:
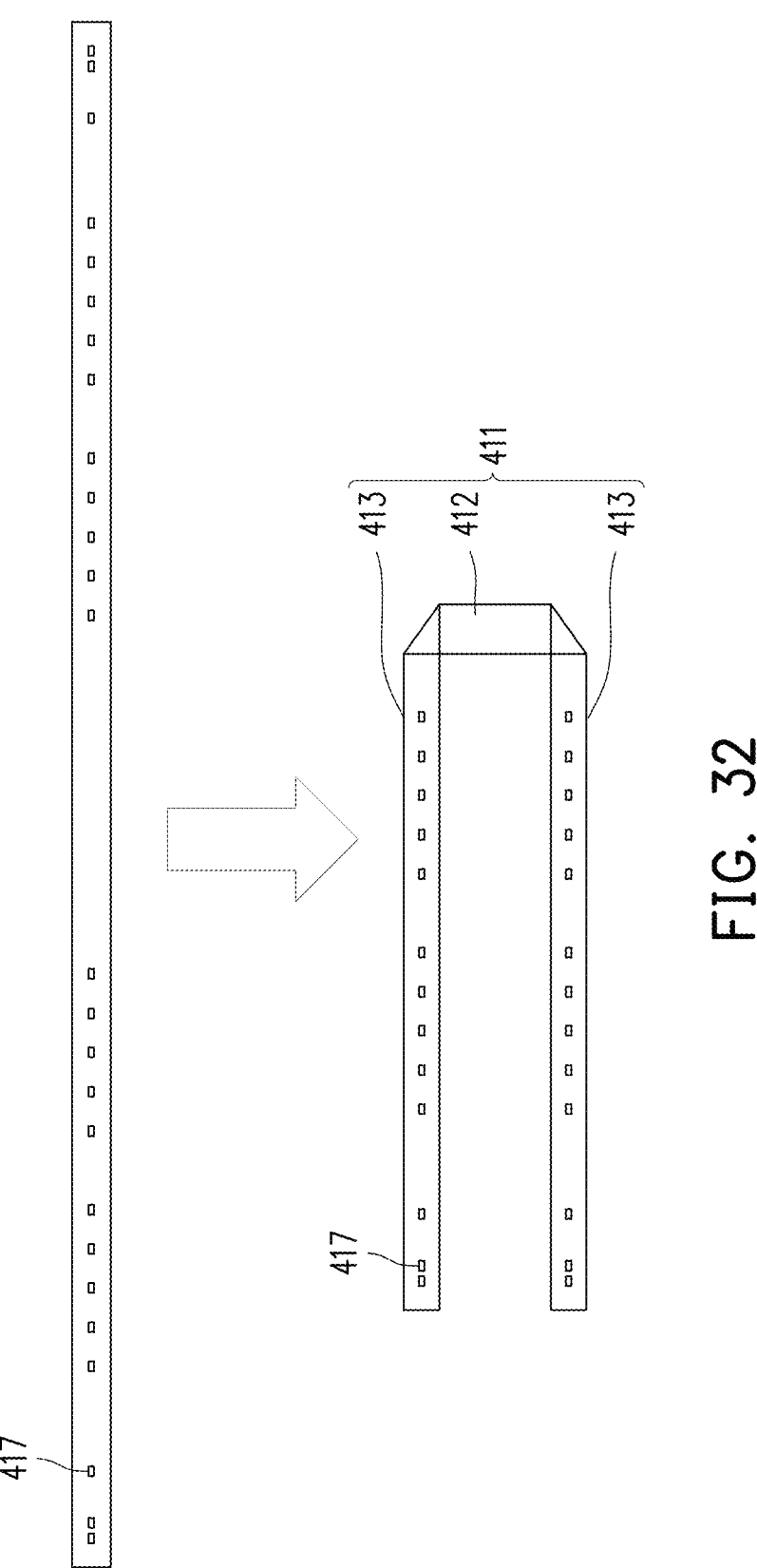
FIG. 32 is a substrate according to another embodiment of the invention.

FIG. 32 is a substrate according to another embodiment of the invention. Referring to FIG. 32, in the embodiment, the contour of the substrate 411 in FIG. 28 can be made by folding the substrate from a strip-shaped sheet, thereby improving utilization efficiency of the raw material sheet and reducing the manufacturing cost as well. It is noted that the manufacturing method or configuration of the substrate 411 in FIG. 28 and the like should not be limited thereto.

Figure 33:
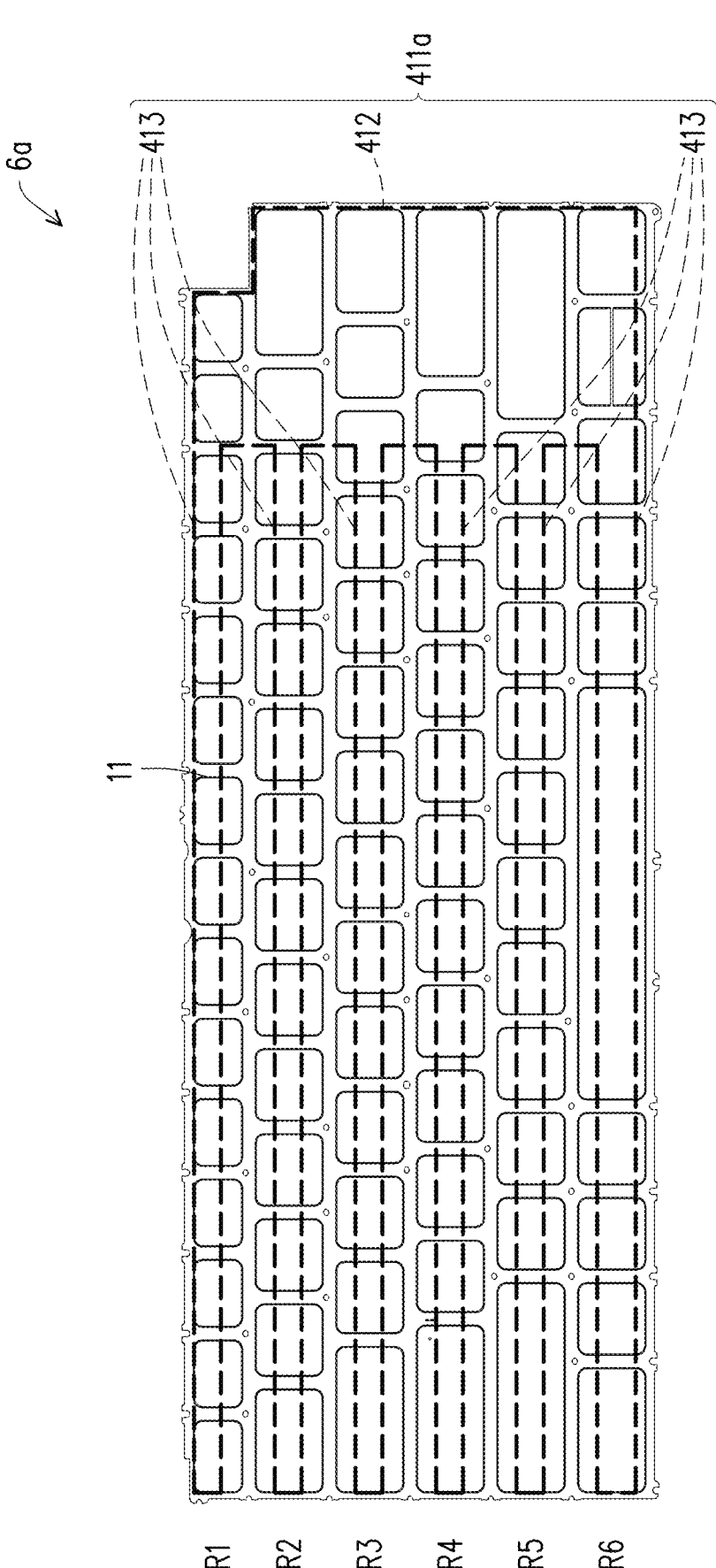
FIG. 33 is a top view of a light-emitting keyboard according to another embodiment of the invention.
Figure 34:
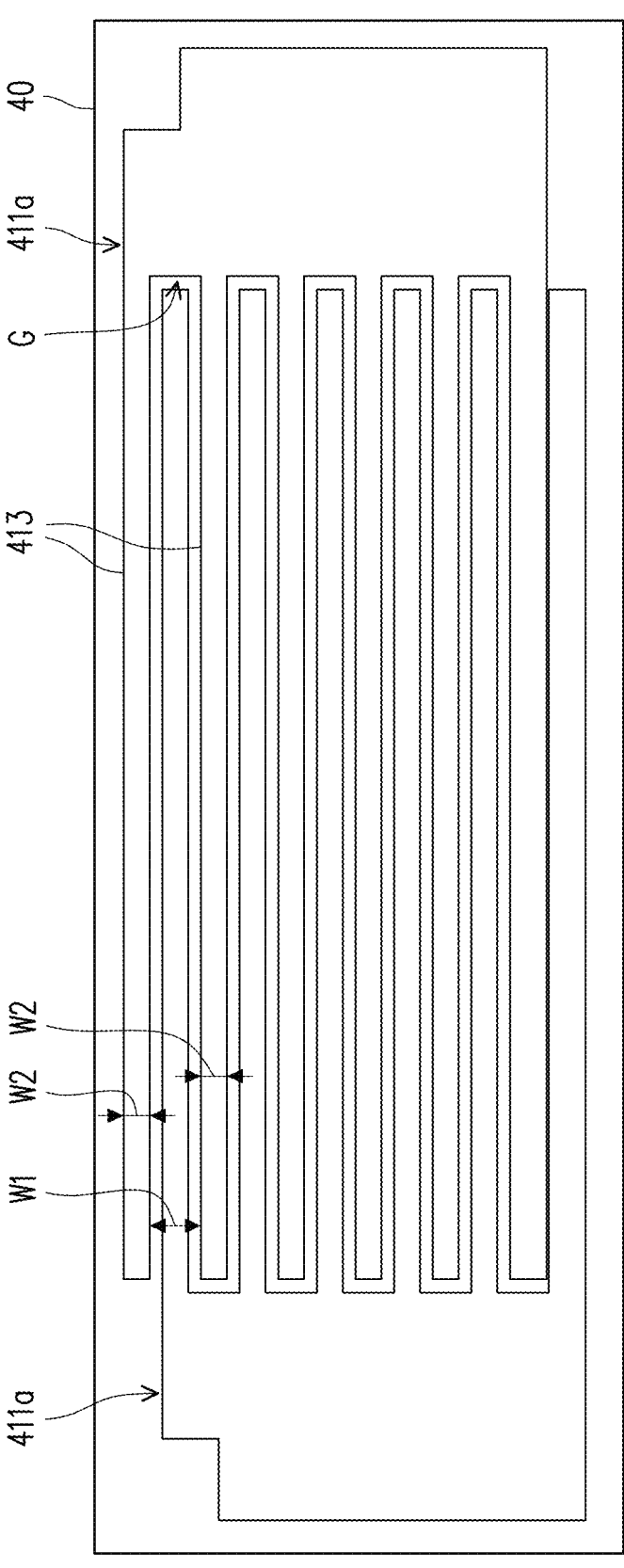
FIG. 34 is a sheet which is a raw material for manufacturing the substrates of FIG. 33.

FIG. 33 is a top view of a light-emitting keyboard according to another embodiment of the invention. FIG. 34 is a sheet which is a raw material for manufacturing the substrates of FIG. 33. The light sources 417 are not shown in FIGS. 33 and 34 to simplify the drawings.

Referring to FIGS. 33 and 34, in the embodiment of the light-emitting keyboard 6a, the substrates 411a includes the extension portions 413 with the number greater than two, and the extension portions 413 extend from a side of the connection portion 412, so that the extension portions 413 and the connection portion 412 form a comb-shaped configuration.

As shown in FIG. 34, the extension portions 413 are, for example, parallel to each other, the gap G between any two adjacent extension portions 413 has the width W1 greater than or substantially equal to the width W2 of the corresponding adjacent extension portion 413, so that two separate substrates 411a whose extension portions 413 stagger with each other can be formed in the same sheet 40. Therefore, the utilization of the substrate 411a can be improved.

In addition, as shown in FIG. 33, the extension portions 413 are aligned with the rows R1-R6 instead of the intervals. In this embodiment, the extension portions 413 could be arranged under the keycaps 11 at positions corresponding to the rows R1-R6, where light sources (not shown) are disposed on the respective extension portions 413, so that light emitted from the light sources (not shown) would be propagated towards the corresponding keycaps 11. The light source is, for example, positioned under the coverage of a single keycap 11. Further, the arrangement of the extension portions 413 and light sources is not limited thereto.

Figure 35:
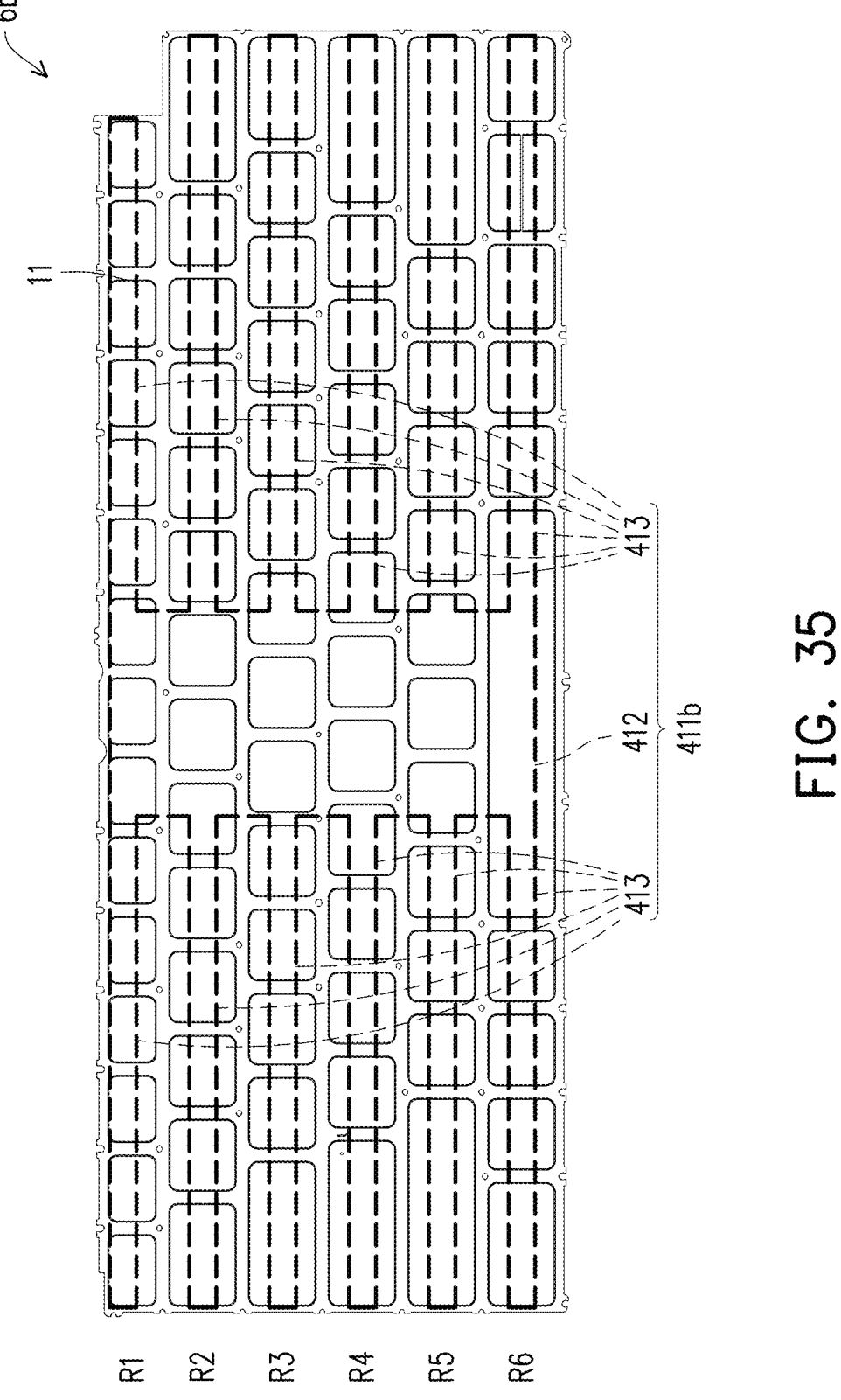
FIG. 35 is a top view of a light-emitting keyboard according to another embodiment of the invention.
Figure 36:
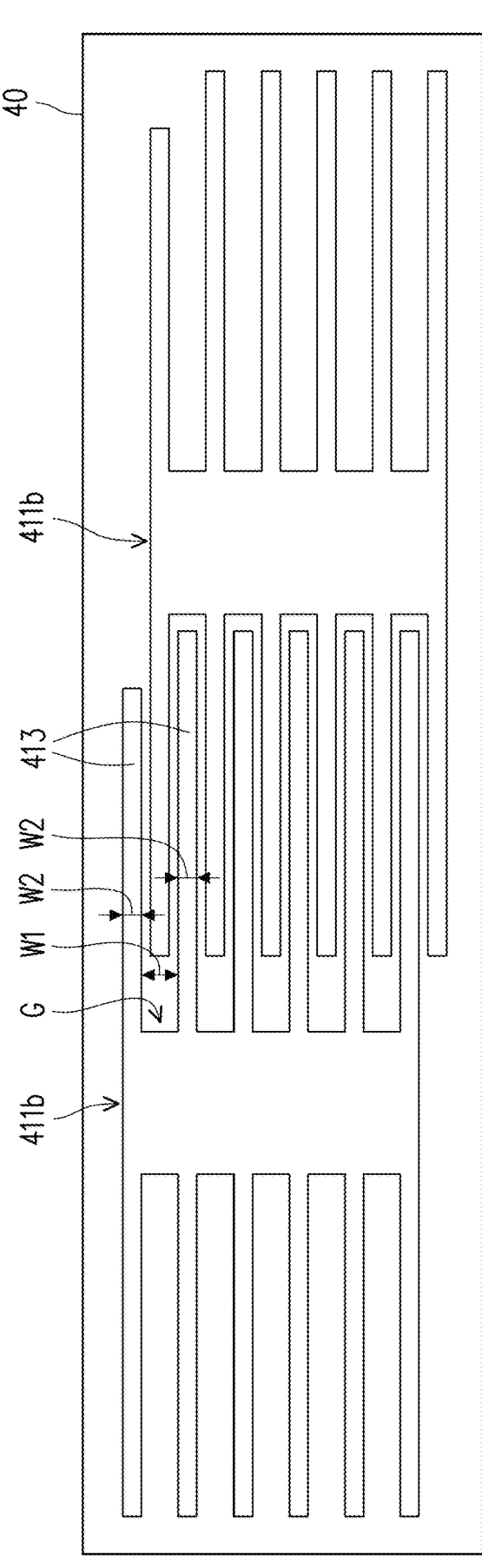
FIG. 36 is a sheet which is a raw material for manufacturing the substrates of FIG. 35.

FIG. 35 is a top view of a light-emitting keyboard according to another embodiment of the invention. FIG. 36 is a sheet which is a raw material for manufacturing the substrates of FIG. 35. It is noted that the light sources 417 are not shown in FIGS. 35 and 36 to simplify the drawings.

Referring to FIGS. 35 and 36, in the embodiment of the light-emitting keyboard 6b, at least two extension portions 413 extend from two opposite sides of the connection portion 412, so as to form a fishbone-shaped configuration. Similarly, due to the staggered design of the extension portions 413 with the width W1 greater than or substantially equal to the width W2, utilization of the sheet 40 for substrate fabrication can be improved, such that the manufacturing cost of the substrate 411b can be reduced.

Figure 37:
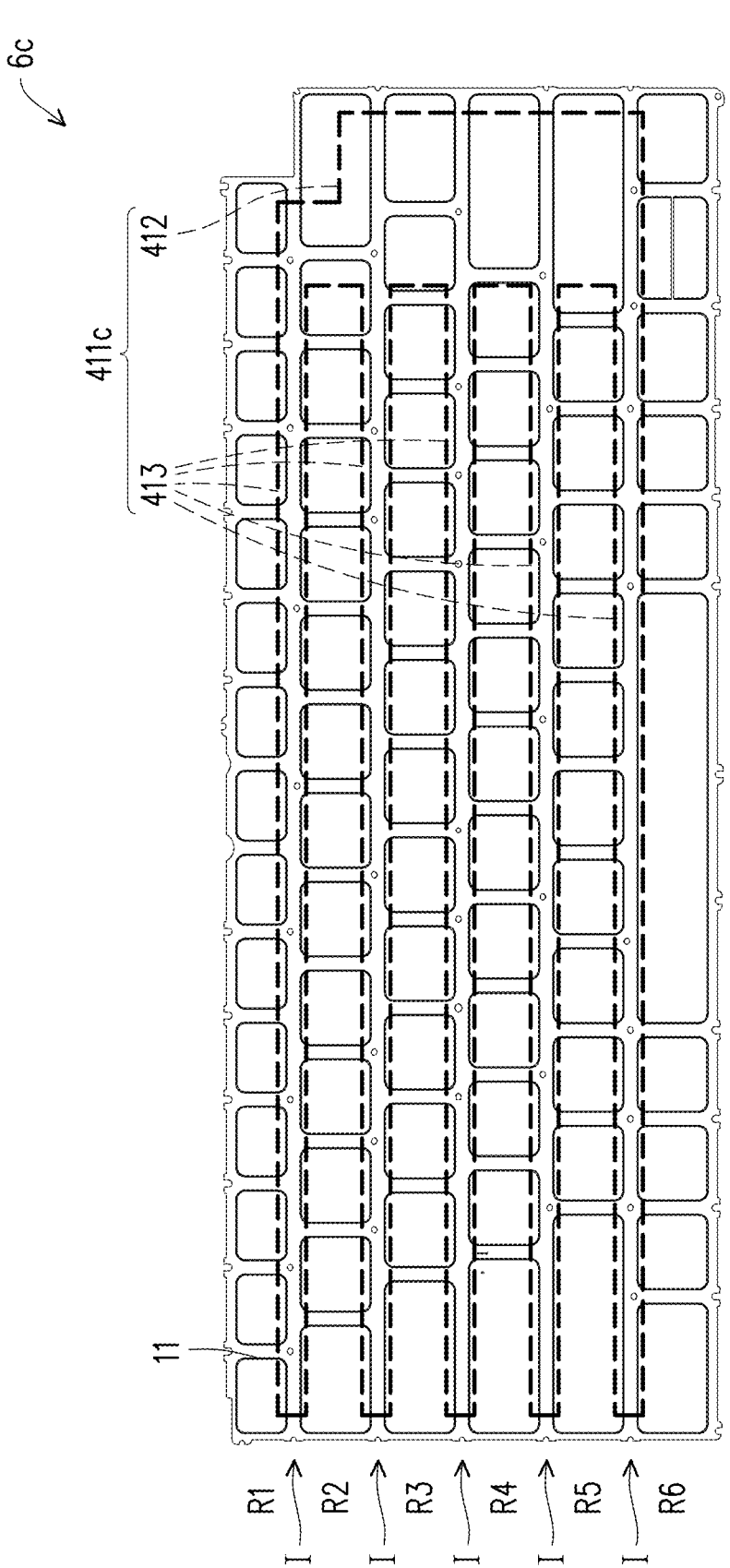
FIG. 37 is a top view of a light-emitting keyboard according to another embodiment of the invention.

FIG. 37 is a top view of a light-emitting keyboard according to another embodiment of the invention. Referring to FIGS. 33 and 37, the main difference between the light-emitting keyboard 6c of FIG. 37 and the light-emitting keyboard 6a of FIG. 33 is that, in the embodiment of FIG. 37, the extension portions 413 of the substrate 411c are aligned with all of the intervals I instead of the rows R1-R6. Certainly, the arrangement of the extension portions 413 is not limited thereto. In an embodiment, the extension portions 413 may be aligned with some of the intervals I. In one embodiment, some of the extension portions 413 might be aligned with the intervals, while the others might be aligned with the rows.

Figure 38:
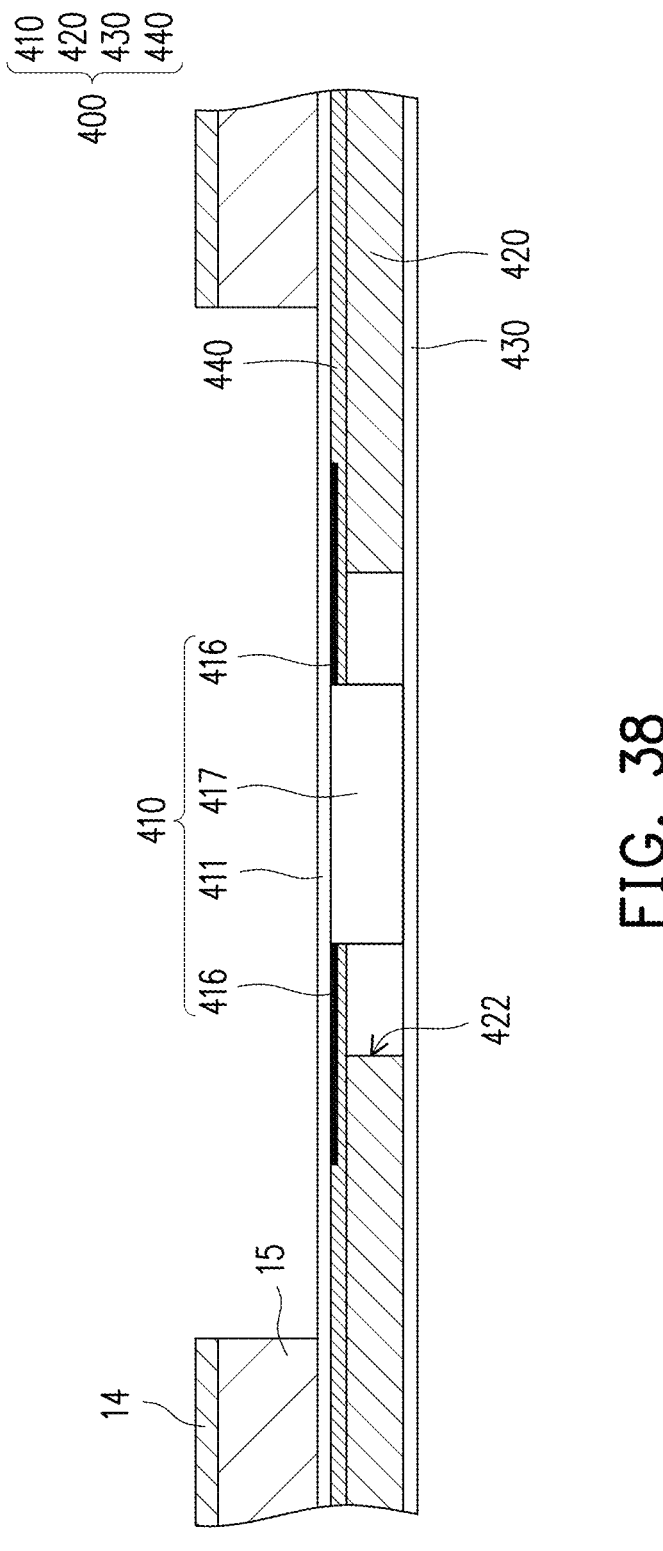
FIG. 38 to FIG. 40 are partial enlarged views of light-emitting keyboards according to other embodiments of the invention.
Figure 39:
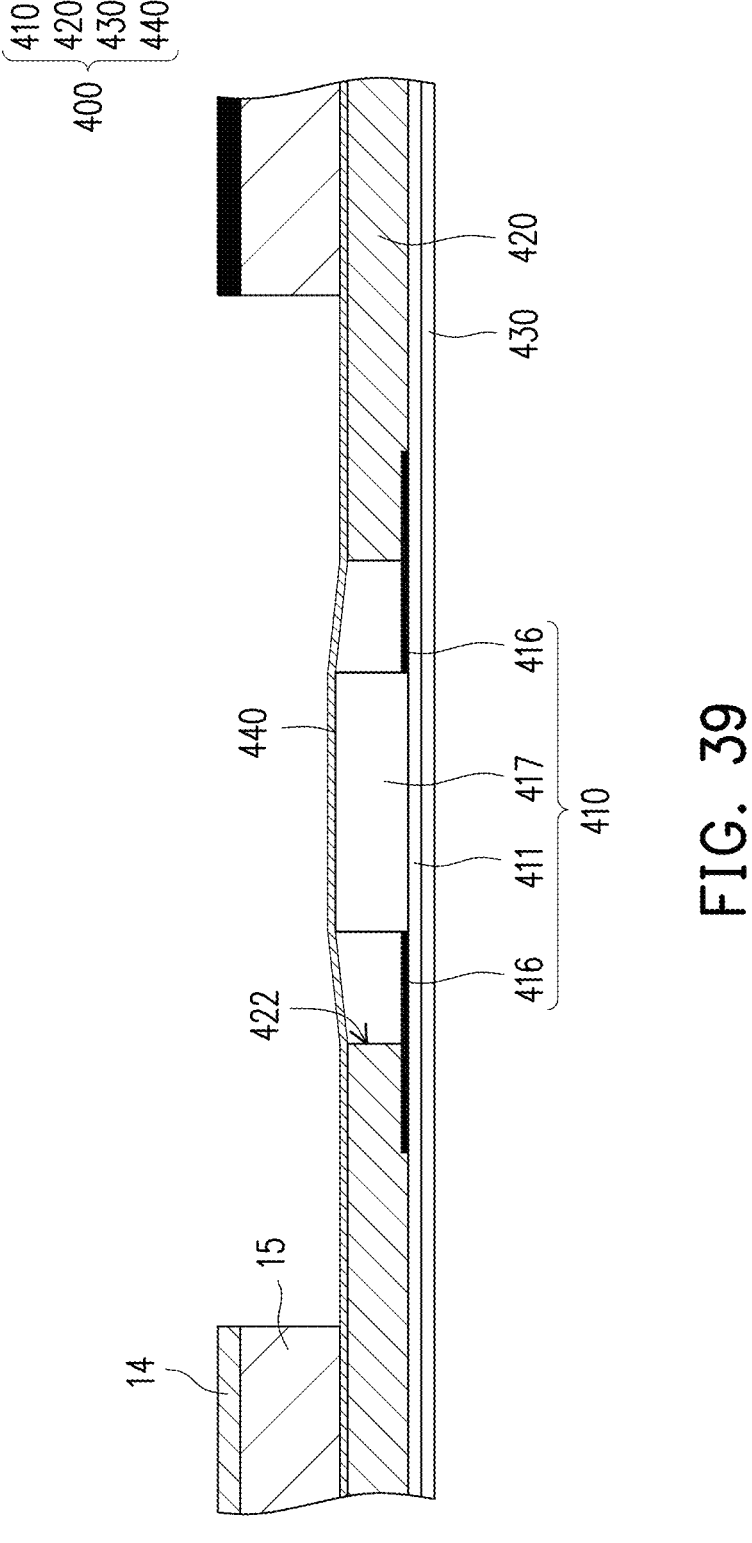
Figure 40:
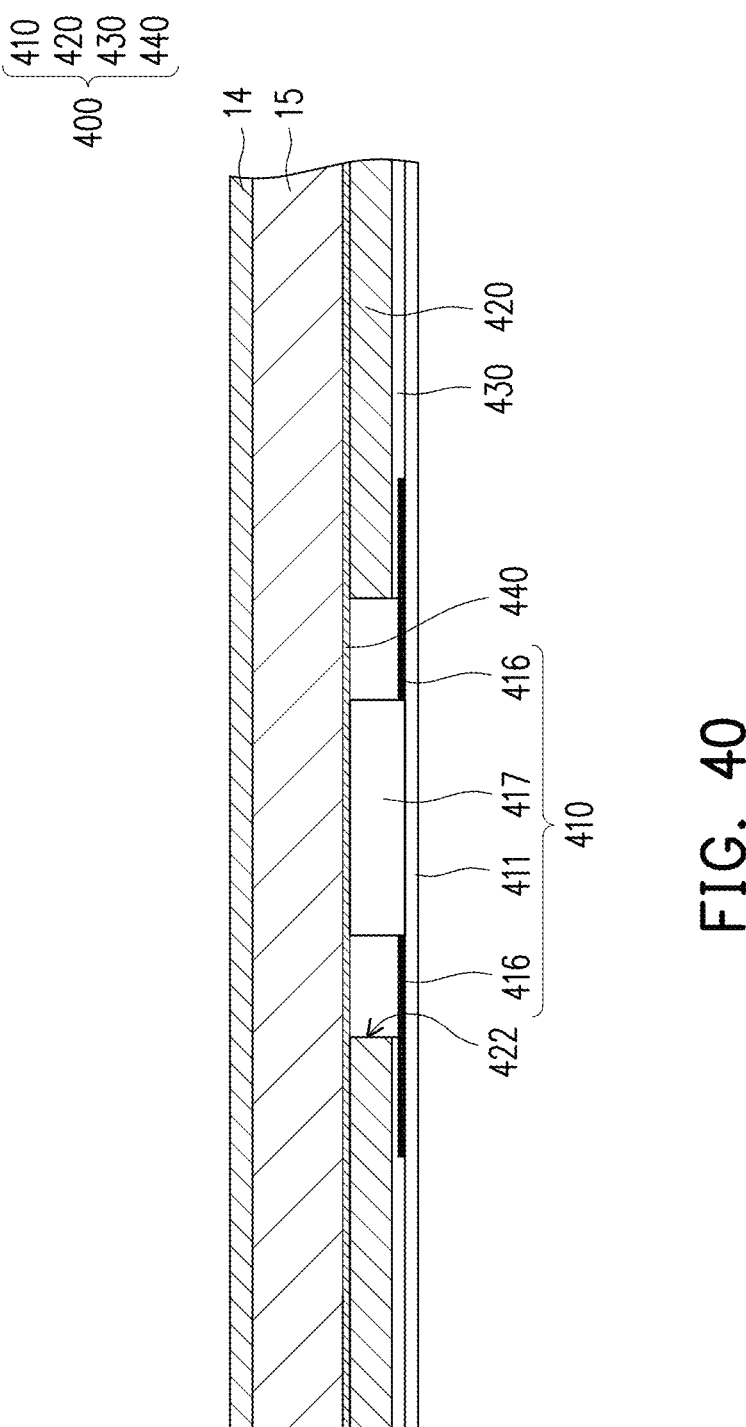

FIG. 38 to FIG. 40 are partial enlarged views of light-emitting keyboards according to other embodiments of the invention. Referring to FIG. 38, the main difference between FIG. 38 and FIG. 30 is the location of the composite light-emitting layer 410. In the embodiment of FIG. 38, the substrate 411 is coupled to a surface of the bracket 15 facing toward the light guide plate 420. The substrate 411 is, for example but not limited thereto, attached to a bottom surface of the bracket 15 so as to form a single piece; that is, the composite light-emitting layer 410 may be integrated to the surface of the bracket 15.

Referring to FIG. 39, the main difference between FIG. 39 and FIG. 30 is the location of the substrate 411 and the reflective layer 430. In the embodiment of FIG. 39, the substrate 411 is positioned between the light guide plate 420 and the reflective layer 430. In one embodiment, the reflective layer 430 may have a larger size to cover the substrate 411/composite light-emitting layer 410, and could be further coupled with the light guide plate 420.

Referring to FIG. 40, the main difference between FIG. 40 and FIG. 30 is that, in the embodiment of FIG. 40, the bracket 15 does not has an opening corresponding to one of the light sources 417; that is, the opening 18 shown in FIG.

30 may not be provided in this embodiment due to the reduced thickness of the light sources 417 or the backlight module 400.

While the embodiments of FIGS. 38 to 40 take the type and configuration of the substrate 411 as an example, the substrate 411a, 411b, and 411c can be applied to the backlight module 400 shown in FIGS. 38 to 40 in accordance with modified embodiments.

Based on the above, in the backlight module and the light-emitting keyboard of the invention, one of the light sources located in one of the holes is spaced from a wall of the corresponding hole, so that the possibility of the damage of the light source caused by alignment errors during assembly can be lowered. The adhesive layer is disposed between composite light-emitting layer and the bracket, and the adhesive layer is spaced from one of the light sources, so as to prevent the adhesive layer from being too close to the light source to influence optical performance of the light source.

Lastly, it should be mentioned that: each of the above embodiments is only used to describe the technical solutions of the invention and is not intended to limit the invention; and although the invention is described in detail via each of the above embodiments, those having ordinary skill in the art should understand that: modifications may still be made to the technical solutions recited in each of the above embodiments, or portions or all of the technical features thereof may be replaced to achieve the same or similar results; the modifications or replacements do not make the nature of corresponding technical solutions depart from the scope of the technical solutions of each of the embodiments of the invention.

What is claimed is:

1. A light-emitting keyboard, comprising:
a bracket;
a plurality of keycaps disposed on the bracket and connected to the bracket via a support assembly;
a circuit layer disposed on the bracket;
a composite light-emitting layer disposed under the bracket, comprising:
    a substrate; and
    a conductive layer disposed on the substrate and comprising a circuit;
    at least one light source electrically connected to the circuit and having a first surface and a second surface opposite to each other; and a reflective layer disposed on the substrate, wherein the light is emitted form the first surface of the light source, and the second surface of the light source is toward to the reflective layer.

2. The light-emitting keyboard of claim 1, wherein the reflector layer overlaps with the light source in a direction along the keycap being pressed.

3. The light-emitting keyboard of claim 1, wherein the bracket has a plurality of openings, and the light source is located corresponding to one of the openings of the bracket.

4. The light-emitting keyboard of claim 1, further comprises a light guide plate having a hole, and the light source is disposed in the hole.

5. The light-emitting keyboard of claim 1, wherein the conductive layer further comprises a patterned structure, and the patterned structure is electrically insulated from the light source.

6. The light-emitting keyboard of claim 1, wherein the conductive layer further comprises a patterned structure, and the patterned structure is separated from the light sources.

7. The light-emitting keyboard of claim 1, wherein the light source does not overlap with the keycaps in a direction along the keycap being pressed.

8. The light-emitting keyboard of claim 1, wherein the substrate is a light-shielding substrate.

9. The light-emitting keyboard of claim 1, further comprises a passivation layer disposed on the circuit.

10. The light-emitting keyboard of claim 1, further comprises a passivation layer disposed on the first surface of the light source.

11. The light-emitting keyboard of claim 1, wherein the passivation layer is a light-reflecting coating or a light-reflecting polymer film.

12. The light-emitting keyboard of claim 1, wherein the composite light-emitting layer has a first long side and a second long side opposite to each other, the at least one light source comprises a first light source close to the first long side and a second light source close to the second long side, the composite light-emitting layer further comprises a first resistor electrically connected to the first light source and a second resistor electrically connected to the second light source.

\* \* \* \* \*